US009152886B2

(12) United States Patent
Sakai

(10) Patent No.: US 9,152,886 B2
(45) Date of Patent: Oct. 6, 2015

(54) METHODS AND APPARATUS FOR ACQUIRING AND ANALYZING IMAGE DATA

(75) Inventor: Yasuo Sakai, Tokyo (JP)

(73) Assignee: Sony Corporation, Tokyo (JP)

(*) Notice: Subject to any disclaimer, the term of this patent is extended or adjusted under 35 U.S.C. 154(b) by 661 days.

(21) Appl. No.: 12/873,437

(22) Filed: Sep. 1, 2010

(65) Prior Publication Data

US 2011/0058028 A1 Mar. 10, 2011

(30) Foreign Application Priority Data

Sep. 9, 2009 (JP) ................................. 2009-208482
Mar. 12, 2010 (JP) ................................. 2010-056390

(51) Int. Cl.
*H04N 7/18* (2006.01)
*G06K 9/72* (2006.01)
*G06K 9/62* (2006.01)
*G10L 17/00* (2013.01)
*G06K 9/00* (2006.01)

(52) U.S. Cl.
CPC .............. *G06K 9/72* (2013.01); *G06K 9/00221* (2013.01); *G06K 9/00248* (2013.01); *G06K 9/00288* (2013.01); *G06K 9/00335* (2013.01); *G06K 9/00342* (2013.01); *G06K 9/00369* (2013.01); *G06K 9/00677* (2013.01); *G10L 17/00* (2013.01); *G10L 17/005* (2013.01); *G06K 9/00295* (2013.01); *G06K 2009/00322* (2013.01); *G06K 2009/00328* (2013.01)

(58) Field of Classification Search
CPC . G06K 9/72; G06K 9/00221; G06K 9/00288; G06K 9/00335; G06K 9/00369; G06K 9/00677; G06K 2009/00221; G06K 2009/00322; G06K 2009/00328; G10L 17/005
See application file for complete search history.

(56) References Cited

U.S. PATENT DOCUMENTS

| 7,203,367 B2* | 4/2007 | Shniberg et al. ............... 382/224 |
| 2006/0056737 A1* | 3/2006 | Ohtsuka et al. ............... 382/305 |
| 2006/0206724 A1* | 9/2006 | Schaufele et al. ............. 713/186 |
| 2007/0185907 A1* | 8/2007 | Kume ........................ 707/104.1 |
| 2007/0239683 A1* | 10/2007 | Gallagher ........................ 707/3 |

(Continued)

FOREIGN PATENT DOCUMENTS

JP 2008-071112 3/2008

OTHER PUBLICATIONS

Yoshio et al. (English Translation of JP 2008-204079 A).*

*Primary Examiner* — Joseph Ustaris
*Assistant Examiner* — Jill Sechser
(74) *Attorney, Agent, or Firm* — Wolf, Greenfield & Sacks, P.C.

(57) ABSTRACT

An information processing apparatus includes: a storage unit which stores person relationship information representing relationships between people as a subject in a storage medium; an acquisition unit which acquires image data generated by imaging people as a subject; a detection unit which detects each person in an image; a specification unit which specifies each person detected from the image by the detection unit; and a determination unit which determines the relationship between multiple people detected from the image. When at least one person from among the people detected from the image is specified and another person is unable to be specified, the specification unit may specify the at least one other person on the basis of the relationship between the multiple people and the person relationship information.

20 Claims, 25 Drawing Sheets

(56) References Cited

U.S. PATENT DOCUMENTS

| | | | |
|---|---|---|---|
| 2007/0239778 A1* | 10/2007 | Gallagher | 707/104.1 |
| 2008/0089561 A1* | 4/2008 | Zhang | 382/118 |
| 2008/0175485 A1* | 7/2008 | Kato | 382/203 |
| 2009/0066798 A1* | 3/2009 | Oku et al. | 348/207.99 |
| 2009/0116695 A1* | 5/2009 | Anchyshkin et al. | 382/106 |
| 2009/0248738 A1* | 10/2009 | Martinez et al. | 707/103 R |
| 2010/0177938 A1* | 7/2010 | Martinez et al. | 382/118 |
| 2010/0179874 A1* | 7/2010 | Higgins et al. | 705/14.53 |
| 2010/0245567 A1* | 9/2010 | Krahnstoever et al. | 348/143 |

\* cited by examiner

CIRCUIT CONFIGURATION BY FUNCTIONAL CIRCUIT BLOCKS OF CONTROL UNIT

CIRCUIT CONFIGURATION BY FUNCTIONAL CIRCUIT BLOCK OF SUBJECT DETECTION UNIT

CIRCUIT CONFIGURATION BY FUNCTIONAL CIRCUIT BLOCKS BY PERSON RELATIONSHIP DETERMINATION UNIT

FIG.6
CONFIGURATION OF FAMILIARITY DATABASE

| CATEGORY | FRIENDSHIP DETERMINATION ITEM | EVALUATION VALUE |
|---|---|---|
| LANGUAGE | DIALECT | 0.9 |
| | STANDARD LANGUAGE | 0.5 |
| HONORIFIC TITLE OF NAME | NICKNAME | 0.95 |
| | WITHOUT HONORIFIC TITLE | 0.1 |
| | ~ SAN | 0.2 |
| | ~ KUN | 0.4 |
| | ~ CHAN | 0.6 |
| STRAIN | HONORIFIC | 0.4 |
| | FORMAL | 0.3 |
| | BRUSQUE | 0.4 |
| | CASUAL | 0.3 |
| PERSON RELATIONSHIP | MOMMY | 1.0 |
| | MOTHER | 1.0 |
| | DADDY | 1.0 |
| | FATHER | 1.0 |
| | GRANDPA | 1.0 |
| | GRANDMA | 1.0 |
| | BROTHER | 1.0 |
| | SISTER | 1.0 |
| ⋮ | ⋮ | ⋮ |

FIG.7
CONFIGURATION OF RELATIONSHIP DETERMINATION DATABASE

| MOTION | RELATIONSHIP |
|---|---|
| CRADLE | PARENT AND CHILD |
| PIGGYBACK | PARENT AND CHILD |
| HOLD HANDS | PARENT AND CHILD, FRIEND, COUPLE |
| PUT ARMS AROUND EACH OTHER | FRIEND |
| FOLD ARMS | COUPLE |

EXAMPLE OF GENERATION OF UTTERANCE DATA

CONFIGURATION OF PERSON REGISTRATION INFORMATION

EXAMPLE OF SPECIFICATION OF PERSON USING PERSON RELATIONSHIP INFORMATION

CONFIGURATION OF FILE ATTRIBUTE INFORMATION

PHOTOGRAPHED PERSON SPECIFICATION PROCESSING PROCEDURE

UTTERANCE ANALYSIS/RELATIONSHIP ESTIMATION PROCESSING SUBROUTINE (2)

CIRCUIT CONFIGURATION BY HARDWARE CIRCUIT BLOCKS OF PRINTING APPARATUS

CIRCUIT CONFIGURATION BY FUNCTIONAL CIRCUIT BLOCKS OF CONTROL UNIT

FIG.22
RELATIONSHIP BETWEEN MULTIPLE PERSONS IN A PLURALITY OF STILL IMAGES
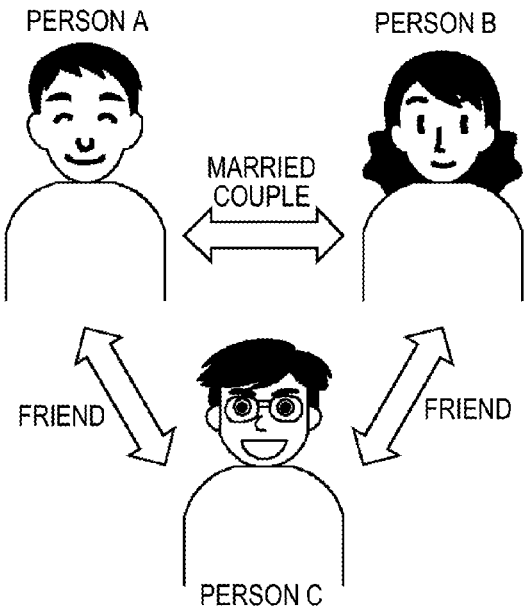
FIG.23
EXAMPLE OF COMBINATION OF PERSONS IN A PLURALITY OF STILL IMAGES
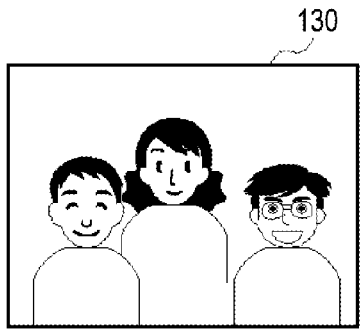
(A)
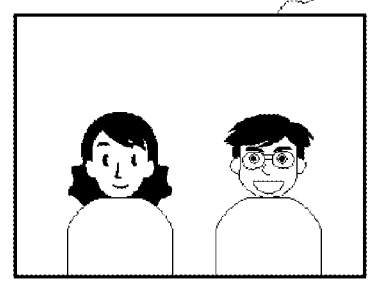
(B)
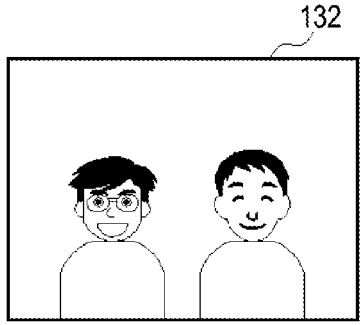
(C)
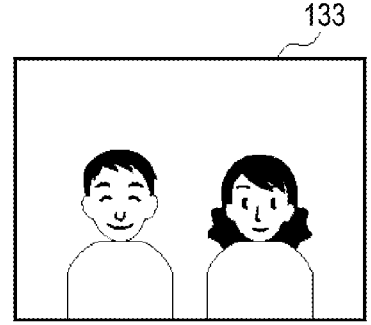
(D)

EXAMPLE OF PRINTING OF STILL IMAGE FOR PERSON A
AND PERSON B AS MARRIED COUPLE

EXAMPLE OF PRINTING OF STILL IMAGE FOR PERSON C

NUMBER-OF-COPIES SELECTION/PRINTING PROCESSING PROCEDURE (1)

NUMBER-OF-COPIES SELECTION/PRINTING PROCESSING PROCEDURE (2)

NUMBER-OF-COPIES SELECTION/PRINTING PROCESSING PROCEDURE (4)

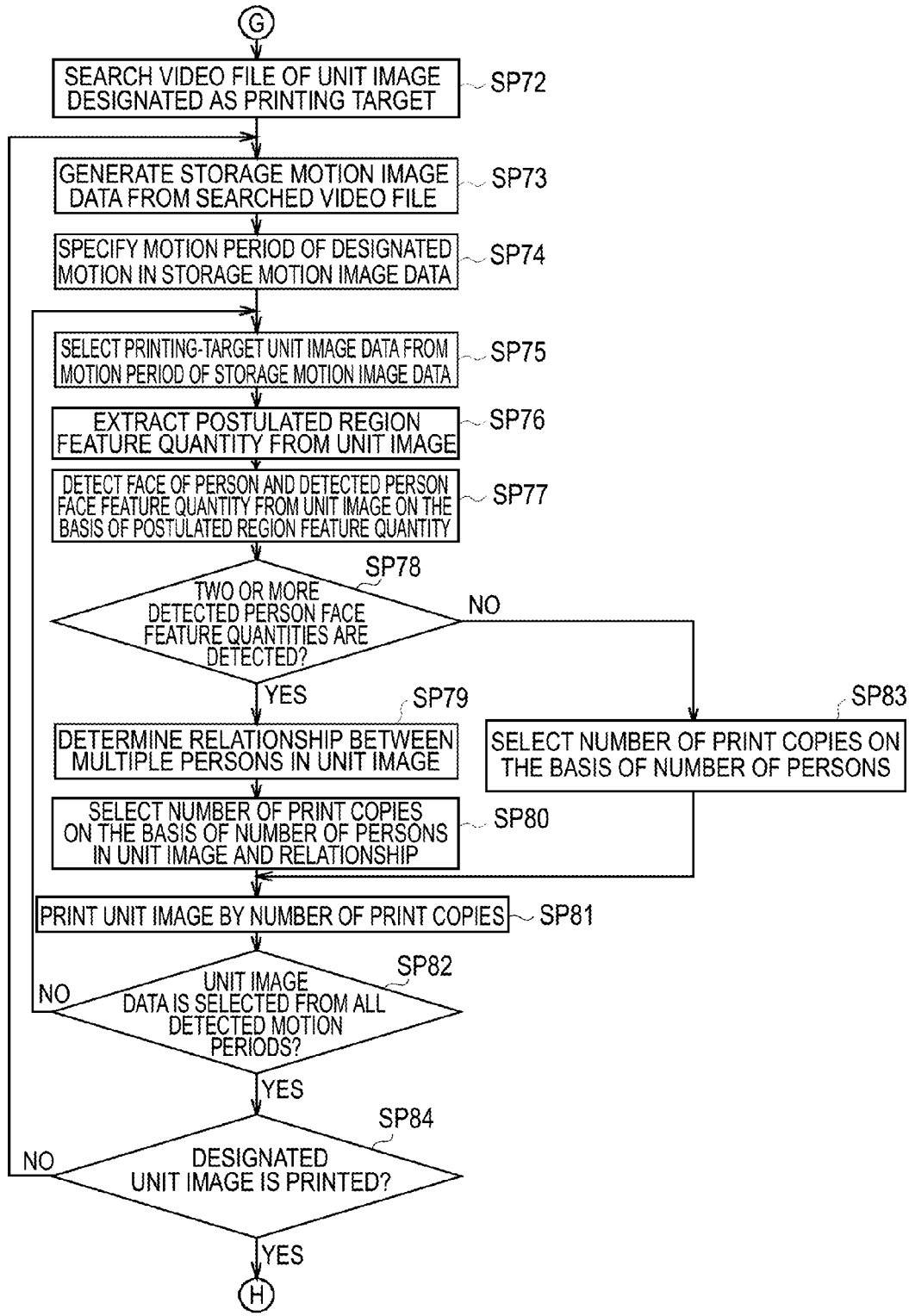

METHODS AND APPARATUS FOR ACQUIRING AND ANALYZING IMAGE DATA

BACKGROUND OF THE INVENTION

1. Field of the Invention

The present invention relates to an information processing apparatus, an information processing method, and an information processing program. The present invention is ideally applied, for example, to a digital video camera or a printing apparatus.

2. Description of the Related Art

A known image classification device detects the face portion of a person from each accumulated and stored image, and also extracts the detected face portion as a face image. Further, the image classification device classifies the images by people on the basis of the feature points of the face images.

The image classification device displays a list of face images of individual people in an image reproduction mode, if a desired person is selected as a face image in this state, retrieves images of the desired person in accordance with the selection, and displays a list of images as thumbnails (for example, see JP-A-2008-71112 (pp. 11 to 17, and FIGS. 6 and 7).

SUMMARY OF THE INVENTION

When a person becomes an adult, facial appearance hardly changes even with passage of years. Meanwhile, as a person is growing up from a child to an adult, facial appearance tends to change during growth.

Actually, even in the case of the same person, if the face of the person in his/her childhood and the face after the person becomes an adult are compared with each other as the feature points of the face images, the faces are determined as the faces of different people. That is, facial appearance may change during development.

The image classification device configured as above specifies the individual people by using only the feature points of the face images. For this reason, when the images of a person in his/her childhood and the images after the person becomes an adult are stored, the image classification device may classify the images as images of different people on the basis of the feature points of the face image of the person in his/her childhood and the feature points of the face image after the person becomes an adult.

Accordingly, even when the same person is in different images, if the facial appearance of the person changes, the image classification device may not accurately retrieve the images of the same person.

Thus, it is desirable to provide an information processing apparatus, an information processing method, and an information processing program capable of accurately retrieving the images of the same person.

According to an embodiment of the invention, image data generated by imaging people as a subject is acquired, and each person in an image based on acquired image data is detected. Each person detected from the image is specified, and the relationship between multiple people detected from the image is determined. When at least one person from among the multiple people detected from the image is specified and another person is unable to be specified, another person is specified on the basis of the determined relationship between the multiple people and person relationship information representing the relationship between multiple people as a subject stored in a storage medium.

Therefore, according to the embodiment of the invention, even when a person detected from an image is the same person as a person detected from another image with a changed facial appearance, the person detected from the image can be specified as the same person as the person detected from another image on the basis of the relationship between the people.

According to the embodiment of the invention, if image data generated by imaging people as a subject is acquired, each person in an image based on acquired image data is detected, and also the relationship between multiple people detected from the image is determined. Then, the number of print copies of the image is selected on the basis of the number of people detected from the image and the determined relationship between the multiple people.

Therefore, according to the embodiment of the invention, only one copy of the image can be printed for each group of multiple people in the image, and also the image can be printed individually for the people who do not belong to any group. As a result, the image can be printed individually for the multiple people in each group, preventing the printed images from being wasted.

According to the embodiment of the invention, image data generated by imaging people as a subject is acquired, and each person in an image based on acquired image data is detected. Each person detected from the image is specified, and also the relationship between multiple people detected from the image is determined. When at least one person from among the multiple people detected from the image is specified and another person is unable to be specified, another person is specified on the basis of the determined relationship between the multiple people and person relationship information representing the relationship between multiple people as a subject stored in the storage medium. Therefore, it is possible to implement an information processing apparatus, an information processing method, and an information processing program which, even when the person detected from the image is the same person as a person detected from another image with a changed facial appearance, capable of specifying the person detected from the image as the same person as the person detected from another image on the basis of the relationship between the people and thus accurately retrieving the images of the same person.

According to the embodiment of the invention, if image data generated by imaging people as a subject is acquired, each person in an image based on acquired image data is detected, and the relationship between multiple people detected from the image is determined. The number of print copies of the image is selected on the basis of the number of people detected from the image and the determined relationship between the multiple people. Therefore, only one copy of the image can be printed for each group of multiple people in the image, and also the image can be printed individually for the people who do not belong to any group. As a result, the image can be printed individually for the multiple people in each group, preventing the printed images from being wasted and accurately printing the image for each group or individual.

BRIEF DESCRIPTION OF THE DRAWINGS

FIG. 6 is a schematic view showing the configuration of a familiarity database.

FIG. 7 is a schematic view showing the configuration of a relationship determination database.

FIG. 22 is a schematic view for description of the relationship between multiple people in a plurality of still images.

FIG. 23 shows schematic views for description of a combination of multiple people in a plurality of still images.

FIG. 30 is a flowchart showing a number-of-copies selection/printing processing procedure (5).

DESCRIPTION OF PREFERRED EMBODIMENTS

Hereinafter, modes for carrying out the invention (hereinafter, called an embodiment) will be described with reference to the drawings. The description will be provided in the following sequence.

1. Overview of Embodiment
2. First Embodiment
3. Second Embodiment
4. Modification <1. Overview of Embodiment>

First, the overview of the embodiment will be described. After the overview is described, description will be provided for a first embodiment and a second embodiment which are specific examples of this embodiment.

Figure 1:
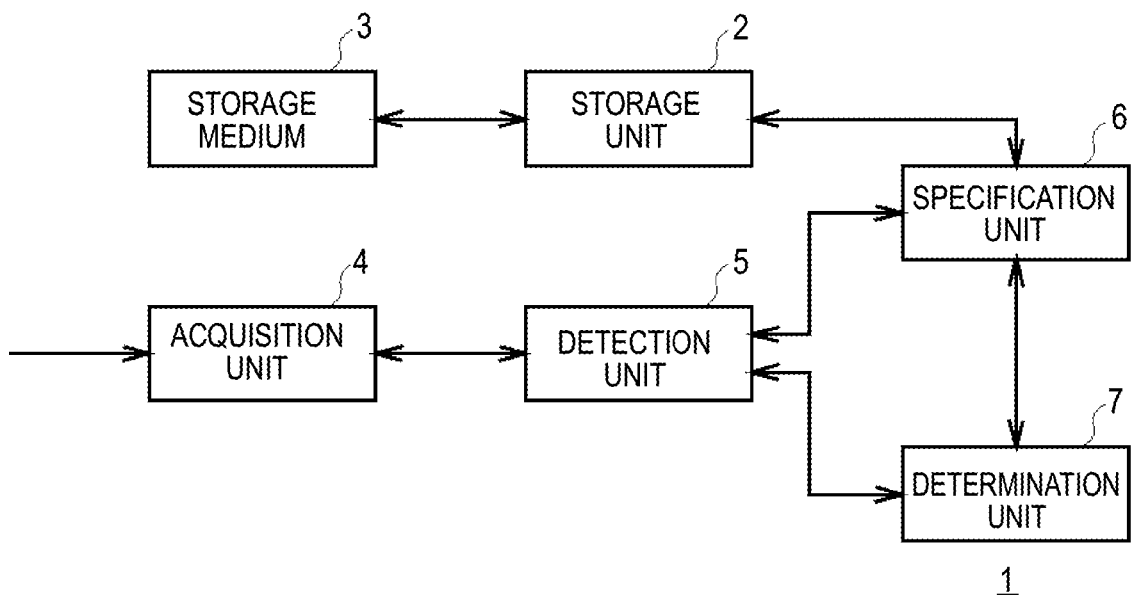
FIG. 1 is a block diagram showing the circuit configuration of an information processing apparatus according to an embodiment.

In FIG. 1, reference numeral 1 denotes an information processing apparatus according to the embodiment as a whole. In the information processing apparatus 1, a storage unit 2 stores person relationship information representing the relationship between multiple people as a subject in a storage medium 3. The storage medium 3 is incorporated into the information processing apparatus 1 or is removably attached to the information processing apparatus 1.

In the information processing apparatus 1, an acquisition unit 4 acquires image data generated by imaging people as a subject. In the information processing apparatus 1, a detection unit 5 detects each person in an image based on image data acquired by the acquisition unit 4.

In the information processing apparatus 1, specification unit 6 specifies each person detected from the image by the detection unit 5. In the information processing apparatus 1, a determination unit 7 determines the relationship between multiple people detected from the image by the detection unit 5.

In the information processing apparatus 1, when at least one person from among the multiple people detected from the image by the detection unit 5 is specified and another person is unable to be specified, the specification unit 6 specifies another person on the basis of the relationship between the multiple people determined by the determination unit 7 and the person relationship information stored in the storage medium 3.

With this configuration, the information processing apparatus 1 can specify a person detected from an image as the same person as a person detected from another image on the basis of the relationship between the people even when the person detected from the image is the same person as the person detected from another image with a changed facial appearance. Therefore, the information processing apparatus 1 can accurately retrieve the images of the same person.

<2. First Embodiment>

[2-1 Circuit Configuration of Digital Video Camera]

Figure 2:
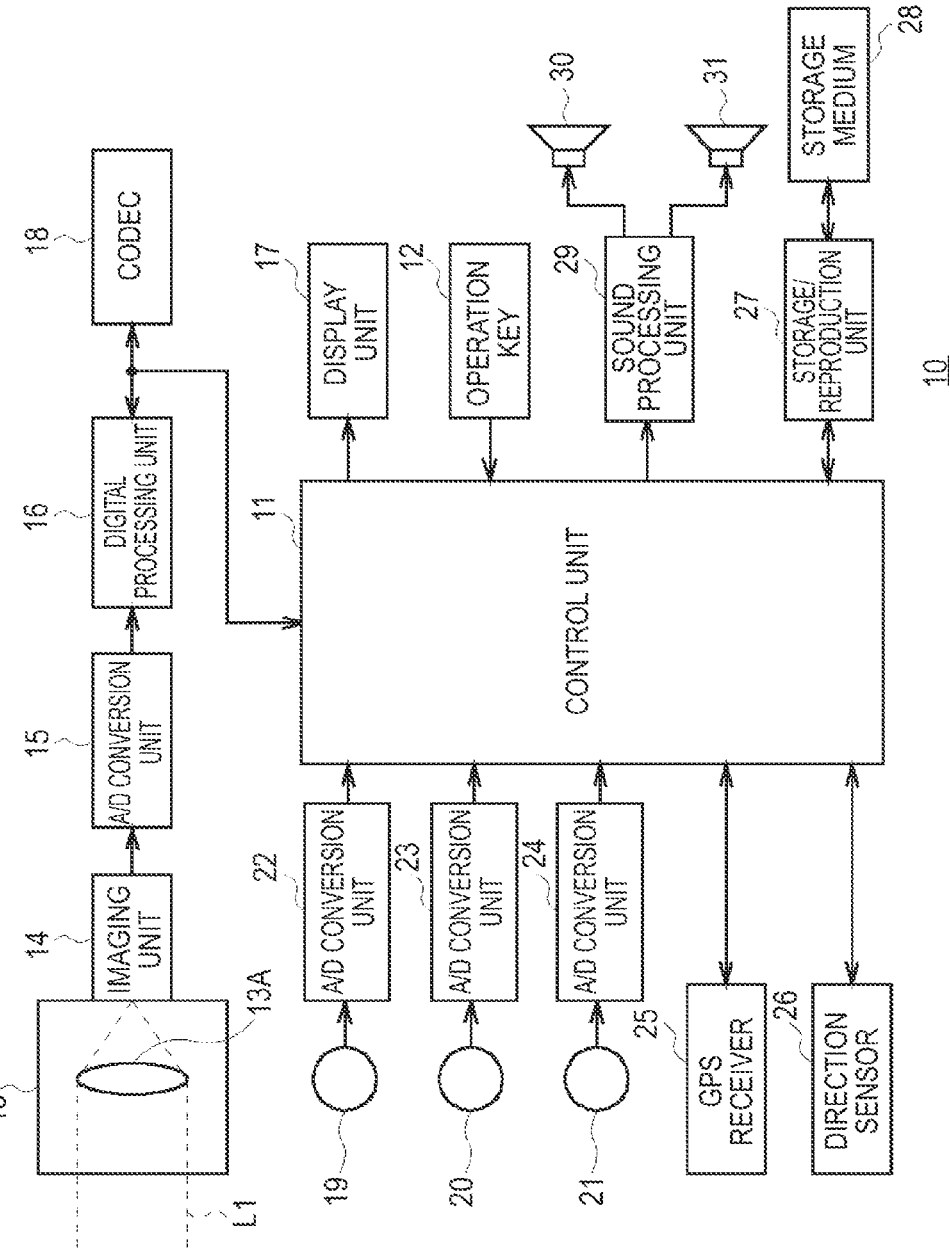
FIG. 2 is a block diagram showing the circuit configuration by hardware circuit blocks of a digital video camera.

Next, the circuit configuration by hardware circuit blocks of a digital video camera 10 which is a specific example of the information processing apparatus 1 (FIG. 1) will be described with reference to FIG. 2. As shown in FIG. 2, a digital video camera 10 has, for example, a control unit 11 which is constituted by a microprocessor.

The control unit 11 performs overall control of the digital video camera 10 and carries out predetermined arithmetic processing in accordance with various programs stored in advance in an internal memory (not shown). The control unit 11 loads an input signal input in accordance with an operation of an operation key 12 provided, for example, in the housing of the digital video camera 10 and carries out various kinds of processing according to the input signal.

As the operation key 12, the housing of the digital video camera 10 is provided with a power key for instructing to power on/off, and an imaging storage key for instructing to start and end storage of imaging.

The housing of the digital video camera 10 is also provided with a mode switching key for instructing to switch the operation mode, a reproduction key for instructing to reproduce video data constituted by motion image data and sound data generated and stored while imaging a subject, and the like.

Actually, if the power key is operated to instruct to power on, the control unit 11 is powered on and activated in an imaging mode, for example. If the user operates the mode switching key in the reproduction mode to instruct to switch the operation mode to the imaging mode, the control unit 11 is changed from the reproduction mode to the imaging mode.

In the imaging mode, the control unit 11 appropriately drives and controls a lens unit 13, in which an imaging lens 13A, a stop, a focus lens, and the like are provided, to automatically adjust the focus or exposure with respect to the subject.

Thus, in a state where the focus or exposure is automatically adjusted with respect to the subject, the control unit 11 receives imaging light L1 incoming from the imaging range including the subject at the light receiving surface of an imaging element 14 through the lens unit 13. The imaging element 14 is a CCD (Charge Coupled Device) image sensor, a CMOS (Complementary Metal Oxide Semiconductor) image sensor, or the like.

At this time, the imaging element 14 photoelectrically converts imaging light L1 received at the light receiving surface in a predetermined cycle to sequentially generate analog imaging signals according to imaging light L1 under the control of the control unit 11. The imaging element 14 also converts the sequentially generated imaging signals to digital imaging data through an analog-to-digital conversion unit 15 and sends digital imaging data to the digital processing unit 16.

The digital processing unit 16 carries out predetermined digital processing, such as noise reduction processing or shading correction processing, for imaging data each time imaging data is provided from the imaging element 14 through the analog-to-digital conversion unit 15. Thus, the digital processing unit 16 generates unit image data of temporally consecutive unit images constituting a motion image on the basis of imaging data sequentially provided from the imaging element 14.

The digital processing unit 16 sequentially generates unit image data on the basis of imaging data in such a manner and sends a data string of generated unit image data to the control unit 11 as motion image data of a motion image for imaging state confirmation. In the following description, the motion image for imaging state confirmation is also called an imaging state presentation image, and motion image data of the imaging state presentation image is also called imaging state presentation image data.

The control unit 11 sends imaging state presentation image data provided from the digital processing unit 16 to the display unit 17. The display unit 17 is a liquid crystal display, an organic EL (Electro Luminescence) display, or the like.

Thus, the control unit 11 displays the imaging state presentation image based on imaging state presentation image data on the display unit 17 (that is, sequentially switches the unit images based on unit image data as the imaging state presentation image).

In this way, the control unit 11 can consecutively image the imaging range including the subject and display the imaging state presentation image on the display unit 17. The control unit 11 can also allow the user to confirm the imaging range or composition with respect to the subject and the imaging state, such as focus, through the imaging state presentation image.

The control unit 11 starts to store imaging of the subject if the user operates the imaging storage key to instruct to start storage in the imaging mode, and to end imaging storage if the user operates the imaging storage key again to instruct to end storage.

During a period from the start of imaging storage until the end of imaging storage according to the operation of the imaging storage key by the user in the imaging mode, the control unit 11 controls the respective units, such as the digital processing unit 16 and the codec 18, for storage of imaging of the subject.

Thus, during the period from the start of storage until the end of storage, the digital processing unit 16 generates unit image data on the basis of imaging data in the above-described manner each time imaging data is provided from the imaging element 14. Then, the digital processing unit 16 sends a data string of unit image data to the control unit 11 as imaging state presentation image data.

The control unit 11 displays the imaging state presentation image on the display unit 17 during the period from the start of storage until the end of storage. Thus, the control unit 11 can allow the user to confirm the imaging state of the subject through the imaging state presentation image during imaging storage of the subject.

During the period from the start of storage until the end of storage, the digital processing unit 16 adds time information (that is, time code) for reproduction control to unit image data in sequence each time unit image data is sequentially generated.

The digital processing unit 16 sends a data string of unit image data with time information to the codec 18 as motion image data of a motion image for storage. In the following description, the motion image for storage is also called a storage motion image, and motion image data of the storage motion image is also called storage motion image data.

The digital video camera 10 is provided with an imaging lens 13A at the housing front side (not shown). The digital video camera 10 is also provided with two microphones 19 and 20 for collecting sound around the digital video camera 10 on the right and left sides from the optical axis of the imaging lens 13A at the housing front side.

The digital video camera 10 is also provided with at least one microphone 21 for collecting sound around the digital video camera 10 at the housing bottom side (not shown). When the digital video camera 10 is provided with one microphone 21 at the housing bottom side, the microphone 21 is arranged, for example, at the center of the housing bottom side.

In the following description, of the two microphones 19 and 20 provided at the housing front side, the microphone 19 located on the right side when the housing front side is directed toward the subject is also called a right microphone 19.

In the following description, of the two microphones 19 and 20 provided at the housing front side, the microphone 20 located on the left side when the housing front side is directed toward the subject is also called a left microphone 20. In the following description, the microphone 21 provided at the housing bottom side is also called a rear microphone 21.

The right microphone 19 collects ambient sound to generate analog sound signal (hereinafter, also called a right sound signal) during the period from the start of storage until the end of storage. The right microphone 19 converts the right sound signal to digital sound data (hereinafter, also called right sound data) through the analog-to-digital conversion unit 22 and sends digital sound data to the control unit 11.

The left microphone 20 collects ambient sound to generate an analog sound signal (hereinafter, also called a left sound signal) during the period from the start of storage until the end of storage. The left microphone 20 converts the left sound signal to digital sound data (hereinafter, also called left sound data) through the analog-to-digital conversion unit 23 and sends digital sound data to the control unit 11.

The rear microphone 21 collects ambient sound to generate an analog sound signal (hereinafter, also called a rear sound signal) during the period from the start of storage until the end of storage. The rear microphone 21 converts the rear sound signal to digital sound data (hereinafter, also called rear sound data) through the analog-to-digital conversion unit 24 and sends digital sound data to the control unit 11.

If right sound data, left sound data, and rear sound data are provided from the right microphone 19, the left microphone 20, and the rear microphone 21, the control unit 11 sections right sound data, left sound data, and rear sound data for each predetermined unit.

The control unit 11 adds time information for synchronization with storage motion image data in sequence at the time of reproduction to each predetermined unit portion from the head to the tail of each of right sound data, left sound data, and rear sound data. The control unit 11 sends right sound data, left sound data, and rear sound data with the time information to the codec 18.

The codec 18 compresses and encodes storage motion image data provided from the digital processing unit 16 by a predetermined compression coding method during the period from the start of storage until the end of storage to generate compressed image data.

The codec 18 compresses and encodes right sound data, left sound data, and rear sound data provided from the control unit 11 by a predetermined compressing coding method during the period from the start of storage until the end of storage to generate compressed right sound data, compressed left sound data, and compressed rear sound data.

The codec 18 carries out time-division multiplexing to generate video data while generating compressed image data, compressed right sound data, compressed left sound data, and compressed rear sound data, and sends generated video data to the control unit 11.

If video data is provided from the codec 18, the control unit 11 generates header data in which attribute information of video data (hereinafter, also called video attribute information) is stored. The control unit 11 adds header data to the header of video data to generate a video file.

Actually, if video data is provided from the codec 18, at that time, the control unit 11 generates identification information (for example, a file name) for individually identifying a video file generated on the basis of video data. In the following description, the identification information for individually identifying the video file is also called file identification information.

The control unit 11 counts current date and time by an internal timer. The control unit 11 detects date and time at the time of the start of storage as imaging date and time at which the subject was imaged for storage.

The control unit 11 sequentially detects the position of the digital video camera 10 at the generation timing of unit image data while communicating with a satellite for GPS through a GPS (Global Positioning System) receiver 25 during the period from the start of storage until the end of storage.

The position of the digital video camera 10 which is sequentially detected at the time of imaging storage is expressed by latitude and longitude. In the following description, the position of the digital video camera 10 which is sequentially detected at the time of imaging storage is also called an imaging position.

The control unit 11 sequentially detects the direction of the imaging lens 13A (that is, the incidence surface of imaging light L1) of the digital video camera 10 at the generation timing of unit image data by a direction sensor 26 during the period from the start of storage until the end of storage.

The direction of the imaging lens 13A of the digital video camera 10 which is sequentially detected at the time of imaging storage is expressed by east, west, south, and north. In the following direction, the direction of the imaging lens 13A of the digital video camera 10 which is sequentially detected at the time of imaging storage is also called an imaging direction. In the following description, the side toward which the imaging lens 13A of the digital video camera 10 is directed is also called a camera front side.

If a set of imaging position and imaging direction is sequentially detected at the generation timing of unit image data, the control unit 11 associates the set of detected imaging position and imaging direction with the time information added to unit image data generated at the time of detection.

The control unit 11 stores the file identification information as video attribute information and imaging date-and-time information representing the imaging date and time in header data added to video data when a video file is generated. The control unit 11 stores imaging position/direction information representing a plurality of sets of imaging positions and imaging directions and associated time information in header data as video attribute information.

If the subject is imaged and the video file is generated, the control unit 11 sends the generated video file to the storage/reproduction unit 27, and the storage/reproduction unit 27 stores the video file in the storage medium 28. Examples of the subject imaged by the digital video camera 10 include living things, such as person, animal, and insect, natural objects, such as mountain, river, and sea, artifacts, such as constructions and exhibits, and the like.

The storage/reproduction unit 27 is, for example, a hard disk drive which is incorporated into the digital video camera 10, and the storage medium 28 is a hard disk which is provided in the hard disk drive.

Meanwhile, if the user operates the mode switching key in the imaging mode to instruct to switch the operation mode to the reproduction mode, the control unit 11 changes the operation mode from the imaging mode to the reproduction mode in accordance with the instruction.

If the user operates the reproduction key in the reproduction mode to instruct to reproduce a desired video file, the control unit 11 reads the video file selected by the user from the storage medium 28 through the storage/reproduction unit 27. The control unit 11 loads video data from the video file and sends loaded video data to the codec 18.

If video data is provided from the control unit 11, the codec 18 separates video data into compressed image data, compressed right sound data, compressed left sound data, and compressed rear sound data, and decompresses and decodes compressed image data to generate original storage motion image data.

The codec 18 decompresses and decodes compressed right sound data, compressed left sound data, and compressed rear sound data to generate original right sound data, left sound data, and rear sound data. The codec 18 sends storage motion image data, right sound data, left sound data, and rear sound data to the control unit 11.

If storage motion image data, right sound data, left sound data, and rear sound data are provided from the codec 18, the control unit 11 sends storage motion image data to the display unit 17. The control unit 11 generates right channel data and left channel data for stereo sound on the basis of right sound data, left sound data, and rear sound data, and sends right channel data and left channel data to a sound processing section 29. Thus, the control unit 11 displays the storage motion image based on storage motion image data on the display unit 17.

The sound processing section 29 carries out predetermined sound processing, such as digital-to-analog conversion processing and amplification processing, for right channel data and left channel data provided from the control unit 11. The sound processing section 29 sends a right channel signal and a left channel signal for stereo sound obtained by the sound processing to a pair of stereo speakers 30 and 31, for example.

Thus, the control unit 11 outputs stereo sound based on the right channel signal and the left channel signal through a pair of speakers 30 and 31 in synchronization with display of the storage motion image. In this way, the control unit 11 can allow the user to watch the storage motion image generated and stored while imaging the subject along with sound (stereo sound) around the digital video camera 10 stored at the time of imaging.

[2-2 Imaged Person Specification Processing]

Next, imaged person specification processing will be described in which, when a person as a subject is imaged and a video file is stored in the storage medium 28, who is imaged as a subject is determined on the basis of the video file.

For example, if the user operates the power key to instruct to power off after a subject is imaged for storage in the imaging mode and a video file is stored in the storage medium 28, the control unit 11 carries out the imaged person specification processing every time.

Figure 3:
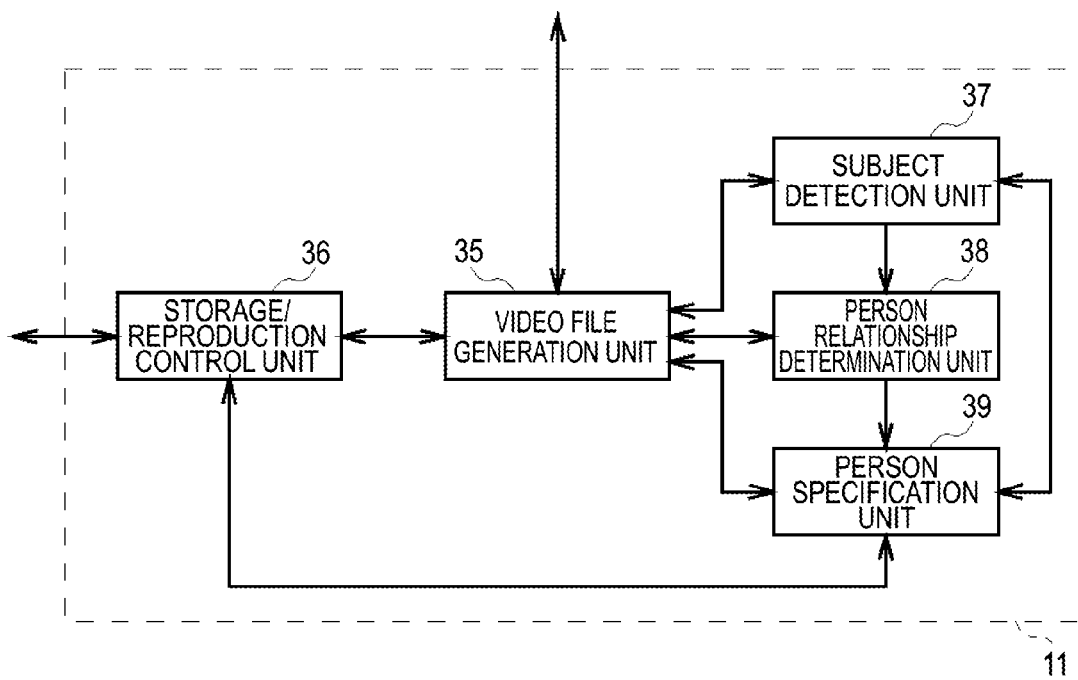
FIG. 3 is a block diagram showing the circuit configuration by functional circuit blocks for description of the functions of a control unit.

At that time, the control unit 11 carries out various kinds of processing as the imaged person specification processing in accordance with an imaged person specification program stored in advance in the internal memory to realize various functions. In the following description, for convenience, various functions which are realized by the control unit 11 in accordance with the imaged person specification program are referred to as functional circuit blocks in FIGS. 3 to 5, and various kinds of processing which are carried out by the control unit 11 are referred to as processing to be carried out by the functional circuit blocks.

If power-off is instructed, a video file generation unit 35 sequentially notifies the file identification information of one or a plurality of video files stored in the storage medium 28 to a storage/reproduction control unit 36 during a sequence of operations from the instruction of power-on until the immediate instruction of power-off.

Each time the file identification information is notified from the video file generation unit 35, the storage/reproduction control unit 36 reads a video file identified by the notified file identification information from the storage medium 28 through the storage/reproduction unit 27. The storage/reproduction control unit 35 sends the video file to the video file generation unit 35.

Each time the video file is provided from the storage/reproduction control unit 36, the video file generation unit 35 loads video data from the video file and sends loaded video data to the codec 18. The video file generation unit 35 also loads header data added to the header of video data from the video file.

At this time, the codec 18 generates original storage motion image data and original right sound data, left sound data, and rear sound data on the basis of video data provided from the video file generation unit 35 in the same manner as in the reproduction mode. The codec 18 sends storage motion image data, right sound data, left sound data, and rear sound data to the video file generation unit 35.

Each time the video file is read in such a manner, the video file generation unit 35 obtains original storage motion image data, right sound data, left sound data, and rear sound data by using the codec 18.

Each time storage motion image data, right sound data, left sound data, and rear sound data are obtained in such a manner, the video file generation unit 35 sends storage motion image data to a subject detection unit 37 along with the imaging position/direction information stored in header data. The video file generation unit 35 also sends header data to the person specification unit 39.

As described above, when a person in the storage motion image based on storage motion image data is detected, the video file generation unit 35 sends storage motion image data to a person relationship determination unit 38 along with right sound data, left sound data, and rear sound data.

Figure 4:
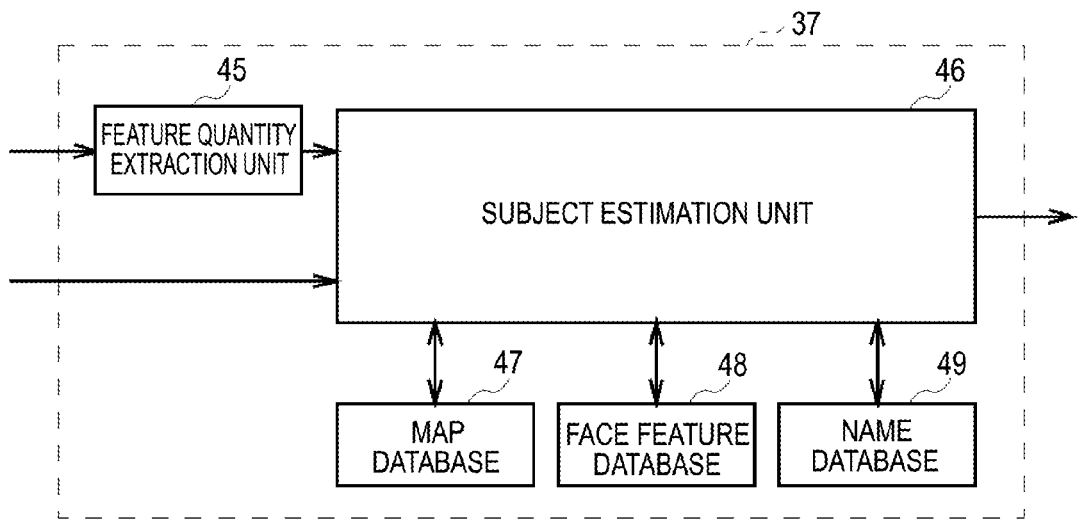
FIG. 4 is a block diagram showing the circuit configuration by functional circuit blocks of a subject detection unit.

As shown in FIG. 4, the subject detection unit 37 carries out subject detection processing by analyzing the storage motion image to detect the subject as part of the imaged person specification processing. Actually, each time storage motion image data is provided from the video file generation unit 35, the subject detection unit 37 loads storage motion image data into a feature quantity extraction unit 45. At this time, the subject detection unit 37 also loads the imaging position/direction information provided from the video file generation unit 35 along with storage motion image data into a subject estimation unit 46.

For each piece of unit image data constituting storage motion image data, the feature quantity extraction unit 45 carries out feature quantity extraction processing for extracting the feature quantity of the image from the unit image based on unit image data. Actually, the feature quantity extraction unit 45 stores face information representing the rough luminance distribution of the face of the person and the pattern of the rough structure of the face. Thus, the feature quantity extraction unit 45 retrieves one or a plurality of regions (hereinafter, also called postulated regions) postulated to be the face of the person in the unit image on the basis of the face information.

If one or a plurality of postulated regions are detected in the unit image, for each detected postulated region, the feature quantity extraction unit 45 generates region position information representing the position of the postulated region in the unit image. For each postulated region of the unit image, the feature quantity extraction unit 45 extracts, for example, the shapes of a plurality of outlines, the positional relationship between a plurality of outlines, and the colors from the postulated region as the feature quantity of the image. In the following description, the feature quantity of the image extracted from each postulated region of the unit image is specifically called a postulated region feature quantity.

If the postulated region feature quantity is extracted from one or a plurality of postulated regions of the unit image in such a manner, for each postulated region, the feature quantity extraction unit 45 generates postulated region information by associating the postulated region feature quantity extracted from the postulated region and the region position information representing the position of the postulated region.

If one or a plurality of postulated regions are detected, the feature quantity extraction unit 45 extracts, for example, the shapes of a plurality of outlines, the positional relationship between a plurality of outlines, and the colors from a portion excluding one or a plurality of postulated regions of the unit image as the feature quantity of the image. In the following description, the portion excluding one or a plurality of postulated regions in the unit image is also called an out-of-postulated region portion.

If all of the postulated regions are not detected in the unit image, the feature quantity extraction unit 45 extracts, for example, the shapes of a plurality of outlines, the positional relationship between a plurality of outlines, and the colors from the entire unit image as the feature quantity of the image. In the following description, the feature quantity of the image extracted from the out-of-postulated region portion of the unit image and the feature quantity of the image extracted from the entire unit image are specifically collectively called an out-of-region feature quantity.

The feature quantity extraction unit 45 sequentially compares each pixel in the unit image with ambient pixels to retrieve a series of pixels of the same color, for example. If a series of pixels of the same color is detected in the unit image, the feature quantity extraction unit 45 detects whether a series of pixels is a character string or not by, for example, a character recognition method.

As a result, if one or a plurality of character strings in the unit image are detected, the feature quantity extraction unit 45 extracts the character strings as text. That is, the feature quantity extraction unit 45 extracts one or a plurality of character strings drawn on a sign, a banner, or a name tag in the unit image from the unit image as text.

If one or a plurality of character strings are extracted from the unit image, for each extracted character string, the feature quantity extraction unit 45 generates character string extraction information by associating each character string (that is, text) with extraction position information representing the extraction position of the character string in the unit image.

In this way, if the out-of-region feature quantity or the postulated region feature quantity and the character string are extracted from the unit image, the feature quantity extraction unit 45 sends the out-of-region feature quantity or the postulated region information and the character string extraction information to the subject estimation unit 46 along with the time information corresponding to the unit image used for extraction.

The subject detection unit 37 stores a map database 47 and a face feature database 48 for use in estimation of the subject in the storage motion image in advance. The subject detection unit 37 also stores a name database 49 for detecting the name of an event (hereinafter, also called an event name) or the name of a person in the storage motion image as a character string in advance.

The map database 47 registers, for example, location information representing the location (the position expressed by latitude and longitude) of an imaging target other than a person, such as foreign or domestic construction, exhibit, landscape, or the like, in advance. The map database 47 also registers place name information representing the place name of the location of the imaging target as a character string (that is, text) in association with the location information representing the location of the imaging target.

The map database 47 also registers imaging target name information representing the name of the imaging target (hereinafter, also called an imaging target name) as a character string (that is, text) in association with the location information representing the location of the imaging target.

The map database 47 also registers the imaging target feature quantity (the shapes or patterns, the positional relationship therebetween, the colors, and the like) generated on the basis of the image of the imaging target in association with the location information representing the location of the imaging target. The imaging target feature quantity is generated, for example, through learning based on the feature quantity of the image extracted from a plurality of images of the imaging target.

The face feature database 48 registers a plurality of types of feature quantities (hereinafter, also called a face detection feature quantity) for use in detection of the face of the man or woman in the storage motion image in advance. The face detection feature quantity includes information regarding the shapes of the face, eye, nose, mouth, eyebrow, and the like, the positional relationship therebetween, and the like.

The face detection feature quantity for use in detection of the face of the man is generated, for example, through learning based on the feature quantity of the image extracted from the images of the faces of multiple men by age. The face detection feature quantity for use in detection of the face of the woman is generated, for example, through learning based on the feature quantity of the image extracted from the faces of multiple women by age.

The name database 49 registers the event names of various events, such as entrance ceremony, graduation ceremony, sports day, and recital, and a plurality of kinds of name information representing the names of multiple people as a character string (that is, text) in advance.

If the out-of-region feature quantity is provided from the feature quantity extraction unit 45 along with the time information, the subject estimation unit 46 selects a set of imaging position and imaging direction associated with the time information from among a plurality of sets of imaging positions and imaging directions represented by the imaging position/direction information.

The subject estimation unit 46 sets a search range for searching an imaging target, which can be imaged by the set of imaging position and imaging direction, by using the selected set of imaging position and imaging direction. At this time, the subject estimation unit 46 defines as the search range, for example, a fan-like range which is gradually widened in the imaging direction at a predetermined radius and a predetermined center angle with the imaging position as the center point.

The subject estimation unit 46 compares the search range with the location information in the map database 47, and determines whether or not there is an imaging target which can be imaged by the set of imaging position and imaging direction selected at this time.

As a result, if location information representing a location in the search range is detected in the map database 47, the subject estimation unit 46 determines that there is an imaging target which can be imaged by the set of imaging position and imaging direction used in setting the search range.

In other words, when location information is detected on the basis of the search range, the subject estimation unit 46 determines that an imaging target is likely to be imaged and the imaging target is likely to be in the unit image as the subject.

If there is an imaging target which can be imaged by the set of imaging position and imaging direction, the subject estimation unit 46 reads the imaging target feature quantity associated with the detected location information from the map database 47.

The subject estimation unit 46 carries out predetermined arithmetic processing on the basis of the out-of-region feature quantity and the imaging target feature quantity. Thus, the subject estimation unit 46 calculates accuracy representing how much a subject in the entire unit image or in the out-of-postulated-region portion is probable as the imaging target represented by the imaging target feature quantity.

The subject estimation unit 46 compares the calculated accuracy with a first threshold value selected in advance. As a result, if the accuracy is equal to or greater than the first threshold value, the subject estimation unit 46 estimates the subject in the entire unit image or the out-of-postulated-region portion is the imaging target represented by the imaging target feature quantity. That is, the subject estimation unit 46 detects the imaging target in the entire unit image or the out-of-postulated-region portion as the subject.

In contrast, if the accuracy is smaller than the first threshold value, the subject estimation unit 46 determines that the subject in the entire unit image or the out-of-postulated-region portion is not the imaging target represented by the imaging target feature quantity.

If the imaging target is, for example, a construction, such as a building or a bridge, a sign or a plate on which the imaging target name is drawn may be attached to the imaging target. If the imaging target is, for example, a landscape which can be regarded as a tourist spot, a sign or a plate on which the imaging target name is drawn may be provided at a place having a view of the imaging target.

Thus, if one or a plurality of kinds of character string extraction information is provided from the feature quantity extraction unit 45 along with the out-of-region feature quantity and the time information at this time, the subject estimation unit 46 compares the character string represented by the character string extraction information with the imaging target name represented by the imaging target name information by a character matching method.

As a result, if the character string represented by the character string extraction information coincides with the imaging target name represented by the imaging target name information, the subject estimation unit 46 determines again that the subject in the entire unit image or the out-of-postulated-region portion is the imaging target represented by the imaging target feature quantity.

That is, if the imaging target name is in the unit image, the imaging target also appears along with the imaging target name, but the imaging target maybe under the shadow of another subject (for example, a person) and may be scarcely seen.

For this reason, even when it is determined that no imaging target is in the unit image, if it is detected that the imaging target name representing the imaging target is in the unit image, the subject estimation unit 46 estimates again that the subject in the unit image is the imaging target. That is, the subject estimation unit 46 detects the imaging target as the subject in the entire unit image or the out-of-postulated-region portion.

If the imaging target in the unit image is detected in such a manner, the subject estimation unit 46 reads the imaging target name information and the place name information corresponding to the location information detected at this time from the map database 47 and associates the imaging target name information and the place name information with the time information of the unit image.

If any character string represented by the character string extraction information does not coincide with the imaging target name represented by the imaging target name information, the subject estimation unit 46 determines again that the subject in the entire unit image or the out-of-postulated-region portion is not the imaging target represented by the imaging target feature quantity.

Meanwhile, if the location information representing the location in the search range is unable to be detected in the map database 47, the subject estimation unit 46 determines that there is no imaging target which can be imaged by the set of imaging position and imaging direction used in setting the search range.

In other words, when the location information is unable to be detected on the basis of the search range, the subject estimation unit 46 determines that the imaging target is in the unit image as the subject since the imaging target is not imaged.

If there is no imaging target which can be imaged by the set of imaging position and imaging direction, the subject estimation unit 46 does not read the imaging target feature quantity from the map database 47. Thus, even when the out-of-region feature quantity is provided from the feature quantity extraction unit 45 along with the time information at this time, the subject estimation unit 46 does not carry out processing for detecting the subject in the entire unit image or the out-of-postulated-region portion.

If the out-of-region feature quantity is provided from the feature quantity extraction unit 45 along with the time information in such a manner, the subject estimation unit 46 carries out processing in the same manner every time to appropriately detect the imaging target as the subject in the entire unit image or the out-of-postulated-region portion.

If one or a plurality of kinds of postulated region information are provided from the feature quantity extraction unit 45 along with the time information, the subject estimation unit 46 reads a plurality of types of face detection feature quantity from the face feature database 48. The subject estimation unit 46 carries out arithmetic processing on the basis of the face detection feature quantity and the postulated region feature quantity represented by the postulated region information by using a plurality of types of face detection feature quantities in sequence.

Thus, for each postulated region of the unit image, the subject estimation unit 46 calculates a plurality of accuracies representing how much a subject in the postulated region is probable as the face of the man or woman by age. The subject estimation unit 46 compares a plurality of accuracies calculated for each postulated region with a second threshold value selected in advance.

As a result, if at least one of a plurality of accuracies calculated for any postulated region of the unit image is equal to or greater than the second threshold value, the subject estimation unit 46 estimates that the subject in the postulated region of the unit image is the face of the person.

At this time, if only one of a plurality of accuracies is equal to or greater than the second threshold value, the subject estimation unit 46 estimates the subject as the face of a man or woman in a certain age, for example, as the face of a man in his twenties or the face of a woman in her forties in accordance with the type of face detection feature quantity used in calculating the accuracy.

If two or more accuracies from among a plurality of accuracies are equal to or greater than the second threshold value, the subject estimation unit 46 selects the maximum accuracy from among the accuracies equal to or greater than the second threshold value. The subject estimation unit 46 estimates the subject as the face of a man or woman in a certain age in accordance with the type of face detection feature quantity used in calculating the maximum accuracy in the same manner.

That is, the subject estimation unit 46 detects the face of the person in the postulated region of the unit image, such that the person in the unit image is detected while the age and sex are specified. If the face of the person in the postulated region of the unit image is detected, the subject estimation unit 46 associates age/sex information representing the age and sex of the person specified by the detection with the time information provided from the feature quantity extraction unit 45 at this time.

If the face of the person in the postulated region of the unit image is detected, the subject estimation unit 46 associates the postulated region feature quantity extracted from the postulated region as the feature quantity of the face of the person with the time information provided from the feature quantity extraction unit 45 at this time. In the following description, the feature quantity of the face of the person is also called person face feature quantity.

If a plurality of accuracies calculated for any postulated region of the unit image are all smaller than the second threshold value, the subject estimation unit 46 determines that the subject in the postulated region of the unit image is not the face of the person. That is, the subject estimation unit 46 determines that no person is in the unit image.

If it is determined that the subject in any postulated region of the unit image is not the face of the person, the subject estimation unit 46 discards the postulated region feature quantity extracted from the postulated region without setting as the person face feature quantity.

If one or a plurality of kinds of postulated region information is provided from the feature quantity extraction unit 45 along with the time information in such a manner, the subject estimation unit 46 carries out processing in the same manner every time to appropriately detect the face of the person in the postulated region of the unit image, such that the person in the unit image is detected.

If one or a plurality of kinds of character string extraction information are provided from the feature quantity extraction unit 45 along with the time information, the subject estimation unit 46 reads the name information from the name database 49. The subject estimation unit 46 compares the character string represented by the character string extraction information with the event name or the name of the person represented by the name information by a character matching method.

Thus, the subject estimation unit 46 detects whether one or a plurality of character strings in the unit image are the event name or the name of the person. That is, when a banner or a sign on which an event name is drawn is in the unit image, or if a name tag on which the name of a child or adult is written is in the unit image, the subject estimation unit 46 can detect the event name or the name of the person.

If one or a plurality of kinds of character string extraction information are provided from the feature quantity extraction unit 45 along with the time information in such a manner, the subject estimation unit 46 carries out processing in the same manner every time to appropriately detect the event name or the name of the person in the unit image.

If an imaging target as a subject in the storage motion image is detected, the subject estimation unit 46 generates imaging target detection information representing the detected imaging target on the basis of the imaging target name information and the place name information associated with the time information of the unit image.

At this time, the subject estimation unit 46 stores, in the imaging target detection information, the imaging target name information and the place name information corresponding to the detected imaging target. The subject estimation unit 46 also stores, in the imaging target detection information, imprint period information which represents one or a plurality of imprint periods in which an imaging target is in the storage motion image by the time information of the unit image at the head of the imprint period and the time information of the unit image at the tail of the imprint period.

If one person or multiple people as a subject in the storage motion image are detected on the basis of the face of the person, the subject estimation unit 46 sequentially compares the person face feature quantity associated with the time information of the unit image and classifies the person face feature quantity for each person.

The subject estimation unit 46 detects a unit image with the face of the same person on the basis of the classification result. The subject estimation unit 46 generates face detection information representing the person detected on the basis of the face for each person with the person face feature quantity classified.

At this time, the subject estimation unit 46 stores, in the face detection information, the person face feature quantity representing the face of the person and the age/sex information representing the age and sex of the person as information representing a person. The subject estimation unit 46 stores, in the face detection information, postulated position information representing the position of the postulated region where the person face feature quantity is extracted in the unit image at the head of the imprint period.

The subject estimation unit 46 stores, in the face detection information, imprint period information which represents one or a plurality of imprint periods in which the face of the person is in the storage motion image by the time information of the unit image at the head of the imprint period and the time information of the unit image at the tail of the imprint period.

If it is detected that the character strings of event names are in the storage motion image, for each event name, the subject estimation unit 46 generates event name detection information representing the detected event name. At this time, the subject estimation unit 46 stores the event name information representing the event name as a character string in event name detection information.

The subject estimation unit 46 also stores, in the event name detection information, imprint period information which represents one or a plurality of imprint periods in which an event name is in the storage motion image by the time information of the unit image at the head of the imprint period and the time information of the unit image at the tail of the imprint period.

If it is detected that the character strings of the names of the people are in the storage motion image, for each of the names of the people, the subject estimation unit 46 generates name detection information representing the detected name of the person.

At this time, the subject estimation unit 46 stores, in the name detection information, the character string representing the name of the person and extraction position information representing the extraction position of the character string in each of a plurality of unit images in one or a plurality of imprint periods with the name of the person.

The subject estimation unit 46 also stores, in the name detection information, imprint period information which represents one or a plurality of imprint periods in which the name of the person is in the storage motion image, by the time information of the unit image at the head of the imprint period and the time information of the unit image at the tail of the imprint period.

If an imaging target in the storage motion image is detected, the subject estimation unit 46 sends the thus generated imaging target detection information (or event name detection information) to the person specification unit 39.

If a person in the storage motion image is detected, the subject estimation unit 46 sends the thus generated face detection information or name detection information and the event name detection information to the person relationship determination unit 38.

In this way, each time storage motion image data is provided from the video file generation unit 35, the subject detection unit 37 obtains the imaging target detection information, the face detection information, or the name detection information, and sends the obtained information to the person specification unit 39 or the person relationship determination unit 38.

If the imaging target detection information or the face detection information, the event name detection information, and the name detection information are generated in such a manner, the subject estimation unit 46 sends the generated imaging target detection information or event name detection information to the person specification unit 39. At this time, the subject estimation unit 46 sends the face detection information or the name detection information to the person relationship determination unit 38.

In this way, each time storage motion image data is provided from the video file generation unit 35, the subject detection unit 37 obtains the imaging target detection information or event name detection information and the face detection information or name detection information and sends the obtained information to the person specification unit 39 or the person relationship determination unit 38.

Figure 5:
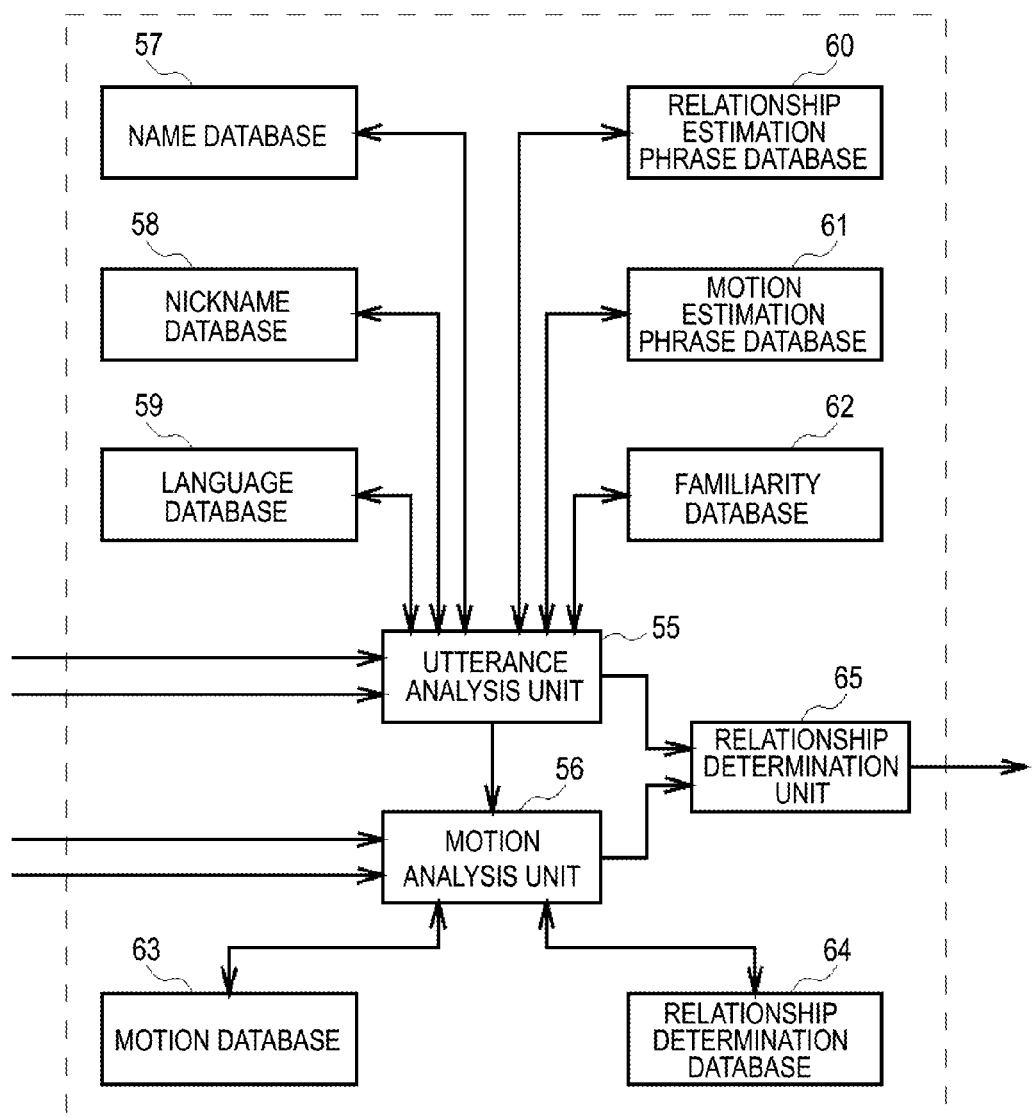
FIG. 5 is a block diagram showing the circuit configuration by functional circuit blocks of a person relationship determination unit.

As shown in FIG. 5, if one person or multiple people in the storage motion image are detected by the subject detection unit 37, the person relationship determination unit 38 carries out person relationship determination processing for determining the relationship between the people as part of the imaged person specification processing on the basis of the utterances and motions of the imaged people.

In this case, the person relationship determination unit 38 also loads the name detection information provided from the subject estimation unit 46 into an utterance analysis unit 55. The person relationship determination unit 38 requests the video file generation unit 35 for right sound data, left sound data, and rear sound data, and as a result, loads right sound data, left sound data, and rear sound data provided from the video file generation unit 35 into the utterance analysis unit 55.

The person relationship determination unit 38 also loads the face detection information provided from the subject estimation unit 46 into a motion analysis unit 56. The person relationship determination unit 38 requests the video file generation unit 35 for storage motion image data, and as a result, loads storage motion image data provided from the video file generation unit 35 into the motion analysis unit 56.

The person relationship determination unit 38 also stores in advance a name database 57 which is used to estimate the name of the person imaged as a subject from an utterance during imaging storage. The person relationship determination unit 38 stores in advance a nickname database 58 which is used to estimate the nickname of the person imaged as a subject from an utterance during imaging storage.

The person relationship determination unit 38 also stores in advance a language database 59 which is used to detect a language (standard language or dialect) uttered by the person imaged as a subject from an utterance during imaging storage.

The person relationship determination unit 38 also stores in advance a database 60 which registers phrases for use in estimating the relationship between multiple people imaged as a subject from an utterance during imaging storage.

In the following description, the phrases for use in estimating the relationship between multiple people in the storage motion image, such as family or relation, friend, or couple, are also called relationship estimation phrases. In the following description, the database 60 which registers the relationship estimation phrases is also called a relationship estimation phrase database 60.

The person relationship determination unit 38 also stores in advance a database 61 which registers phrases for use in estimating the motion of a person imaged as a subject from an utterance during imaging storage.

In the following description, the phrases for use in estimating the motion are also called motion estimation phrases. In the following description, the database 61 which registers the motion estimation phrases is also called a motion estimation phrase database 61.

The person relationship determination unit 38 also stores in advance a familiarity database 62 which is used to determine familiarity between multiple people imaged as a subject from an utterance during imaging storage.

The person relationship determination unit 38 also stores in advance a motion database 63 which is used to estimate various motions, such as "hug", "piggyback", "fold arms", "nod", and "hands up", by a person imaged as a subject during imaging storage.

The person relationship determination unit 38 also stores in advance a relationship determination database 64 which is used to determine the relationship between multiple people by the motion of at least one person from among multiple people imaged as a subject during imaging storage.

The name database 57 registers in advance a plurality of kinds of name information in which a plurality of names of the people are represented by character strings (that is, text). The name database 57 also registers suffix information in which suffixes, such as "KUN", "SAN", and "CHAN", which are attached when the name of the person is called are represented by character strings (that is, text).

The nickname database 58 registers in advance a plurality of kinds of nickname information in which a plurality of nicknames of the people are represented by character strings (that is, text). The language database 59 registers in advance a plurality of kinds of dialect information in which the dialect words of various phrases, such as proper names or strains, are represented by character strings (that is, text) and standard language information in which the standard-language words of various phrases, such as proper names or strains are represented by character strings (that is, text) in the standard language.

The relationship estimation phrase database 60 registers in advance a plurality of kinds of relationship estimation phrase information in which the nominal designations of other party, such as "mommy", "mother", "daddy", "grandma", and "brother", are represented by character strings (that is, text) as the relationship estimation phrases.

The motion estimation phrase database 61 registers in advance a plurality of kinds of motion estimation phrase information in which phrases, such as "hug", "piggyback", and "ride on shoulders", are represented by character strings (that is, text) as the motion estimation phrases.

As shown in FIG. 6, the familiarity database 62 registers in advance items CO representing a plurality of ways of speaking for determining how much a person is in the favor of another party from a conversation with categories CA including "language" "honorific title of name", "strain", "person relationship", and the like.

In the following description, the items CO representing the way of speaking registered in the familiarity database 62 are also called friendship determination items CO. The way of speaking represented by the friendship determination items CO indicates which language (dialect or standard language) a person uses during a conversation, and how a person calls the name of another party during a conversation (nickname or without honorific title).

The way of speaking represented by the friendship determination items CO also indicates which strain a person uses during a conversation, and how a person calls another person. The familiarity database 62 registers each friendship determination item CO in association with an evaluation value VA numerically representing a degree of friendship by the way of speaking represented by the friendship determination item CO.

The motion database 63 registers in advance a plurality of motion estimation data for use in estimating various motions, such as "hug" and "piggyback". Motion estimation data is generated for each motion, and stores motion name information representing the name of the motion and a motion model which serves as a comparison criterion for motion estimation.

As shown in FIG. 7, the relationship determination database 64 registers in advance motion name information MO representing the names of various motions of a person, such as "hug", "piggyback", "hold hands", and "put arms around each other".

The relationship determination database 64 registers in advance relationship information RE representing one or a plurality of relationships, such as "parent and child", "friends", and "couple", which are determined by individual motions, in association with the motion name information MO representing the names of the motions.

If right sound data, left sound data, and rear sound data are provided from the video file generation unit 35, the utterance analysis unit 55 carries out utterance analysis/relationship estimation processing for analyzing the utterance of each person on the basis of right sound data, left sound data, and rear sound data to estimate the relationship between the people.

Figure 8:
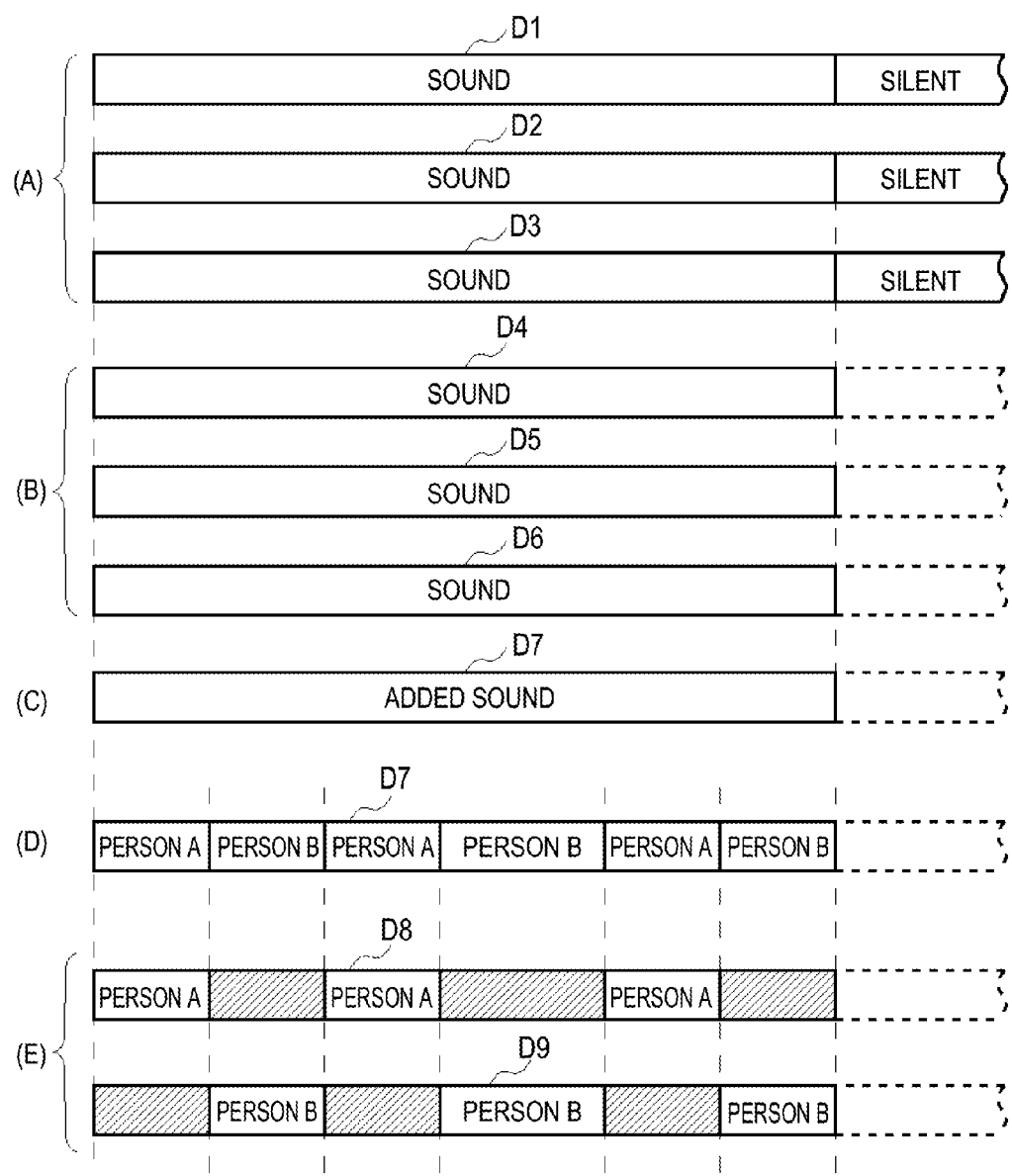
FIG. 8 shows schematic views for description of generation of utterance data.

In this case, as shown in FIG. 8, the utterance analysis unit 55 detects a switching position between a sound period and a silent period in each of right sound data D1, left sound data D2, and rear sound data D3 as time information, for example, on the basis of a sound level ((A) in FIG. 8).

The utterance analysis unit 55 extracts one or a plurality of sound periods as right sound period data D4, left sound period data D5, and rear sound period data D6 from right sound data D1, left sound data D2, and rear sound data D3 on the basis of the detected switching positions ((B) in FIG. 8).

The utterance analysis unit 55 carries out addition processing for right sound period data D4, left sound period data D5, and rear sound period data D6, for example, by a beam forming method while appropriately controlling the phase.

Thus, the utterance analysis unit 55 generates one or a plurality of added sound data D7 by appropriately amplifying sound uttered at various positions around the digital video camera 10 at the time of imaging storage ((C) in FIG. 8).

The utterance analysis unit 55 adds a plurality of kinds of time information from the head to the tail in right sound period data D4, left sound period data D5, and rear sound period data D6, which are the origin of added sound data D7, to individual predetermined unit portions from the head to the tail in added sound data D7 in that order.

The utterance analysis unit 55 detects the direction, in which the person who utters sound based on added sound data D7 stands, on the basis of presence/absence of phase control and the amount of control during the addition processing of right sound period data D4, left sound period data D5, and rear sound period data D6.

Actually, if the phases of right sound period data D4 and left sound period data D5 are not controlled during the addition processing, and the phase of rear sound period data D6 is advanced, the utterance analysis unit 55 detects that the person who utters sound based on added sound data D7 stands substantially at the center of the camera front side.

At this time, the utterance analysis unit 55 estimates that the person who utters sound based on added sound data D7 is a person who is imaged at the center of the camera front side.

If the phase of right sound period data D4 is advanced and the phase of rear sound period data D6 is further advanced during the addition processing, the utterance analysis unit 55 detects that the person who utters sound based on added sound data D7 stands on the left side from the center of the camera front side.

At this time, the utterance analysis unit 55 estimates that the person who utters sound based on added sound data D7 is a person who is imaged on the left side from the center of the camera front side.

If the phase of left sound period data D5 is advanced and the phase of rear sound period data D6 is further advanced during the addition processing, the utterance analysis unit 55 detects that the person who utters sound based on added sound data D7 stands on the right side from the center of the camera front side.

At this time, the utterance analysis unit 55 estimates that the person who utters sound based on added sound data D7 is a person who is imaged on the right side from the center of the camera front side.

If the phases of right sound period data D4 and left sound period data D5 are advanced by the substantially same amount during the addition processing, the utterance analysis unit 55 detects that the person who utters sound based on added sound data D7 stands at the center of the rear side of the digital video camera 10.

At this time, the utterance analysis unit 55 estimates that the person who utters sound based on added sound data D7 is a photographer (cameraman) who uses the digital video camera 10.

If the phase of left sound period data D5 is advanced and the phase of right sound period data D4 is further advanced during the addition processing, the utterance analysis unit 55 detects that the person who utters sound based on added sound data D7 stands on the left side of the digital video camera 10.

At this time, the utterance analysis unit 55 estimates that the person who utters sound based on added sound data D7 is a person who is not imaged on the left side of the digital video camera 10.

If the phase of right sound period data D4 is advanced and the phase of left sound period data D5 is further advanced during the addition processing, the utterance analysis unit 55 detects that the person who utters sound based on added sound data D7 stands on the right side of the digital video camera 10.

At this time, the utterance analysis unit 55 estimates that the person who utters sound based on added sound data D7 is a person who is not imaged on the right side of the digital video camera 10.

If the direction in which the person who utters sound based on added sound data D7 stands is detected in such a manner, the utterance analysis unit 55 detects the number of people who utter sound based on the added sound data D7 on the basis of the detection result of the direction.

When two or more people utter sound based on added sound data D7, the utterance analysis unit 55 further detects the switching positions of the sound periods uttered by the individual people in added sound data D7 as the time information on the basis of the detection result of the direction ((D) in FIG. 8).

In this way, the utterance analysis unit 55 detects, for example, added sound data D7 of sound which is uttered by a person who is imaged alone for self-introduction. The utterance analysis unit 55 detects added sound data D7 of sound during a conversation between multiple people imaged together.

The utterance analysis unit 55 also detects added sound data D7 of sound during a conversation between a person who is imaged and a person as a bystander or a photographer who is not imaged. In this way, with regard to one or a plurality of added sound data D7 generated at this time, the utterance analysis unit 55 detects a condition where sound constituting added sound data D7 is uttered on the basis of the detection result of the direction in which the person who utters sound stands.

In the following description, a person who is imaged is also appropriately called an imaged person. In the following description, like a photographer or a bystander, a person who utters sound stored as added sound data D7 but is not imaged is also appropriately called an imaging excluded person.

At this time, for example, if added sound data D7 of sound uttered by a single person alone for self-introduction is detected, the utterance analysis unit 55 defines added sound data D7 as utterance data (hereinafter, specifically called single utterance data) representing the contents of the utterance of the person.

At this time, if added sound data D7 of sound of a conversation uttered by multiple people is detected, the utterance analysis unit 55 extracts added sound data D7 into the sound periods of the individual people on the basis of the switching positions to generate utterance data D8 and D9 representing the contents of the utterances of the individual people ((E) in FIG. 8).

That is, the utterance analysis unit 55 generates utterance data D8 and D9, in which the sound periods one after another during the conversation are arranged, on the basis of added sound data D7 of the conversation between multiple people for the individual people. In the following description, the sound period of added sound data D7 of sound (that is, conversation) uttered by two or more people is specifically called a conversation period.

In the following description, the sound periods for the individual people which are extracted from added sound data D7 of the conversation are specifically called in-conversation utterance periods. In the following description, utterance data D8 and D9 for the individual people generated on the basis of the conversation between multiple people in such a manner are specifically called in-conversation data D8 and D9.

In this way, the utterance analysis unit 55 obtains single utterance data for each person or in-conversation utterance data D8 and D9 on the basis of added sound data D7 of sound uttered by each person alone for self-introduction or added sound data D7 of the conversation between multiple people.

If single utterance data of each person is obtained, the utterance analysis unit 55 sequentially analyzes single utterance data for each predetermined unit with the time information. Thus, the utterance analysis unit 55 generates character strings (that is, text) by audiotyping sound based on single utterance data.

If in-conversation utterance data D8 and D9 for the individual people are obtained, the utterance analysis unit sequentially analyzes the individual in-conversation utterance periods of in-conversation utterance data D8 and D9 for each predetermined unit with the time information. Thus, the utterance analysis unit 55 also generates character strings (that is, text) by audiotyping sound based on in-conversation utterance data D8 and D9 for each in-conversation utterance period.

In the following description, the character string of sound based on single utterance data is also called single utterance text. In the following description, all the character strings of sound based on in-conversation utterance data D8 and D9 are also called in-conversation utterance text, and the character strings of sound of in-conversation utterance data D8 and D9 for each in-conversation utterance period are also called period utterance text.

When single utterance text of a person is generated, the utterance analysis unit 55 adds the previously detected person direction information representing the direction, in which the person stands, to the generated single utterance text.

The utterance analysis unit 55 sequentially adds to a unit corresponding portion corresponding to a predetermined unit with the time information of single utterance data (that is, a portion where sound is audiotyped from the predetermined unit of single utterance data) in single utterance text the time information added to the predetermined unit.

When in-conversation utterance text of a person is generated, the utterance analysis unit 55 adds the previously detected person direction information representing the direction, in which the person stands, to the generated in-conversation utterance text.

The utterance analysis unit 55 also adds conversation period information, in which the conversation period of original added sound data D7 is represented by the time information at the head and tail of the conversation period, to the in-conversation utterance text for each person.

The utterance analysis unit 55 also sequentially adds the time information to unit corresponding portions with the time information of in-conversation utterance data D8 and D9 (that is, portions where sound is audiotyped from the predetermined unit) in-conversation utterance text in the same manner.

At this time, for each person in the conversation, the utterance analysis unit 55 detects the pitch of voice of the person in time series on the basis of in-conversation utterance data. For each person in the conversation, the utterance analysis unit 55 also detects the total time necessary for the conversation (that is, the sum of time of the individual in-conversation utterance periods) on the basis of the time information added to in-conversation utterance data representing the utterance of the person.

For each person, the utterance analysis unit 55 also detects the total number of characters included in the in-conversation utterance text representing the utterance of the person (that is, the total number of characters uttered in the conversation). For each person, the utterance analysis unit 55 divides the total number of characters uttered in the conversation by the total time necessary for the conversation to calculate the speed of the utterance.

Meanwhile, the utterance analysis unit 55 stores in advance dictionary data which is generated by listing words with word attribute information, such as parts of speech. Hence, when the single utterance text is generated, the utterance analysis unit 55 morphologically analyzes the single utterance text on the basis of dictionary data.

Thus, the utterance analysis unit 55 divides the single utterance text into morphemes (that is, the minimum unit having a meaning as a word) and associates the divided morphemes with word attribute information.

Even when the in-conversation utterance text is generated, the utterance analysis unit 55 morphologically analyzes the in-conversation utterance text in units of period utterance text on the basis of dictionary data. Thus, the utterance analysis unit 55 divides the individual period utterance text constituting the in-conversation utterance text into morphemes, and associates the divided morphemes with word attribute information.

When the single utterance text is obtained, the utterance analysis unit 55 uses the single utterance text alone in estimation processing described below for actually estimating the relationship between people during the utterance analysis/relationship estimation processing.

The utterance analysis unit 55 also uses the in-conversation utterance text in the estimation processing described below on the conversation basis (that is, text obtained from the same conversation together) during the utterance analysis/relationship estimation processing.

Hereinafter, a case will be described where the single utterance text is used in the estimation processing. Subsequently, a case will be described where the in-conversation utterance text is used in the estimation processing on the conversation basis.

When the single utterance text is used in the estimation processing, the utterance analysis unit 55 extracts various phrases (hereinafter, these are called words), such as noun, verb, suffix, and strain, from the single utterance text on the basis of the word attribute information associated with the morphemes.

The utterance analysis unit 55 reads a plurality of kinds of name information from the name database 57. The utterance analysis unit 55 compares various words extracted from the single utterance text with various names of the people represented by the name information by a character matching method.

Thus, when there is a word, which coincides with the names of the people registered in the name database 57, from among various words extracted from the single utterance text, the utterance analysis unit 55 detects the word as the name of the person.

Meanwhile, when the name of the person is detected on the basis of the single utterance text, if name detection information is provided from the subject estimation unit 46, the utterance analysis unit 55 loads imprint period information from the name detection information.

The utterance analysis unit 55 detects all of the unit corresponding portions related to the detected name of the person in the single utterance text and also detects the time information added to all of the detected unit corresponding portions.

The utterance analysis unit 55 detects the name utterance period, in which the name of the person detected at this time is uttered as sound, on the basis of the detected time information. The utterance analysis unit 55 compares the imprint period (that is, time information) represented by the imprint period information with the name utterance period (that is, time information).

As a result, if at least a part of the imprint period and the name utterance period overlap each other, the utterance analysis unit 55 compares the name (character string) of the person represented by the name detection information with the name of the person detected at this time by a character matching method.

Thus, if the name of the person represented by the name detection information and the detected name of the person coincide with each other, the utterance analysis unit 55 detects that the name detected at this time is drawn on the name tag worn by the person who is imaged.

In other words, the utterance analysis unit 55 detects that the name detected on the basis of the single utterance text is the self-uttered name of the person who is imaged. Then, the utterance analysis unit 55 specifies that the person who is imaged is the person with the name detected at this time.

If who is imaged (that is, the name) is specified in such a manner, the utterance analysis unit 55 generates specified person information representing the specified person. At this time, the utterance analysis unit 55 stores, in the specified person information, the name information in which the name of the person detected at this time is represented by a character string (that is, text) and the name utterance period information in which the name utterance period is represented by the time information.

The utterance analysis unit 55 also stores, in the specified person information, the imprint period information, which represents the imprint period, in which the character string representing the name of the specified person is in the storage motion image, by the time information at the head and tail of the imprint period, on the basis of the name detection information.

The utterance analysis unit 55 also stores, in the specified person information, the extraction position information which represents the extraction position of the character string representing the name of the specified person in the unit image of the imprint period. The utterance analysis unit 55 sends the specified person information to the motion analysis unit 56.

A person who is imaged alone may utter his/her own name during imaging or may utter the name of another person. For this reason, it is difficult for the utterance analysis unit 55 to specify whether the name is the name of the person who is imaged or the name of another person only by detecting the name of the person on the basis of the single utterance text.

Thus, in detecting the name of the person on the basis of the single utterance text, if the name detection information is not provided from the subject estimation unit 46, the utterance analysis unit 55 does not notify the detected name to the motion analysis unit 56.

Even when the name detection information is provided, if the time information of the imprint period and the time information of the name utterance period are different from each other, the utterance analysis unit 55 does not notify the detected name to the motion analysis unit 56. Further, if the name of the person represented by the name detection information does not coincide with the detected name of the person, the utterance analysis unit 55 does not notify the detected name to the motion analysis unit 56.

Meanwhile, the estimation processing is normally accompanied by processing which will be subsequently carried out, as described below. However, when the single utterance text is used in the estimation processing, since it is difficult to estimate the relationship between multiple people by the utterance of a single person, the utterance analysis unit 55 ends the processing using the single utterance text when the above-described processing is completed.

Next, a case will be described where a plurality of kinds of in-conversation utterance text obtained on the basis of the same conversation (that is, on the conversation basis) are used in the estimation processing. If a plurality of kinds of in-conversation utterance text obtained on the basis of the same conversation are used in the estimation processing, the utterance analysis unit 55 extracts words from each of a plurality of kinds of in-conversation utterance text on the basis of the word attribute information associated with the morphemes.

The utterance analysis unit 55 reads a plurality of kinds of name information and a plurality of kinds of suffix information from the name database 57. The utterance analysis unit 55 also reads a plurality of kinds of nickname information from the nickname database 58.

The utterance analysis unit 55 compares various words extracted from each in-conversation utterance text with various names of the people represented by the name information or various nicknames represented by the nickname information by a character matching method.

If there is a word, which coincides with the name of the person or the nickname registered in the name database 57 or the nickname database 58, from various words extracted from each in-conversation utterance text, the utterance analysis unit 55 detects the word as the name of the person or the nickname.

If the name of the person is detected on the basis of each in-conversation utterance text, the utterance analysis unit 55 compares the word immediately after the name with various suffixes represented by the suffix information by a character matching method.

Thus, the utterance analysis unit 55 detects whether the person calls the name without an honorific title or the person calls the name with a suffix, such as "KUN", "SAN", or "CHAN".

Meanwhile, the imaging excluded person may call a person (a child or an adult as an imaged person) who is imaged by his/her name or nickname so as to turn his/her face toward the digital video camera 10 at the time of imaging storage.

If imaging storage is made at an event, such as a entrance ceremony or a graduation ceremony, an organizer of the event or the like may call a person (a child or an adult as an imaged person) who is imaged by his/her name for introduction.

At the time of imaging storage, another person who is imaged together or another person who is not imaged together may be called by a person who is imaged by his/her name or nickname. A conversation between multiple people tends to be basically made alternately between the multiple people such that any person speaks to another person and another person replies.

For this reason, if the name of the person is detected on the basis of the in-conversation utterance text representing the utterance of any person, the utterance analysis unit 55 detects the name utterance period in the in-conversation utterance text including the detected name in the same manner as described above.

At this time, if the name detection information is provided from the subject estimation unit 46, the utterance analysis unit 55 compares the time information of the imprint period with the time information of the name utterance period in the same manner as described above. If at least a part of the imprint period and the name utterance period overlap each other, the utterance analysis unit 55 compares the name of the person represented by the name detection information with the detected name of the person by a character matching method.

If the name of the person represented by the name detection information coincides with the detected name of the person, the utterance analysis unit 55 specifies a person who is imaged with a name tag on which the name represented by the name detection information is drawn as the person having the detected name. If who is the person (that is, name) is specified, the utterance analysis unit 55 generates the specified person information and sends the specified person information to the motion analysis unit 56 in the same manner as described above.

At this time, if the name detection information is not provided from the subject estimation unit 46, the utterance analysis unit 55 generates name utterance information representing the person who utters the name, along with the detected name.

At this time, the utterance analysis unit 55 stores, in the name utterance information, name information which represents the detected name of the person by a character string (that is, text) (if a suffix, such as "KUN" or "SAN", is attached, also represents that the suffix is attached). The utterance analysis unit 55 also stores, in the name utterance information, name utterance period information which represents the name utterance period by the time information.

The utterance analysis unit 55 also stores, in the name utterance information, person direction information representing a direction in which the person who utters the detected name stands. The utterance analysis unit 55 sends the name utterance information to the motion analysis unit 56.

Even when the name detection information is provided, if the time information of the imprint period and the time information of the name utterance period are different from each other, the utterance analysis unit 55 generates the name utterance information and sends the name utterance information to the motion analysis unit 56. Further, if the name of the person represented by the name detection information does not coincide with the detected name of the person, the utterance analysis unit 55 generates the name utterance information and sends the name utterance information to the motion analysis unit 56.

If a nickname is detected on the basis of any in-conversation utterance text, the utterance analysis unit 55 detects all of the unit corresponding portions related to the nickname in the in-conversation utterance text including the nickname and the attached time information.

The utterance analysis unit 55 detects a nickname utterance period, in which the nickname detected at this time is uttered as sound, on the basis of the detected time information. The utterance analysis unit 55 generates nickname utterance information representing the person who utters the nickname, along with the detected nickname.

At this time, the utterance analysis unit 55 stores, in the nickname utterance information, nickname information which represents the nickname detected at this time by a character string (that is, text) and nickname utterance period information which represents the nickname utterance period by the time information.

The utterance analysis unit 55 also stores, in the nickname utterance information, person direction information representing a direction in which the person who utters the detected nickname stands. The utterance analysis unit 55 sends the nickname utterance information to the motion analysis unit 56.

If the name of the person or the nickname is detected in such a manner, next, the utterance analysis unit 55 reads a plurality of kinds of dialect information and standard language information from the language database 59. The utterance analysis unit 55 compares various words extracted from each in-conversation utterance text with various dialect words represented by the dialect information or various standard-language words represented by the standard language information by a character matching method.

Thus, if there is a word, which coincides with the dialect word or the standard-language word registered in the language database 59, from among various words extracted from each in-conversation utterance text, the utterance analysis unit 55 detects the word as the dialect word or the standard-language word for estimation of the relationship between people.

The utterance analysis unit 55 reads a plurality of kinds of relationship estimation phrase information from the relationship estimation phrase database 60. The utterance analysis unit 55 compares various words extracted from each in-conversation utterance text with various relationship estimation phrases (the nominal designation of another party) represented by relationship estimation phrase information, such as "mommy", "mother", "daddy", "grandma", and "brother", by a character matching method.

Thus, if there is a word, which coincides with the relationship estimation phrase registered in the relationship estimation phrase database 60, from among various words extracted from each in-conversation utterance text, the utterance analysis unit 55 detects the word as the relationship estimation phrase for estimation of the relationship between people.

If the relationship estimation phrase is detected, the utterance analysis unit 55 detects all of the unit corresponding portions related to the detected relationship estimation phrase and the attached time information in the in-conversation utterance text including the detected relationship estimation phrase. The utterance analysis unit 55 detects a relationship utterance period, in which the relationship estimation phrase detected at this time is uttered as sound, on the basis of the detected time information.

The utterance analysis unit 55 generates relationship utterance information representing the person who utters the relationship estimation phrase, along with the detected relationship estimation phrase. At this time, the utterance analysis unit 55 stores, in the relationship utterance information, relationship estimation phrase information which represents the relationship estimation phrase detected at this time by a character string (that is, text) and relationship utterance period information which represents the relationship utterance period by the time information.

The utterance analysis unit 55 also stores, in the relationship utterance information, person direction information representing a direction in which the person who utters the detected relationship estimation phrase stands. The utterance analysis unit 55 sends the relationship utterance information to the motion analysis unit 56.

The utterance analysis unit 55 reads a plurality of kinds of motion estimation phrase information from the motion estimation phrase database 61. The utterance analysis unit 55 compares various words extracted from each in-conversation utterance text with motion estimation phrases represented by the motion estimation phrase information, such as "hug" and "piggyback", by a character matching method.

Thus, if there is a word, which coincides with the motion estimation phrase registered in the motion estimation phrase database 61, from among various words extracted from each in-conversation utterance text, the utterance analysis unit detects the word as the motion estimation phrase for estimation of the motion of the person, as described below.

If the motion estimation phrase is detected, the utterance analysis unit 55 detects all of the unit corresponding portions related to the detected motion estimation phrase and the attached time information in the in-conversation utterance text including the detected motion estimation phrase. The utterance analysis unit 55 detects a motion utterance period, in which the motion estimation phrase detected at this time is uttered as sound, on the basis of the detected time information.

The utterance analysis unit 55 generates motion utterance information representing the person who utters the motion estimation phrase, along with the detected motion estimation phrase. At this time, the utterance analysis unit stores, in the motion utterance information, motion estimation phrase information which represents the motion estimation phrase detected at this time by a character string (that is, text), and motion utterance period information which represents the motion utterance period by the time information. The utterance analysis unit 55 sends the motion utterance information to the motion analysis unit 56.

In this way, the utterance analysis unit 55 detects the name or nickname, the form of the honorific title of the name, dialect, strain, and the like on the basis of the in-conversation utterance text for each person. If the nickname, the form of the honorific title of the name, or the like is detected on the basis of the in-conversation utterance text for each person, the utterance analysis unit 55 classifies the detected nickname, the form of the honorific title of the name, or the like in terms of people and defines utterance information for detecting the way of speaking of the person.

At this time, for each person, the utterance analysis unit 55 detects the friendship determination item CO representing the way of speaking of the person from among a plurality of friendship determination items CO of the familiarity database 62 on the basis of the utterance information. For each person, the utterance analysis unit 55 reads all of the evaluation values VA corresponding to the friendship determination item CO representing the way of speaking of the person from the familiarity database 62.

In addition, the utterance analysis unit 55 estimates the feeling at the time of a conversation by using a probability model on the basis of the speed of the conversation and the pitch of voice described above for each person. A method of estimating the feeling at the time of the conversation for each person is described, for example, in the paper, Jack Breese & Gene Ball, "Bayesian Networks for Modeling Emotional State and Personality".

When a weighting function selected in advance for each category CA to which the friendship determination item CO belongs is ω, the evaluation value VA is v, and a friendship value representing how a person is in the favor of another party is K, for each person in the conversation, the utterance analysis unit 55 calculates the friendship value by sequentially weighting all of the evaluation values VA acquired on the basis of the way of speaking of the person in accordance with a corresponding weighting function and adding the weighted values as expressed by the following expression (1).

$$K = \Sigma v \times \omega \times e \tag{1}$$

In the expression (1), e denotes a feeling function and represents the feeling of the person at the time of a conversation.

If the friendship values are calculated for multiple people in the conversation, the utterance analysis unit 55 defines the friendship values as K(A) and K(B) respectively for two people from among the multiple people. When the familiarity between the two people is F(A,B), the utterance analysis unit 55 calculates the familiarity between the two people by multiplying the friendship values as expressed by the following expression (2).

$$F(A, B) = \frac{K(A) \times K(B)}{n(A) \times n(B)} \tag{2}$$

With regard to the utterance of each person in the conversation, the total number of words used in the utterance may not be identical, along with the temporal length. For this reason, the utterance analysis unit 55 normalizes the friendship values by the total number of words in the in-conversation utterance text of the two people.

In the expression (2), n (A) denotes the total number of words in the in-conversation utterance text of one person, and n(B) denotes the total number of words in the in-conversation utterance text of the other person.

In this way, for the multiple people in the conversation, the utterance analysis unit 55 sequentially calculates the familiarity between two people in a round robin manner. As the familiarity between the two people shown in the expression (2) has a larger value, this indicates that the two people are close to each other (that is, familiar with each other).

A method of calculating the familiarity between people is described, for example, in the paper, Nishihara Yoko, Sunayama Wataru, and Yachida Masahiko, "Estimation of Human Friendship and Hierarchical Relationship from Utterance Text".

If the familiarities are calculated for the multiple people in the conversation in a round robin method, the utterance analysis unit 55 generates familiarity information representing the familiarity. At this time, for each familiarity calculated by the expression (2), the utterance analysis unit 55 stores, in the familiarity information, the familiarity in association with person direction information representing two people between whom the familiarity obtains.

The utterance analysis unit 55 also stores, in the familiarity information, conversation period information attached to the in-conversation utterance text for each person. The utterance analysis unit 55 sends the familiarity information to the motion analysis unit 56 and a relationship determination unit 65.

In this way, when the in-conversation utterance text is generated on the conversation basis, with regard to the relationship between the people in the conversation, the utterance analysis unit 55 estimates how the people are close to each other (that is, how the people are familiar with each other). The utterance analysis unit 55 notifies the estimation result to the motion analysis unit 56 and the relationship determination unit 65 as the familiarity information.

Meanwhile, if storage motion image data is provided from the video file generation unit 35, the motion analysis unit carries out motion analysis/relationship estimation processing for analyzing the motion of each person on the basis of storage motion image data to estimate the relationship between the people.

In this case, the motion analysis unit 56 loads the imprint period information stored in the face detection information for each person provided from the subject estimation unit 46. The motion analysis unit 56 specifies, on the basis of the imprint period information, an imprint period in which a single person is detected (a single face appears) in the storage motion image based on storage motion image data or an imprint period in which multiple people are detected (multiple faces appear) in the storage motion image based on the storage motion image data.

If the imprint period in which a single person is detected is specified, the motion analysis unit 56 extracts a plurality of unit images of the specified imprint period from the storage motion image based on storage motion image data. If the imprint period in which multiple people are detected is specified, the motion analysis unit 56 extracts a plurality of unit images of the specified imprint period from the storage motion image based on storage motion image data.

The motion analysis unit 56 estimates the motion of the single person or the motions of the multiple people in a plurality of unit images of the imprint period on the basis of a plurality of unit images of the imprint period in which a signal person is detected or a plurality of unit images of the imprint period in which multiple people are detected.

If a plurality of unit images of the imprint period are extracted from the storage motion image, the motion analysis unit 56 specifies a postulated region, in which the person face feature quantity representing the face of the person is extracted, in the unit image at the head of the imprint period on the basis of the face detection information (that is, the postulated position information). That is, the motion analysis unit 56 specifies a postulated region, in which the face of the person appears, in the unit image at the head of the imprint period on the basis of the face detection information.

The motion analysis unit 56 detects a motion vector between the unit image at the head of the imprint period and the second unit image. The motion analysis unit 56 detects a person (that is, a portion where the body of a person including the detected face appears) in the head and second unit images on the basis of the detection result of the motion vector and the postulated region specified by the head unit image.

For the third unit image or later of the imprint period, the motion analysis unit 56 sequentially detects a motion vector concurrently with the person who is detected in the second unit image, and detects the same person who is in the third unit image or later on the basis of the detection result. In the following description, a person who is detected in a plurality of unit images of the imprint period is also called a detected person.

The motion analysis unit 56 binarizes each unit image, and extracts the outline for each detected person from each binarized unit image. For each detected person, the motion analysis unit 56 extracts a portion, in which the detected person appears, from each binarized unit image, along with the outline, and generates a silhouette image of the detected person.

Next, the motion analysis unit 56 carries out modeling and pose estimation for the body of each detected person as an articulated object represented by rotary joints and prismatic joints on the basis of the silhouette image generated from each unit image, and generates three-dimensional model data which represents the motion of the detected person in the imprint period in time series.

With regard to modeling and pose estimation of the body based on the silhouette image, errors may be included in observation or prediction for modeling and the pose estimation. Thus, at this time, the motion analysis unit 56 should carry out modeling and pose estimation for the body of the detected person in consideration of errors in observation or prediction for modeling and pose estimation.

For this reason, at this time, the motion analysis unit 56 uses an extended Kalman filter, which represents the errors by a probability distribution, in arithmetic processing for modeling and pose estimation of the body. In order to carry out the arithmetic processing using the extended Kalman filter, the motion analysis unit 56 predicts the motion of the person in advance and sets the probability for use in the arithmetic processing.

Thus, the motion analysis unit 56 carries out the arithmetic processing by the extended Kalman filter using the probability set in advance, such that the number of arithmetic operations for modeling and pose estimation of the body is reduced, reducing a processing load.

The motion analysis unit 56 carries out the arithmetic processing by the extended Kalman filter using the probability set in advance, such that accuracy of modeling of the body and accuracy of the pose estimation can be improved.

Actually, at this time, if one or a plurality of kinds of motion utterance information are provided from the utterance analysis unit 55, the motion analysis unit 56 compares the motion utterance period (that is, time information) represented by the motion utterance information and the imprint period (that is, time information) for estimating the motion of the detected person.

As a result, if the imprint period and one or a plurality of motion utterance periods overlap each other, the motion analysis unit 56 loads the stored motion estimation phrase information from one or a plurality of kinds of motion utterance information representing one or a plurality of motion utterance periods which overlap the imprint period.

That is, if a motion estimation phrase is uttered in the imprint period, since the detected person is highly likely to conduct the motion represented by the motion estimation phrase, the motion analysis unit 56 loads the motion estimation phrase (motion estimation phrase information) from the motion utterance information for estimation of the motion of the detected person.

The motion analysis unit 56 selects and sets the probability for the arithmetic processing in accordance with the motion estimation phrase. At this time, if the motion utterance information is not provided from the utterance analysis unit 55, the motion analysis unit 56 sets the probability selected in advance for the arithmetic processing.

In this state, each time a plurality of silhouette images (silhouette images generated from a plurality of unit images of the imprint period) are sequentially used in time series, the motion analysis unit 56 calculates the parameters for modeling and pose estimation of the detected person represented by the silhouette image.

Examples of the parameters for modeling and pose estimation of the body include the position, rotation angle, and bend angle of each of the rotary joints or prismatic joints corresponding to the shoulder or elbow of the body. In the following description, the rotation angle or bend angle of each of the rotary joints or prismatic joints are collectively called a joint angle.

Examples of the parameters for modeling and pose estimation of the body also include the position or length of a line segment connecting a rotary joint and a prismatic joint or a line segment connecting rotary joints corresponding to the lower arm or the upper arm, shin, or the like of the human body.

In the following description, a connection between a rotary joint and a prismatic joint or between rotary joints is also called a link, and the length of a line segment connecting the rotary joint and the prismatic joint or a line segment connecting the rotary joints is also called a link length.

The silhouette image is expressed two-dimensionally and a depth is unable to be observed. For this reason, it is difficult to uniquely calculate the three-dimensional slope or length (that is, parameter) for modeling and pose estimation from the silhouette image.

However, the modeling target is limited to the human body, thus the motion analysis unit 56 uniquely calculates the parameter in accordance with a constraint selected in advance under the limitation.

Examples of such a constraint include the variable maximum angle and minimum angle selected in advance for the joint angle of each of the rotary joints and the prismatic joints corresponding to wrist or elbow, shoulder, and the like, excluding a joint angle incapable of being viewed in the human body.

Examples of such a constraint also include the upper limit of the change in the joint angle per unit time selected for the joint angle of each of the rotary joints and the prismatic joints corresponding to wrist or elbow, shoulder, and the like, excluding the change in the joint angle per unit time incapable of being viewed in the human body.

Examples of such a constraint also include the maximum length and the minimum length selected in advance for the link length of each line segment corresponding to the lower arm or upper arm, shin, or the like, which is identical on the left and right side of the human body, excluding a link length incapable of being viewed in the human body from a child to an adult.

Examples of such a constraint also include setting the length of an observed line segment as the lower limit value of the link length when the link length is fixed. Examples of such a constraint also include the definition of the lower limit value of the link length from the upper limit value of the change in the joint angle per unit time and the change in the observed value.

Examples of such a constraint also include the definition of the range of the joint angle at that point of time from the upper limit value of the link length and the change in the observed value. Examples of such a constraint include the definition of the upper limit value of the link length from the range of the joint angle or correlation between the rotary joints.

Actually, when modeling and pose estimation are carried out for a detected person, each time silhouette images are used sequentially in time series, the motion analysis unit 56 infers a parameter represented by a current silhouette image on the basis of the parameter calculated when a previous silhouette image is used.

However, when the parameter is calculated using the head silhouette image immediately after the start of modeling and pose estimation, since there is no previous silhouette image, a parameter selected in advance as an initial value is used as a previously calculated parameter.

In the following description, each time the silhouette images are used sequentially in time series, a parameter which is calculated when a previous silhouette image is used is also called a previous parameter. In the following description, a silhouette image which is previously used before a current silhouette image when a previous parameter is calculated is also called a previous silhouette image.

In the following description, a parameter which is calculated currently using a silhouette image is also called a current parameter, and a silhouette image which is currently used so as to calculate the current parameter is also called a current silhouette image. In the following description, a parameter which is inferred on the basis of the previous parameter is also called an inferred parameter.

At this time, the motion analysis unit 56 observes a parameter from the current silhouette image. In the following description, the parameter which is observed from the current silhouette image is also called an observed parameter. The motion analysis unit 56 calculates a constraint value to constrain the current parameter such that the joint angle or the link length is not a numerical value which is incapable of being viewed in the human body.

The motion analysis unit 56 calculates the current parameter for modeling the detected person represented by the current silhouette image on the basis of the inferred parameter, the observed parameter, and the constraint value. In this way, the motion analysis unit 56 calculates the current parameter each time a plurality of silhouette images are used sequentially.

If the current parameter is finally obtained using the tail silhouette image, the motion analysis unit 56 reflects, for example, the link length as the current parameter in a parameter (current parameter) calculated already each time the silhouette image is used.

That is, the motion analysis unit 56 corrects a parameter (current parameter) calculated each time a silhouette image is used, that is, the link length as the parameter to the link length as the current parameter calculated when the tail silhouette image is used.

Thus, the motion analysis unit 56 aligns the size of an articulated object which is obtained on the basis of a parameter from each silhouette image, and corrects the shape of the articulated object (that is, the pose and position of the articulated object), increasing accuracy of modeling and pose estimation of the detected person.

Thus, the motion analysis unit 56 calculates the parameter for each time represented by the time information corresponding to the silhouette images from a plurality of silhouette images (that is, the time information added to the unit image corresponding to the silhouette image).

The motion analysis unit 56 carries out sequential modeling for the detected person on the basis of the parameter obtained for each silhouette image to generate plurality of model unit data which represents the shape of the detected person by a three-dimensional model.

At this time, the motion analysis unit 56 adds various parameters obtained using the corresponding silhouette image to the respective pieces of model unit data. The motion analysis unit 56 also adds the time information of the unit image used in generating the corresponding silhouette image to the respective pieces of model unit data.

Thus, the motion analysis unit 56 arranges a plurality of kinds of model unit data in accordance with the time information to generate three-dimensional model data which represents the motion of each detected person in the imprint period as a three-dimensional model in time series. That is, the motion analysis unit 56 generates three-dimensional model data constituting a plurality of temporally consecutive model unit data.

The above-described processing will be described in more detail by using a region representation in a parameter space. Each time the silhouette image is used, the motion analysis unit 56 defines the time represented by the time information of the current silhouette image as t, defines the time represented by the time information of the previous silhouette image as t-1, and defines a previous parameter region when the previous silhouette image is used as Pt-1.

The motion analysis unit 56 obtains the shape of the articulated object (that is, the pose and position of the articulated object) on the basis of the previous parameter region, such that the shape of the articulated object is expressed by an N-dimensional vector. The motion analysis unit 56 defines the N-dimensional vector as NVt-1.

The motion analysis unit 56 also obtains the dynamics (three-dimensional structure) of a joint on the basis of the previous parameter region. The motion analysis unit 56 defines the dynamics of a joint obtained on the basis of the previous parameter region as D(NVt-1).

If the range of a predicted error when a current inferred parameter region is obtained is Es, and the inferred parameter region is CPt, the motion analysis unit 56 calculates the inferred parameter region in consideration of a predicted error as expressed by the following expression (3).

$$CPt = \{NVt | NVt - D(NVt-1) \in Es, NVt-1 \in Pt-1\} \quad (3)$$

The motion analysis unit 56 also defines the projective function of the N-dimensional vector representing the shape of the articulated object, which should be obtained on the basis of the current parameter region, as h(NVt). When the projective line segment of each link obtained from the current silhouette image is expressed by an M-dimensional vector, the motion analysis unit 56 also defines the M-dimensional vector as MVt, and defines the error range of the M-dimensional vector as Eh.

When a current observed parameter region is SPt, the motion analysis unit 56 obtains the observed parameter region as expressed by the following expression (4) in consideration of the error range.

$$SPt = \{NVt | MVt - h(NVt) \in Eh\} \quad (4)$$

The motion analysis unit 56 obtains a constraint value region for constraining the shape and pose of the articulated object, which should be obtained on the basis of the current parameter region as expressed by the following expression (5) as the constraint information, on the basis of R inequalities as constraints.

$$gr(NVt) \le \Delta grt (r=1 \ldots R) \quad (5)$$

If a current constraint value region is Gt, and a current parameter region is Pt, the motion analysis unit 56 obtains the current parameter region by integrating the current inferred parameter region, the current observed parameter region, and the current constraint value region as a product set, such that the current parameter region is expressed by the following expression (6).

$$Pt = CPt \cap SPt \cap Gt \quad (6)$$

A modeling method of modeling the human body as the articulated object represented by the rotary joints and the prismatic joints is described, for example, in the paper, Kameda Yoshinari, Monoh Michihiko, and Ikeda Katsuo, "Pose Estimation Method for Articulated Object from Silhouette Image".

Such a modeling method is also described in the paper, Shimada Nobutaka, Shirai Yoshiaki, Kuno Yoshinori, and Miura Jun, "Shape and Pose Estimation of Articulated Object from Monocular Image Sequence Based on Loose Constraints".

If three-dimensional model data is generated in such a manner, for example, the motion analysis unit 56 sequentially in time series compares the joint angles of each joint (that is, rotary joint or prismatic joint), such as right wrist, right elbow, right shoulder, left wrist, left elbow, left shoulder, or the like, as the parameter added to each piece of model unit data.

For each detected person, the motion analysis unit 56 detects a location, at which the joint angles of all of the joints of the detected person are little changed, in three-dimensional model data as the time information of model unit data on the basis of the comparison result.

That is, for each detected person, the motion analysis unit 56 detects a location, at which the motion of the detected person is temporarily stopped so as to change from one motion to the next motion, or a location, at which the detected person is stopped while remaining seated or standing up for a while, in three-dimensional model data as a motion stop location.

For each detected person, the motion analysis unit 56 defines a remaining period separated by the motion stop location in three-dimensional model data (that is, a period in which the joint angle of at least one joint is changed) as a motion period in which the detected person takes a motion.

In this way, the motion analysis unit 56 detects one or a plurality of motion periods in three-dimensional model data for each detected person. The motion analysis unit 56 sequentially and temporally collects the joint angles of each joint as the parameter in each motion period of the detected person sequentially and arranges the joint angles from the head of the motion period to the tail of the motion period (that is, from the start of the motion until the end of the motion).

Thus, the motion analysis unit 56 generates an observed sequence in which the joint angles of each joint, such as right wrist, right elbow, right shoulder, left wrist, left elbow, left shoulder, or the like, are arranged in time series. The motion analysis unit 56 reads motion estimation data for each motion from the motion database 63.

Here, a model generation method of generating a motion model stored in motion estimation data will be described. According to such a model generation method, first, when a motion model representing a single motion is obtained, the same motions conducted by multiple people are imaged and a plurality of kinds of motion image data are generated.

Next, according to the model generation method, for each person, the parameters for modeling the human body as the articulated object represented by the rotary joint and the prismatic joints are obtained in time series on the basis of motion image data of the person in the same manner as described above.

That is, according to the model generation method, on the basis of motion image data of each person, the parameters for modeling of the person are sequentially obtained for each time represented by the time information of unit image data from the start of the motion of the person until the end of the motion.

Meanwhile, when multiple people conduct the same motion, even though the conducted motion is the same, there are variations in the movement of the human body for the motion, such as the bend angle of the elbow or the rotation angle of the shoulder when the arm is lifted during the motion.

When multiple people conduct the same motion, the degree of variation in the movement of the human body differs between the portions, such as the start portion, the middle portion, and the end portion of the motion, for example, when viewed in time series from the start of the motion until the end of the motion.

Thus, according to such a model generation method, predetermined arithmetic processing is carried out for the joint angles of each joint as the parameter of each person sequentially at each time from the start of the motion until the end of the motion, such that the representative value of the joint angles of each joint at each time is obtained.

Even when multiple people conduct the same motion, the time necessary for the motion may differ between the people. For this reason, according to such a model generation method, the joint angle of each joint obtained in time series for each person is time-series data, and time-series data is approximated by an approximation curve. According to such a model generation method, for each person, the approximation curve of each joint is normalized in the time-axis direction.

That is, according to such a model generation method, for each person, the time necessary for the motion is balanced. In addition, according to such a model generation method, the joint angle of each joint at each time is obtained from the normalized approximation curve for each person. According to such a model generation method, the representative value of the joint angle of each joint at each time is obtained as described above.

Next, according to such a model generation method, the representative values obtained in time series of the respective joints are defined as a finite set of states by using a hidden Markov model, and the probability that the state transits from a node Oi to a node Oj in the finite set is defined as aij.

According to such a model generation method, a state transition probability matrix representing the set of the probability of the state transition from the node Oi to the node Oj is defined as A={aij}, and the set of an output probability distribution in which a vector x is output at the node Oi is defined as B.

According to such a model generation method, an initial state probability distribution is defined as π={πi}, and a motion model which is a comparison criterion for motion estimation is defined as λ(π,A,B). Then, a motion model representing the change in the joint angle of each joint (accurately representing the motion) is obtained on the basis of the finite set of states.

According to such a model generation method, if the output probability distribution is bi(x), the output probability distribution is obtained as a linear combination of q Gauss distributions as expressed by the following expression (7).

$$bi = \sum_{J=1}^{g} c_{ij} N_{ij}(x; \mu j, \sum j) \quad (7)$$

In the expression (7), cij denotes a combination coefficient, μ denotes an average vector of the Gauss distributions, and Σ denotes a variance vector of the Gauss distributions.

According to such a model generation method, a motion model representing a single motion is generated in such a manner. Further, according to such a model generation method, similarly, a motion model representing another motion is generated on the basis of a plurality of kinds of motion image data obtained by imaging the same motions conducted by multiple people. Such a model generation method is described in, for example, Japanese Patent No. 4027838.

If motion estimation data for each motion is read from the motion database 63, the motion analysis unit 56 loads a motion model from motion estimation data. Further, motion analysis unit 56 sequentially associates the joint angle of each joint at each time in the single observed sequence with the joint angle of each joint at each time in the single motion model in time series from the beginning of the motion to the end of the motion.

At this time, if the number of joint angles of each joint in the observed sequence is different from the number of joint angles of each joint in the motion model, in the motion analysis unit 56, at least one of the observed sequence and the motion model is approximated by an approximation curve and normalized in the time-axis direction.

That is, the motion analysis unit 56 balances the time necessary for the motion represented by the observed sequence and the time necessary for the motion represented by the motion model. In addition, the motion analysis unit 56 obtains the joint angle of each joint at each time from the normalized approximation curve.

The motion analysis unit 56 carries out predetermined arithmetic processing using the joint angle of each joint at each time sequentially associated in the single observed sequence and the single motion model. Thus, the motion analysis unit 56 obtains a likelihood representing how much the motion of the detected person represented by the observed sequence is probable as the motion represented by the motion model.

The motion analysis unit 56 obtains a likelihood for the observed sequence and another motion model in the same manner. In this way, the motion analysis unit 56 obtains sequentially the likelihood on the basis of the single observed sequence and the motion model for each motion, and compares all of the obtained likelihoods with each other.

As a result, the motion analysis unit 56 specifies one motion model, which shows the maximum likelihood with respect to the observed sequence (that is, represents to be most probable), from among a plurality of motion models. The motion analysis unit 56 estimates that the motion represented by the specified motion model is the motion represented by the observed sequence (that is, the detected person conducts during the motion period in which the observed sequence is obtained).

If a plurality of motion periods are detected in three-dimensional model data, the motion analysis unit 56 carries out processing in the same manner for each motion period to estimate the motion conducted by the detected person in the motion period. Thus, for each detected person, the motion analysis unit 56 detects one or a plurality of motions conducted by the detected person on the basis of three-dimensional model data.

For determination of motions established by two people, such as "hug", "piggyback", "ride on shoulders", and "hold hands", the above-described motion database 63 registers the motion models representing the motions of one person from the motions established by the two people as motion estimation data.

For determination of the motions established by two people, the above-described motion database 63 also registers the motion models representing the motions of another person in the motions established by the two people as motion estimation data.

For this reason, if at least two detected people imaged concurrently conduct the motion established by two people, the motion analysis unit 56 can detect the mutual motions of the detected people as the motions having the same name on the basis of the motion periods of the detected people which at least partially overlap each other.

If the mutual motions of the detected people are detected as the motions having the same name on the basis of the motion periods of at least two detected people which at least partially overlap each other, the motion analysis unit 56 searches the relationship determination database 64 for motion name information MO representing the name of the detected motion.

The motion analysis unit 56 reads relationship information RE associated with the searched motion name information MO from the relationship determination database 64. The motion analysis unit 56 also loads the age/sex information of the detected people from the face detection information used in generating three-dimensional model data.

The motion analysis unit 56 estimates the relationship between multiple detected people imaged concurrently on the basis of the relationship information RE and the age/sex information. For example, if a motion conducted by an infant and a woman in her thirties as two detected people is "hug" or "piggyback", the motion analysis unit 56 estimates that the relationship between the two detected people is the parent-child relationship of an infant (younger than in his/her teens) and a woman in her thirties on the basis of the relationship information RE and the age/sex information.

For example, if a motion conducted by a man and a woman in their twenties as two detected people is "hold hands", the motion analysis unit 56 estimates that the relationship between the two detected people is the couple relationship of a man and a woman in their twenties on the basis of the relationship information RE and the age/sex information.

For example, if a motion conducted by women in their teens as two detected people is "hold hands", the motion analysis unit 56 estimates that the relationship between the two detected people is the friend relationship of women in their teens on the basis of the relationship information RE and the age/sex information.

If modeling is carried out for only one detected person by three-dimensional model data (only one detected person is imaged), the motion estimation unit 56 does not carry out relationship estimation using the relationship determination database 64.

If the relationship between multiple detected people is estimated in such a manner, the motion analysis unit 56 extracts the distance between the detected people or the directions or expressions of the faces at the time of estimation of the relationship as familiarity degree information representing the degree of familiarity between the detected people from the storage motion image. The motion analysis unit 56 also detects the positions of the detected people at the time of estimation of the relationship on the basis of three-dimensional model data.

The motion analysis unit 56 loads the person face feature quantities of the multiple detected people with the relationship estimated from the face detection information used in generating the three-dimensional model data. The motion analysis unit 56 represents the multiple detected people with the relationship estimated by the person face feature quantities, and generates estimated relationship information indicating what relationship is estimated between the multiple detected people, as described above.

The motion analysis unit 56 generates relationship notification information for notifying the estimated relationship to the relationship determination unit 65. At this time, the motion analysis unit 56 stores, in the relationship notification information, the estimated relationship information and the familiarity degree information. The motion analysis unit 56 also stores, in the relationship notification information, person position information representing the positions of the multiple detected people with the relationship estimated.

The motion analysis unit 56 also stores, in the relationship notification information, motion period information which represents a motion period, in which a motion for relationship estimation is conducted, by the time information of the unit image at the head of the motion period and the time information of the unit image at the tail of the motion period. If the relationship notification information is generated in such a manner, the motion analysis unit 56 sends the relationship notification information to the relationship determination unit 65.

Next, if the relationship utterance information is provided from the utterance analysis unit 55, the motion analysis unit 56 compares the relationship utterance period (that is, time information) represented by the relationship utterance information with the imprint period (that is, the time information added to model unit data of three-dimensional model data).

As a result, if the imprint period and the relationship utterance period overlap each other, the motion analysis unit 56 loads the stored relationship estimation phrase information from the relationship utterance information. The motion analysis unit 56 also loads the stored person direction information from the relationship utterance information.

The motion analysis unit 56 detects a person who conducts a call by a relationship estimation phrase represented by relationship estimation phrase information as a detected person or an imaging excluded person on the basis of the person direction information. If a person who conducts a call is a detected person, when the call is conducted, the motion analysis unit 56 determines whether or not there is a detected person who conducts a motion, such as "look back" or "nod", responsive to the call other than the person.

As a result, if there is only one detected person who conducts a motion in response to the call by the relationship estimation phrase, the motion analysis unit 56 specifies the detected person as a mother or a father who is called by an honorific title, such as "mommy" or "daddy", represented by the relationship estimation phrase.

The motion analysis unit 56 estimates that the relationship between the detected person who conducts the call and the detected person who responds to the call is the family relationship between one detected person and another detected person who is a mother (or a father) on the basis of the relationship estimation phrase and the specification result of the detected person.

If the relationship between the detected people is estimated, in the same manner as described above, the motion analysis unit 56 detects the positions of the detected person at the time of relationship estimation as person position information from the storage motion image, and extracts the distance between the detected people, the directions and expressions of the faces, and the like as familiarity degree information.

The motion analysis unit 56 loads the person face feature quantities of the multiple detected people with the relationship estimated from the face detection information. In the same manner as described above, the motion analysis unit represents the multiple detected people with the relationship estimated by the person face feature quantities, and generates estimated relationship information what relationship is estimated between the two detected people, as described above.

The motion analysis unit 56 defines a period, in which the relationship utterance period and the motion period in which a motion is conducted in response to a call are put together, as a relationship estimation period. The motion analysis unit 56 also generates relationship estimation period information which represents the relationship estimation period by the time information of the unit image at the head of the relationship estimation period and the time information of the unit image at the tail of the relationship estimation period.

The motion analysis unit 56 generates relationship notification information for notifying the estimated relationship. At this time, the motion analysis unit 56 stores the estimated relationship information in the relationship notification information. The motion analysis unit 56 also stores, in the relationship notification information, the person position information, the familiarity degree information, and the relationship estimation period information. If the relationship notification information is generated in such a manner, the motion analysis unit 56 sends the relationship notification information to the relationship determination unit 65.

Meanwhile, if there are multiple detected people who conduct a motion in response to the call by the relationship estimation phrase, the motion analysis unit 56 specifies each of the multiple detected people as a mother or a father who is called by an honorific title, such as "mommy" or "daddy", represented by the relationship estimation phrase.

For each combination of the detected person who conducts a call and the multiple detected people who respond to the call, the motion analysis unit 56 estimates the relationship between the people in the same manner as described above on the basis of the relationship estimation phrase and the specification result of the detected people.

Thus, for each combination of the detected person who conducts the call and the multiple detected people who respond to the call, the motion analysis unit 56 detects the person position information and extracts the familiarity degree information in the same manner as described above.

For each combination of the detected person who conducts the call and the multiple detected people who respond to the call, the motion analysis unit 56 generates the estimated relationship information in the same manner as described above.

Further, the motion analysis unit 56 generates the relationship estimation period information in the same manner as described above.

The motion analysis unit 56 generates the relationship notification information. At this time, the motion analysis unit 56 stores, in the relationship notification information, the estimated relationship information, the person position information, the familiarity degree information for each combination of the detected people with the relationship estimated in association with each other. The motion analysis unit 56 also stores, in the relationship notification information, the relationship estimation period information. If the relationship notification information is generated in such a manner, the motion analysis unit 56 sends the relationship notification information to the relationship determination unit 65.

Subsequently, if the name utterance information is provided from the utterance analysis unit 55, the motion analysis unit 56 compares name utterance period information (that is, time information) represented by the name utterance information with the imprint period (that is, time information added to model unit data of three-dimensional model data).

As a result, if the imprint period and the name utterance period overlap each other, the motion analysis unit 56 loads the stored name information from the name utterance information. The motion analysis unit 56 also loads the stored person direction information from the name utterance information.

The motion analysis unit 56 detects the position of each detected person in the imprint period on the basis of three-dimensional model data. The motion analysis unit 56 specifies a person who calls the name of a person represented by the name information as a detected person or an imaging excluded person on the basis of the position of each detected person and the person direction information.

When the specified person calls a person by the name of the person, the motion analysis unit 56 determines whether or not there is a detected person who conducts a motion, such as "look back" or "nod", responsive to the call from among the detected people other than the person.

As a result, if there is only one detected person who responds to the call by the name of the person, the motion analysis unit 56 specifies the name of the detected person as the name of the person represented by the name information. That is, the motion analysis unit 56 specifies who is the detected person (that is, name) in such a manner.

If there are multiple detected people who respond to the call by the name of the person, at this time, the motion analysis unit 56 loads conversation period information from familiarity information provided from the utterance analysis unit 55.

The motion analysis unit 56 compares the conversation period (that is, time information) represented by the conversation period information with the imprint period (that is, time information added to model unit data of three-dimensional model data). As a result, if the imprint period and the conversation period overlap each other, the motion analysis unit 56 loads all the familiarity and the person direction information of the two people corresponding to the familiarity from the familiarity information for each combination.

The motion analysis unit 56 determines whether there is a combination with the familiarity determined from among the combinations of the detected person who conducts the call by the name of the person and the multiple detected people who respond to the call or not on the basis of the position of each detected person and the person direction information.

If there are multiple detected people with the familiarity determined with respect to the detected person who conducts the call from among the multiple detected people who respond to the call, the motion analysis unit 56 detects a combination with the maximum familiarity from among the combinations of the detected person who conducts the call and the detected people who respond to the call.

Thus, the motion analysis unit 56 specifies the name of one detected person who responds to the call in one detected combination of the detected people as the name of the person represented by the name information. That is, the motion analysis unit 56 specifies who is the detected person (that is, name) in such a manner.

If there is only one combination with the familiarity determined from among the combinations of the detected person who conducts the call by the name of the person and the multiple detected people who respond to the call, the motion analysis unit 56 specifies the detected person having the name from one combination of the detected people. That is, the motion analysis unit 56 specifies the name of one detected person who responds to the call from one combination of the detected people as the name of the person represented by the name information.

Meanwhile, there is no combination with the familiarity determined from among the combination of the detected person who conducts the call by the name of the person and the multiple detected people who respond to the call, the motion analysis unit 56 does not specify the name of the detected person. Further, when the imprint period and the conversation period do not overlap each other, the motion analysis unit 56 does not specify the name of the detected person.

In addition, at this time, if the nickname utterance information is provided from the utterance analysis unit 55, the motion analysis unit 56 compares the nickname utterance period represented by the nickname utterance information with the imprint period in the same manner as when the name utterance information is provided.

As a result, if the imprint period and the nickname utterance period overlap each other, the motion analysis unit 56 loads the stored nickname information from the nickname utterance information. The motion analysis unit 56 also loads the stored person direction information from the nickname utterance information.

The motion analysis unit 56 detects the position of each detected person in the imprint period on the basis of three-dimensional model data. The motion analysis unit 56 specifies a person who conducts a call by a nickname represented by the nickname information as a detected person or an imaging excluded person on the basis of the position of each detected person and the person direction information.

When the specified person calls a person by the nickname, the motion analysis unit 56 determines whether or not there is a detected person who conducts a motion, such as "look back" or "nod", responsive to the call other than the person.

As a result, if there is only one person who responds to the call by the nickname, the motion analysis unit 56 specifies the nickname of the detected person as the nickname represented by the nickname information. That is, the motion analysis unit 56 specifies who is the detected person (that is, nickname) in such a manner.

If there are multiple detected people who respond to the call by the nickname, at this time, the motion analysis unit 56 loads the conversation period information from the familiarity information provided from the utterance analysis unit 55.

The motion analysis unit 56 compares the conversation period (that is, time information) represented by the conversation period information with the imprint period (that is, time information added to model unit data of three-dimensional model data). As a result, if the imprint period and the conversation period overlap each other, the motion analysis unit 56 loads all the familiarity and the person direction information of the two people corresponding to the familiarity from the familiarity information for each combination.

The motion analysis unit 56 determines whether there is a combination with the familiarity determined from among the combinations of the detected person who conducts the call by the nickname and the multiple detected people who respond to the call or not on the basis of the position of each detected person and the person direction information.

If there are multiple detected people with the familiarity determined with respect to the detected person who conducts the call from among the multiple detected people who respond to the call, the motion analysis unit 56 detects a combination with the maximum familiarity from among the combinations of the detected person who conducts the call and the detected people who responds to the call.

Thus, the motion analysis unit 56 specifies the nickname of one detected person who responds to the call from one detected combination of the detected people as the nickname represented by the nickname information. That is, the motion analysis unit 56 specifies who is the detected person (that is, nickname) in such a manner.

If there is one combination with the familiarity determined from among the combinations of the detected person who conducts the call by the nickname and the multiple detected people who respond to the call, the motion analysis unit 56 specifies the detected person having the name from one combination of the detected person. That is, the motion analysis unit 56 specifies the nickname of one detected person who responds the call from one combination of the detected people as the nickname represented by the nickname information.

Meanwhile, there is no combination with the familiarity determined from among the combinations of the detected person who conducts the call by the nickname and the multiple detected people who respond to the call, the motion analysis unit 56 does not specify the nickname of the detected person. Further, if the imprint period and the conversation period do not overlap each other, the motion analysis unit 56 does not specify the nickname of the detected person.

Meanwhile, if the specified person information is provided from the utterance analysis unit 55, the motion analysis unit 56 compares the name utterance period represented by the specified person information with the imprint period (that is, time information added to model unit data of three-dimensional model data).

As a result, if the imprint period and the name utterance period overlap each other, the motion analysis unit 56 loads the stored name information from the specified person information. The motion analysis unit 56 also loads the stored imprint period information and extraction position information from the specified person information.

The motion analysis unit 56 specifies a detected person with a name tag, on which the name represented by the name information is drawn, in the storage motion image on the basis of the imprint period information and the extraction position information. The motion analysis unit 56 estimates the name of the specified detected person as the name represented by the name information. That is, the motion analysis unit 56 specifies who is the detected person (that is, name) in such a manner.

The motion analysis unit 56 estimates the relationship between the detected people and specifies the detected person in such a manner. If such estimation or specification is completed, the motion analysis unit 56 loads the person face feature quantities and the imprint period information of all of the detected people with the human body modeled at this time from the face detection information used in generating three-dimensional model data.

For each detected person, the motion analysis unit 56 generates detected person information representing the detected person. At this time, the motion analysis unit 56 stores the person face feature quantity and the imprint period information in the detected person information for each detected person.

The motion analysis unit 56 generates motion name information which represents the name ("hug", "piggyback", or the like) of a motion for a detected person by a character string. The motion analysis unit 56 also generates motion period information which represents a motion period, in which the detected motion is conducted, by the time information of the unit image at the head of the motion period and the time information of the unit image at the tail of the motion period.

The motion analysis unit 56 defines the motion name information and the motion period information for each detected person as motion information representing the detected motion for the detected person, and stores the motion information in the detected person information for each detected person.

If the name or nickname of the detected person is specified, the motion analysis unit 56 stores, in the detected person information for the detected person, name information or nickname information representing the specified name or nickname. In this way, the motion analysis unit 56 generates the detected person information for each detected person, and sends the generated detected person information for each detected person to the relationship determination unit 65.

If the relationship notification information for notifying the relationship estimated on the basis of the motion is provided from the motion analysis unit 56, the relationship determination unit 65 loads the motion period information from the relationship notification information. The relationship determination unit 65 loads the conversation period information from the familiarity information provided from the utterance analysis unit 55.

The relationship determination unit 65 compares the conversation period (that is, time information) represented by the conversation period information with the motion period (that is, time information) represented by the motion period information. As a result, if the motion period and the conversation period overlap each other, the relationship determination unit 65 loads all the familiarity and the person direction information of the two people corresponding to the familiarity from the familiarity information for each combination.

The relationship determination unit 65 loads the person position information and the familiarity degree information from the relationship notification information. The relationship determination unit 65 detects whether the familiarity is obtained between the detected people with the relationship estimated or not on the basis of the positions of the two detected people represented by the person position information and the person direction information.

As a result, if the familiarity is obtained between the detected people with the relationship estimated, the relationship determination unit 65 calculates the degree of relationship representing how much the estimated relationship is probable on the basis of the familiarity and the familiarity degree information. Meanwhile, if the familiarity is not obtained between the detected people with the relationship estimated, the relationship determination unit 65 calculates the degree of relationship on the basis of the familiarity degree information without using the familiarity.

For example, as the distance of the detected people are close to each other, the degree of relationship has a large value. Further, if the detected people face each other, in this case, the degree of relationship has a large value. In contrast, for example, if one of the detected people turns his/her face away from another person, the degree of relationship has a small value.

If the degree of relationship is obtained in such a manner, the relationship determination unit 65 compares the degree of relationship with a third threshold value selected in advance. As a result, if the degree of relationship is equal to or greater than the third threshold value, the relationship determination unit 65 determines that the relationship between the detected people is as estimated.

If the relationship between the detected people is determined in such a manner, the relationship determination unit 65 loads the estimated relationship information from the relationship notification information. The relationship determination unit 65 defines the estimated relationship information as relationship determination information representing the determined relationship between the multiple detected people.

At this time, the relationship determination unit 65 stores the relationship determination information in the detected person information of the multiple detected people with the relationship determined from the detected person information for each detected person provided from the motion analysis unit 56.

If the motion period and the conversation period do not overlap each other, the relationship determination unit 65 calculates the degree of relationship by using the familiarity degree information without using the familiarity. If the degree of relationship is smaller than the third threshold value, the relationship determination unit 65 determines that the relationship between the detected people is not as estimated.

If the relationship notification information for notifying the relationship estimated on the basis of the relationship estimation phrase is provided from the motion analysis unit 56, the relationship determination unit 65 loads the relationship estimation period information from the relationship notification information. The relationship determination unit 65 also loads the conversation period information from the familiarity information provided from the utterance analysis unit 55.

The relationship determination unit 65 compares the conversation period (that is, time information) represented by the conversation period information with the relationship estimation period (that is, time information) represented by the relationship estimation period information. As a result, if the relationship estimation period and the conversation period overlap each other, the relationship determination unit loads all the familiarity and the person direction information of the two people corresponding to the familiarity from the familiarity information for each combination.

Meanwhile, at this time, if a set of estimated relationship information, person position information, and familiarity degree information is stored in the relationship notification information, the relationship determination unit 65 loads the person position information and the familiarity degree information from the relationship notification information.

The relationship determination unit 65 detects whether the familiarity is obtained between the detected people with the relationship estimated or not on the basis of the person position information and the person direction information in the same manner as described above. If the familiarity is obtained between the detected people with the relationship estimated, the relationship determination unit 65 calculates the degree of relationship on the basis of the familiarity and the familiarity degree information.

If the familiarity is not obtained between the detected people with the relationship estimated, the relationship determination unit 65 calculates the degree of relationship on the basis of the familiarity degree information without using the familiarity. In the same manner as described above, the relationship determination unit 65 compares the degree of relationship with the third threshold value, and determines whether the relationship between the detected people is as estimated or not on the basis of the comparison result.

As a result, if the relationship between the detected people is determined, in the same manner as described above, the relationship determination unit 65 loads the estimated relationship information from the relationship notification information, defines the estimated relationship information as the relationship determination information, and stores the relationship determination information in the detected person information of the multiple detected people with the relationship determined.

Meanwhile, if a plurality of sets of estimated relationship information, person position information, and familiarity degree information are stored in the relationship notification information, the relationship determination unit 65 loads the person position information and the familiarity degree information from the relationship notification information set by set.

Each time one set of person position information and familiarity degree information is loaded from the relationship notification information, in the same manner as described above, the relationship determination unit 65 uses the set of person position information and familiarity degree information along with the person direction information, calculates the degree of relationship by further appropriately using the familiarity, and compares the degree of relationship with the third threshold value. As a result, if at least one degree of relationship is equal to or greater than the third threshold value, the relationship determination unit 65 determines whether or not the relationship between the detected people is as estimated.

Meanwhile, if there is only one degree of relationship equal to or greater than the third threshold value, the relationship determination unit 65 loads the estimated relationship information corresponding to the person position information and the familiarity degree information used in obtaining the degree of relationship equal to or greater than the third threshold value from the relationship notification information. The relationship determination unit 65 stores the estimated relationship information as the relationship determination information in the detected person information of the two detected people with the relationship determined.

At this time, if there are two or more degrees of relationship equal to or greater than the third threshold value, the relationship determination unit 65 selects one degree of relationship having the maximum value from among a plurality of degrees of relationship equal to or greater than the third threshold value. The relationship determination unit 65 loads the estimated relationship information corresponding to the selected degree of relationship from the relationship notification information, and stores the loaded estimated relationship information as the relationship determination information in the detected person information of the multiple detected people with the relationship determined.

At this time, if the motion period and the conversation period do not overlap each other, the relationship determination unit 65 calculates the degree of relationship without using the familiarity. If all of the degrees of relationship are smaller than the third threshold value, the relationship determination unit 65 determines that the relationship between the detected people is not as estimated.

In this way, for all of the relationships estimated by the motion analysis unit 56 in such a manner, the relationship determination unit 65 determines whether or not the relationship is appropriate, and, when the determination is completed, sends the detected person information for each detected person to the person specification unit 39.

In this way, each time multiple people in the storage motion image are detected, the person relationship determination unit 38 appropriately specifies the name or nickname of each detected person, and determines the relationship between the detected people who are imaged concurrently.

Meanwhile, in the storage medium 28, a person database is constructed in advance which registers a detected person individually as person registration information regarding the detected person. Each time the detected person information for each detected person is provided from the relationship determination unit 65, the person specification unit 39 carries out database update processing as a part of the imaged person specification processing.

In this case, if the detected person information for each detected person is provided from the relationship determination unit 65, the person specification unit 39 detects whether the person registration information is registered in the person database of the storage medium 28 or not through the storage/reproduction control unit 36 and the storage/reproduction unit 27 in sequence. As a result, if the person registration information is not yet registered in the person database, the person specification unit 39 newly generates person registration information of the detected person represented by the detected person information.

Figure 9:
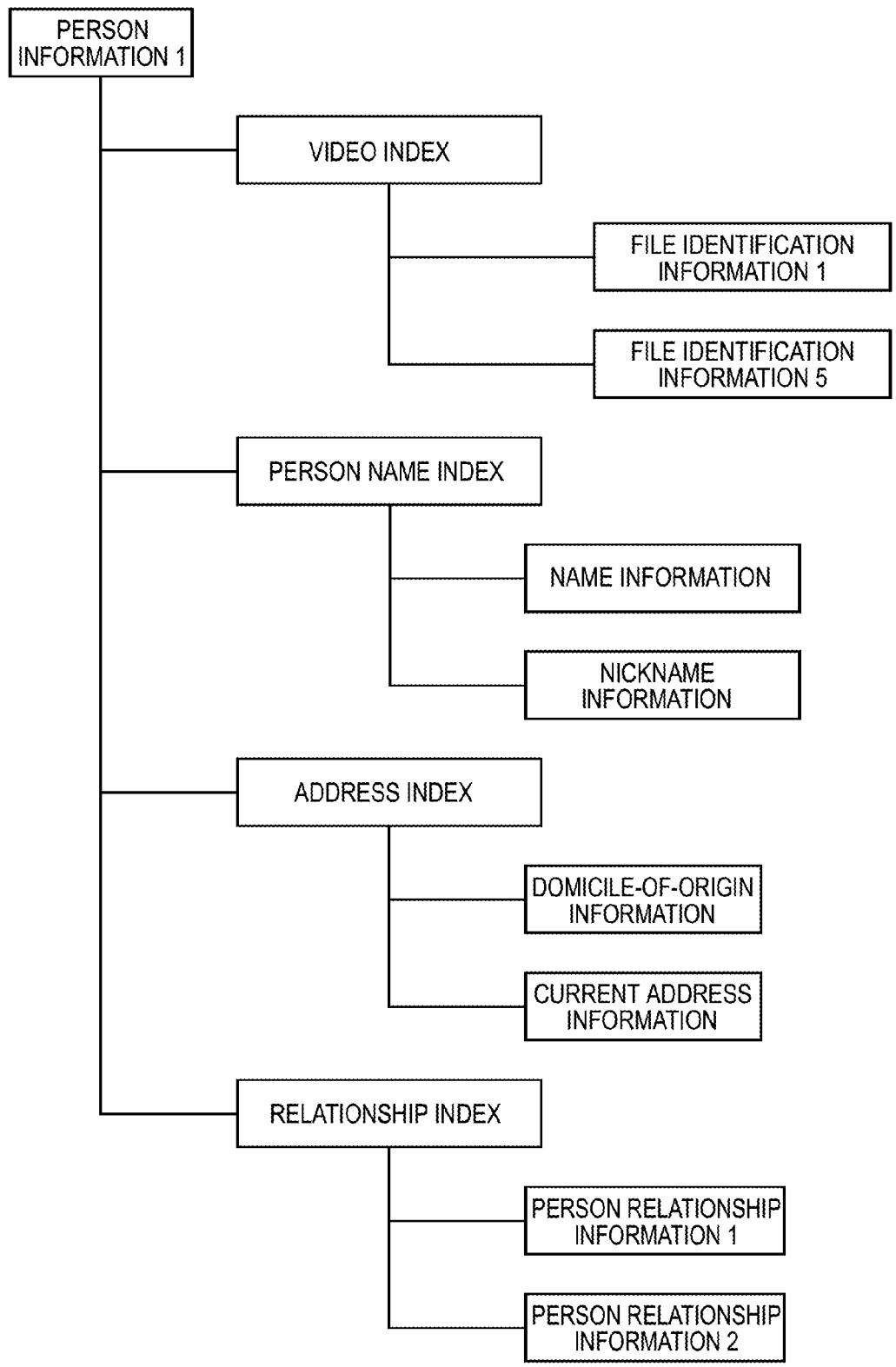
FIG. 9 is a schematic view showing the configuration of person registration information.

At this time, as shown in FIG. 9, the person specification unit 39 is configured to generate the person registration information of the detected person having a hierarchical tree structure as a whole, and defines top-level information as person information representing the detected person.

Meanwhile, the person specification unit 39 stores the person face feature quantity as information representing the detected person in the person information. However, if the name or nickname of the detected person is detected, the person specification unit 39 also stores, in the person information, the name information representing the name or the nickname information representing the nickname, along with the person face feature quantity.

The person specification unit 39 associates a video index, a person name index, an address index, and a relationship index as information lower by one level in the hierarchy in parallel with the person information.

The video index included in the person registration information of the detected person is the index of a video file generated by imaging the detected person. The person name index included in the person registration information of the detected person is the index of the name information representing the name of the detected person and the nickname information representing the nickname of the detected person.

The address index included in the person registration information of the detected person is the index of domicile-of-origin information representing the origin of domicile of the detected person or current address information representing the current address of the detected person. The relationship index included in the person registration information of the detected person is the index of person relationship information representing the relationship between multiple detected people who are imaged concurrently.

The person specification unit 39 associates, with the video index, file identification information (stored in header data provided at this time) of a video file generated by imaging the detected person as information lower by one level in the hierarchy.

As described below, if the same detected person is imaged two or more times, and the person registration information is updated every time, the person specification unit 39 additionally associates, with the video index, file identification information of a video file generated by newly imaging the detected person in parallel.

If the name information or the nickname information is included in the detected person information of the detected person (the name or nickname of the detected person is detected), the person specification unit 39 associates, with the person name index, the name information or the nickname information as information lower by one level in the hierarchy in parallel.

Meanwhile, if the user inputs the name of a person through the operation key 12, the person specification unit 39 stores name information which represents the name by a character string (that is, text). Further, if the user inputs, for example, the position (latitude or longitude) representing the origin of domicile or the current address of a person through the operation key 12, the person specification unit 39 stores the domicile-of-origin information representing the origin of domicile and the current address information representing the current address in association with the name information representing the input name.

For this reason, when the person registration information is newly generated or the contents of the person registration information are updated, if the name of the detected person is detected, the person specification unit 39 compares the detected name with the name represented by the name information held in accordance with the input of the user by a character matching method.

As a result, if the name of the detected person and the name input by the user coincide with each other, in generating the person registration information or updating the contents of the person registration information, the person specification unit 39 uses the domicile-of-origin information and the current address information held in accordance with the input of the user along with the name information.

That is, if the name of the detected person and the name input by the user coincide with each other, the person specification unit 39 associates, with the address index, the domicile-of-origin information and the current address information as information lower by one level in the hierarchy in parallel.

If one or a plurality of kinds of person relationship information are included in the detected person information of the detected person, the person specification unit 39 associates, with the relationship index, one or a plurality of kinds of person relationship information as information lower by one level in the hierarchy in parallel.

In this way, the person specification unit 39 hierarchically generates the person registration information for each detected person. If the person registration information is generated in such a manner, the person specification unit 39 sends the generated person registration information to the storage medium 28 through the storage/reproduction control unit 36 and the storage/reproduction unit 27 in sequence. Thus, the person specification unit 39 stores the person registration information in the storage medium 28, such that the person registration information is registered in the person database.

If the person registration information is already registered in the person database, the person specification unit 39 reads all the person registration information already registered in the person database from the storage medium 28 through the storage/reproduction control unit 36 and the storage/reproduction unit 27 in sequence.

The person specification unit 39 loads the person face feature quantity from the detected person information for each detected person provided from the relationship determination unit 65 at this time. The person specification unit 39 compares the person face feature quantity stored in the person registration information read from the storage medium 28 (the person face feature quantity stored in the person information of the person registration information) with the person face feature quantity loaded from the detected person information.

In this way, the person specification unit 39 detects whether there is a detected person with the person registration information already registered in the person database from among the detected people detected at this time or not on the basis of the comparison result.

As a result, if there is a detected person with the person registration information not yet registered in the person database from among the detected people detected at this time, in the same manner as described above, the person specification unit 39 newly generates the person registration information of the detected person and registers the person registration information in the person database.

In contrast, if there is a detected person with the person registration information already registered in the person database from among the detected people detected at this time, the person specification unit 39 updates the contents of the person registration information of the detected person.

At this time, the person specification unit 39 loads the file identification information from header data provided from the video file generation unit 35 at this time. The person specification unit 39 additionally associates, with the video index in the person registration information of the detected person to be updated, the file identification information loaded from header data as information lower by one level in the hierarchy in parallel.

The person specification unit 39 detects whether or not the name information or the nickname information is already stored in the person registration information of the detected person to be updated. The person specification unit 39 also detects whether or not the name information or the nickname information is stored in the detected person information of the detected person.

The person specification unit 39 determines whether the name or nickname of the detected person is initially detected currently or not on the basis of the detection result. As a result, if the name or nickname of the detected person is initially detected currently, the person specification unit 39 loads the name information or the nickname information from the detected person information of the detected person.

Thus, the person specification unit 39 associates, with the person name index in the person registration information to be updated, the name information or the nickname information loaded from the detected person information at this time as information lower by one level in the hierarchy in parallel.

Even though the name or nickname of the detected person is detected currently, if the name or nickname is previously detected and already stored in the person registration information to be updated, the person specification unit 39 does not add name information or the nickname information to the person registration information.

The person specification unit 39 detects whether or not the person relationship information is already stored in the person registration information of the detected person to be updated. The person specification unit 39 also detects whether or not the person relationship information is stored in the detected person information of the detected person.

The person specification unit 39 determines whether the relationship between the detected person and other one person or multiple detected people is initially determined currently or not on the basis of the detection result. As a result, if the relationship between the detected person and other one person or multiple detected people is initially determined currently, the person specification unit 39 loads the person relationship information from the detected person information of the detected person.

Thus, the person specification unit 39 associates, with the relationship index in the person registration information to be updated, one or a plurality of kinds of person relationship information loaded from the detected person information at this time as information lower by one level in the hierarchy in parallel.

If the person relationship information is already stored in the person registration information of the detected person to be updated, and the person relationship information is also stored in the detected person information of the detected person, the person specification unit 39 compares the person relationship information of the person registration information with the person relationship information of the detected person information.

As a result, if the person relationship information of the person registration information and the person relationship information of the detected person information have the same contents, the person specification unit 39 does not add the person relationship information to the person registration information.

However, if the person relationship information of the person registration information and the person relationship information of the detected person information have different contents (another party with the relationship determined with respect to the detected person differs between the previous time and this time), the person specification unit 39 updates the contents of the person registration information of the detected person to be updated.

That is, the person specification unit 39 additionally associates, with the relationship index in the person registration information of the detected person to be updated, one or a plurality of kinds of person relationship information representing different relationships stored in the detected person information of the detected person as information lower by one level in the hierarchy in parallel.

In this way, if the contents of the person registration information are updated, the person specification unit 39 sends the person registration information with the contents updated to the storage medium 28 through the storage/reproduction control unit 36 and the storage/reproduction unit 27 in sequence. Thus, the person specification unit 39 stores the person registration information with the contents updated in the storage medium 28 so as to be overwritten over the person registration information before the contents are updated.

Meanwhile, the digital video camera 10 is used for many years, such that video files generated by imaging various scenes from when a person is in his/her childhood until the person becomes an adult, or video files generated by imaging various scenes after the person becomes an adult can be accumulated.

If the digital video camera 10 is used for many years and the number of times of imaging of a person and the number of video files stored by imaging increase, more information (detected person information having various contents) regarding the imaged person can be obtained on the basis of the video files.

For this reason, each time the detected person information is provided from the relationship determination unit 65, the person specification unit 39 carries out database update processing to appropriately update the contents of the person registration information, such that the person registration information can more accurately represent what the person is like.

When a person becomes an adult, the facial appearance is little changed. However, when the person grows up from a child to an adult, the facial appearance tends to be changed along with growth. For this reason, if the digital video camera 10 is used for many years, even for the same person, the person specification unit 39 may determine that the person in his/her childhood and the person who becomes an adult are different people on the basis of the person face feature quantities, and may generate two kinds of person registration information individually representing the person in his/her childhood and the person who becomes an adult.

That is, if a person in his/her childhood is imaged and a video file is generated, the person specification unit 39 generates the person registration information of the person and registers the person registration information in the person database.

If the person is imaged in the course of growth or after becoming an adult and a video file is generated, the person specification unit 39 determines that the person is different from the person in his/her childhood with the change in the facial appearance. The person specification unit 39 may generate new person registration information for the person and may register the person registration information in the person database.

For this reason, if the detected person information for each detected person is provided from the relationship determination unit 65, the person specification unit 39 carries out person specification processing as a part of the imaged person specification processing prior to the above-described database update processing.

At this time, person specification unit 39 detects whether at least the relationship between one person who is not yet specified and another person with the name or honorific title (mommy or daddy) specified is determined or not on the basis of the person relationship information stored in the detected person information for each detected person.

As a result, if such a relationship is determined currently, the person specification unit 39 searches for the person registration information of another specified person from among a plurality of kinds of person registration information in the person database.

The person specification unit 39 detects whether or not the searched person registration information stores the person relationship information representing that it is determined that the relationship between another specified person and a different person is the same as the currently determined relationship between an unspecified person and another specified person.

As a result, if it is determined that the relationship between another specified person and the different person is the same as the relationship between the specified person and the person who is not yet specified, the person specification unit 39 determines the person who is not yet specified as the same person as the different person.

In this way, if the digital video camera 10 is used for many years, the person specification unit 39 compares the currently determined relationship with the previously determined relationship during the person specification processing which is appropriately carried out. The person specification unit 39 can specify all of the detected people in his/her childhood or during growth and after the person becomes an adult as the same person on the basis of the comparison result even when the facial appearance changes.

Figure 10:
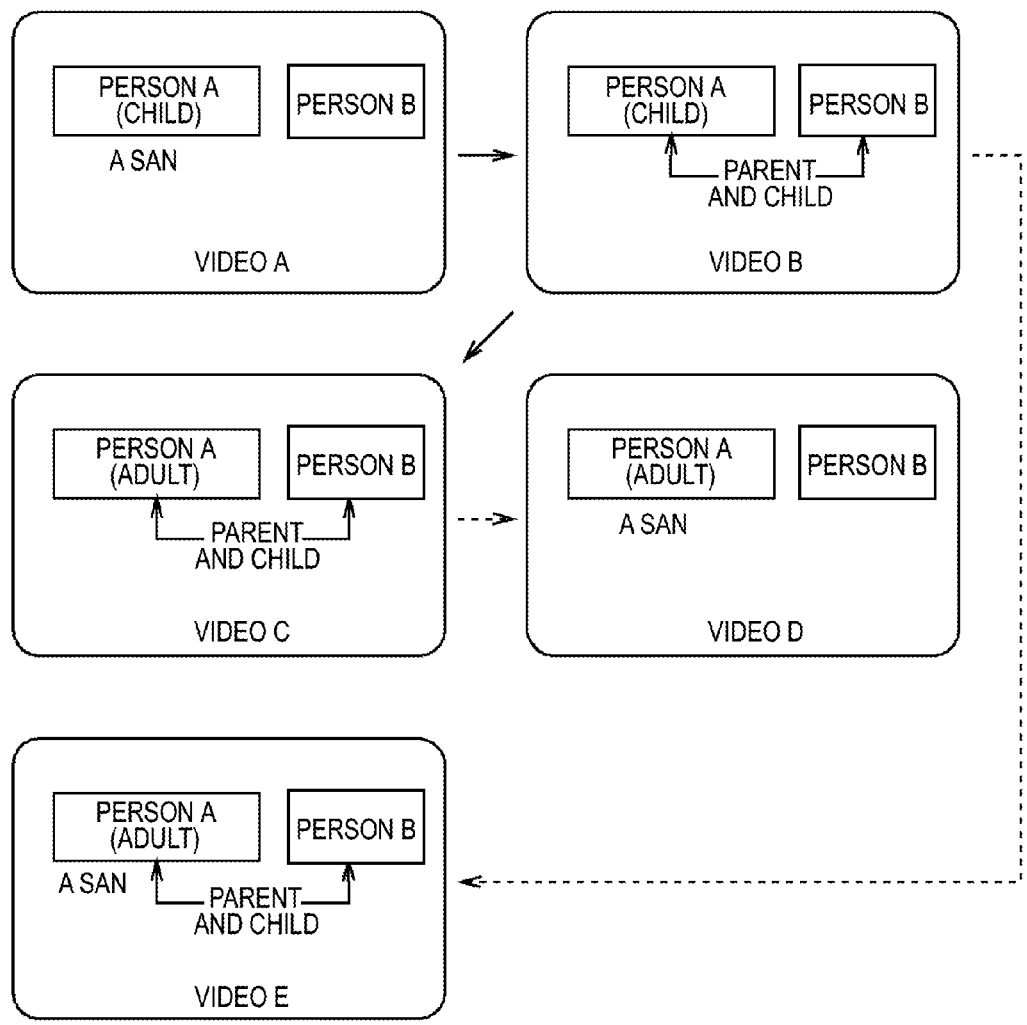
FIG. 10 is a schematic view for description of specification of a person using person relationship information.

Hereinafter, such specification of the detected person will be specifically described with reference to FIG. 10. First, for example, if a person A in his/her childhood is imaged along with a person B and it is detected that the name of the person A is "A" at that time, the person specification unit 39 generates person registration information which stores name information representing the name "A" for the person A.

The person specification unit 39 registers the person registration information of the person A in the person database. At this time, the person specification unit 39 generates person registration information for the person B who is imaged concurrently with the person A and registers the person registration information in the person database.

Next, if the person A and the person B are again imaged concurrently and, at that time, it is determined that the person A and the person B (for example, mother) are in the parent-child relationship, the person specification unit 39 stores, in the person registration information of the person A, the person relationship information representing the person A and the person B who is a mother are in the parent-child relationship.

The person specification unit 39 compares the determined relationship between the person A and the person B who is a mother as the parent-child relationship at this time with the relationship between the person B and a different person represented by the person relationship information stored in the person registration information of the person B.

However, at this point of time, if only the person A in his/her childhood is in the parent-child relationship with the person B who is a mother, the person specification unit 39 may not detect the relationship between the person B who is a mother and a different person to be determined as the parent-child relationship from the relationship between the person B and the different person.

Hence, at this time, the person specification unit 39 sends the person registration information of the person A with the contents updated to the storage medium 28 through the storage/reproduction control unit 36 and the storage/reproduction unit 27 in sequence. Thus, the person specification unit 39 stores the person registration information of the person A with the contents updated in the storage medium 28 so as to be written over the person registration information of the person A before the contents are updated, updating the person registration information of the person A in the person database.

At this time, the person specification unit 39 also stores the person relationship information representing that the person A and the person B who is a mother are in the parent-child relationship in the person registration information of the person B who is imaged concurrently with the person A.

In this way, if the contents of the person registration information of the person B are updated, the person specification unit 39 sends the person registration information of the person B with the contents updated to the storage medium 28 through the storage/reproduction control unit 36 and the storage/reproduction unit 27 in sequence.

Thus, the person specification unit 39 stores the person registration information of the person B with the contents updated in the storage medium 28 so as to be written over the person registration information of the person B before the contents are updated, updating the person registration information of the person B in the person database.

Subsequently, if the person A who becomes an adult is imaged concurrently with the person B, for example, the person specification unit 39 generates the person registration information of the person A as an adult separately from the person registration information of the person A in his/her childhood.

At this time, if it is determined that the person A and the person B (mother) are in the parent-child relationship, the person specification unit 39 stores, in the person registration information of the person A as an adult, the person relationship information representing that the person A and the person B who is a mother are in the parent-child relationship.

At this time, the person specification unit 39 compares the relationship between the person A and the person B who is a mother to be determined as the parent-child relationship with the relationship between the person B and a different person represented by the person relationship information stored in the person registration information of the person B.

As a result, if the relationship between the person B who is a mother and the different person (the person A in his/her childhood) to be determined as the parent-child relationship is detected from the relationship between the person B and the different person, the person specification unit 39 specifies the person A (the person A as an adult) and the different person (the person A in his/her childhood) as the same person.

That is, if the person A and the different person are both in the parent-child relationship with the person B who is a mother, the person A (the person A as an adult) and the different person (the person A in his/her childhood) are the children of the person B who is a mother. Thus, the person specification unit 39 specifies the person A and the different person as the same person.

Meanwhile, if the person A and the different person are specified as the same person, for example, the person specification unit 39 reads the person registration information of the different person registered in the person database from the storage medium 28 through the storage/reproduction control unit 36 and the storage/reproduction unit 27 in sequence.

The person specification unit 39, for example, adds the contents of the person registration information of the different person (the person A in his/her childhood) to the person registration information of the person A (the person A as an adult), unifying the person registration information of the person A as an adult and the person A in his/her childhood which are the same person.

At this time, the person specification unit 39 stores, in the person information of the unified single person registration information of the person A, the person face feature quantity of the person A in his/her childhood in addition to the person face feature quantity of the person A as an adult. Thus, the person specification unit 39 can use the new person registration information as the person registration information of the person A as an adult and the person A in his/her childhood.

At this time, the person specification unit 39 associates, with the video index in the unified single person registration information of the person A, the file identification information corresponding to the person A in his/her childhood in addition to the file identification information corresponding to the person A as an adult.

The person specification unit 39 associates, with the relationship index in the unified single person registration information of the person A, the person relationship information representing the determined relationship for the person A in his/her childhood in addition to the person relationship information representing the determined relationship for the person A as an adult.

The person specification unit 39 associates, with the person name index in the unified single person registration information of the person A, the name information or the nickname information detected from the person A as an adult and the name information or the nickname information from the person A in his/her childhood.

Thus, even when the name of the person A is not detected after the person A becomes an adult, if the name of the person A is detected in his/her childhood in the above-described manner, the person specification unit 39 can specify the person A and the different person as the same person having the name "A".

If the two kinds of person registration information of the person A as an adult and the person A in his/her childhood are unified as single person registration information, the person specification unit 39 sends the single person registration information to the storage medium 28 through the storage/reproduction control unit 36 and the storage/reproduction unit 27 in sequence.

Thus, the person specification unit 39 stores the unified single person registration information of the person A in the storage medium 28 so as to be written over, for example, the person registration information of the person A as an adult. The person specification unit 39 erases, for example, the person registration information of the person A in his/her childhood.

Meanwhile, if the name of the person A is not detected in his/her childhood but is detected after the person A as an adult and the person A in his/her childhood are specified as the same person, the person specification unit 39 specifies that the person A has the detected name, regardless of an adult or a child.

When it is determined that the person A and the person B (mother) are in the parent-child relationship, if it is detected that the name of the person A is "A", and the person A and the different person are the same person having the name "A", the person specification unit 39 can specify the person A and the different person collectively.

For example, if it is detected that the name of the person A is "A" before the person A and the different person are specified as the same person, the person specification unit detects whether or not there is person registration information of a person other than the person A which stores the name information representing the name.

If there is person registration information, which stores the name information representing the name "A", from among person registration information of people other than the person A, the person specification unit 39 specifies a person represented by the person registration information with the name information and the person A as the same person having the name "A".

In this way, the person specification unit 39 can specify that the person A and the different person are the same person. Even when a person is specified in such a manner, the person specification unit 39 unifies the person registration information of the person A and registers the person registration information in the person database.

Meanwhile, if the person specification processing and the database update processing have been carried out sequentially, the person specification unit 39 also subsequently carries out attribute information generation processing as a part of the imaged person specification processing. In this case, the person specification unit 39 generates file attribute information of the video file by using the detected person information for each detected person provided from the relationship determination unit 65 at this time, for example along with the unified person registration information.

At this time, the person specification unit 39 also uses header data provided from the video file generation unit 35 at this time in generating the file attribute information. Further, at this time, if imaging target detection information or event name detection information is provided from the subject estimation unit 46, the person specification unit 39 also uses the imaging target detection information or the event name detection information in generating the file attribute information.

Figure 11:
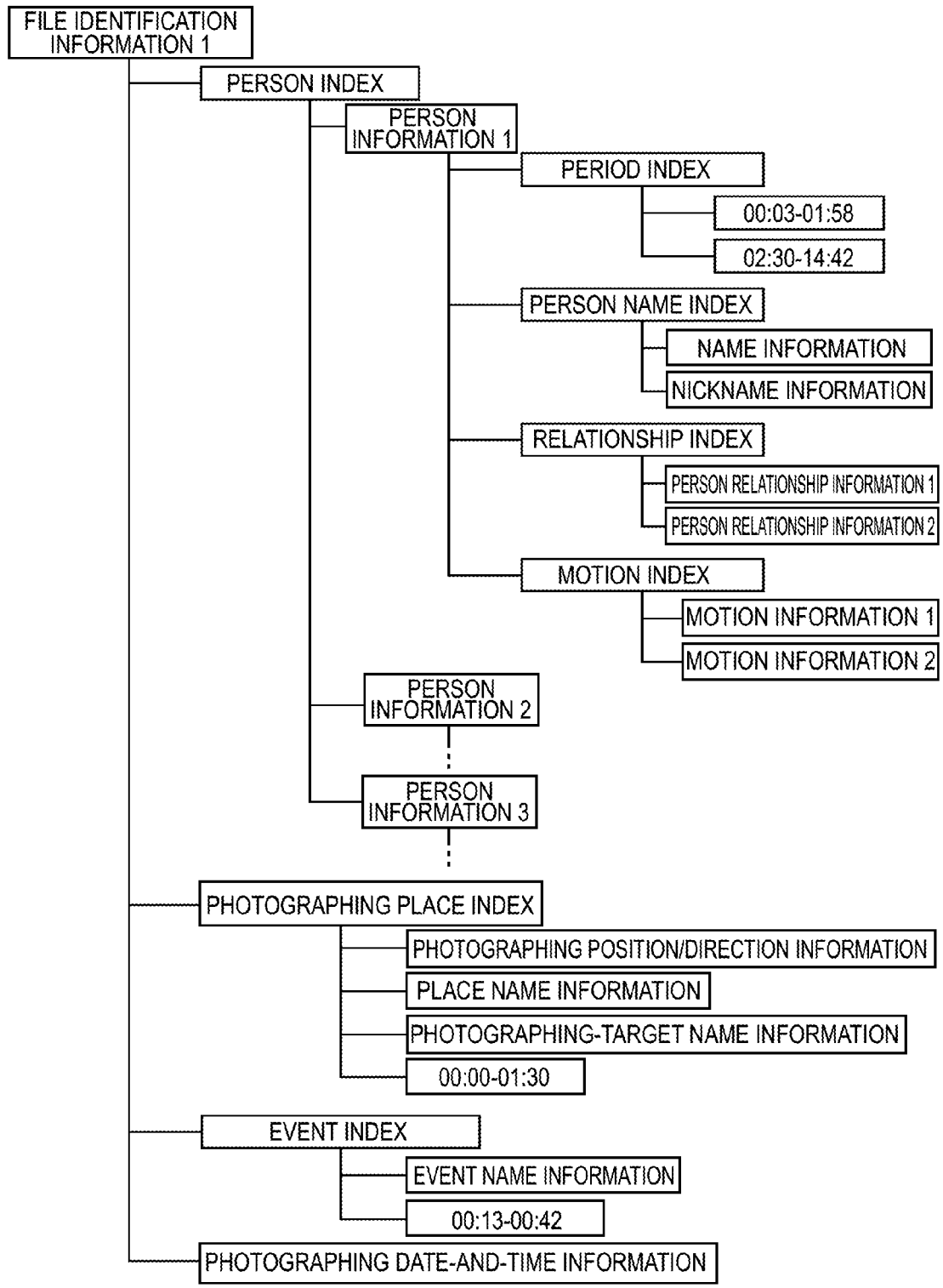
FIG. 11 is a schematic view showing the configuration of file attribute information.

In this case, as shown in FIG. 11, the person specification unit 39 generates the file attribute information having a hierarchical tree structure as a whole, such that top-level information in the file attribute information is defined as file identification information.

The person specification unit 39 associates, with the file identification information, a person index, an imaging place index, an event index, and imaging date-and-time information as information lower by one level in the hierarchy in parallel.

Here, the person index is the index of information regarding a detected person who is currently detected. The imaging place index is the index of information regarding an imaging place. The event index is the index of information regarding an event.

The person specification unit 39 associates, with the person index, the person information individually representing all of the detected people who are currently detected as information lower by one level in the hierarchy in parallel. Meanwhile, the person specification unit 39 stores, in the person information for each detected person, the person face feature quantity as information representing the detected person.

If the name or nickname of the detected person is detected, the person specification unit 39 also stores, in the person information, the name information representing the name or the nickname information representing the nickname, along with the person face feature quantity.

The person specification unit 39 associates, with the person information for each detected person, a period index, a person name index, a relationship index, and a motion index as information lower by one level in the hierarchy.

Here, the period index for each detected person is the index of imprint period information representing a period in which the detected person is in the storage motion image. The person name index for each detected person is the index of the name information representing the name of the detected person and the nickname information representing the nickname of the detected person.

The relationship index for each detected person is the index of the person relationship information representing the relationship between multiple detected people who are currently detected (that is, imaged concurrently). The motion index for each detected person is the index of motion information representing the motion of the detected person.

Thus, the person specification unit 39 associates, with the period index for each detected person, the imprint period information representing the period, in which the detected person is in the storage motion image, as information lower by one level in the hierarchy. If there are a plurality of periods in which the same detected person is in the storage motion image, the person specification unit 39 associates a plurality of kinds of imprint period information in parallel with the period index of the detected person.

If the name or nickname of the detected person is detected, the person specification unit 39 associates the name information or the nickname information as information lower by one level in the hierarchy in parallel with the person name index of the detected person.

If the relationship between the multiple detected people who are currently detected is determined on the basis of the video file and also determined by using the person registration information as described above, the person specification unit 39 uses one or a plurality of kinds of person relationship information representing the relationship in generating the file attribute information.

That is, the person specification unit 39 associates, with the relationship index of the detected person, one or a plurality of kinds of person relationship information representing the relationship, which is determined on the basis of video file and also determined by using the person registration information as described above, as information lower by one level in the hierarchy in parallel.

The person specification unit 39 also associates, with the motion index for each detected person, one or a plurality of kinds of motion information representing the currently detected motion of the detected person as information lower by one level in the hierarchy in parallel.

The person specification unit 39 also associates, with the imaging place index, imaging position/direction information as information lower by one level in the hierarchy. Meanwhile, if an imaging target is in the storage motion image, in addition to the imaging position/direction information, the person specification unit 39 also associates place name information, imaging target name information, and one or a plurality of kinds of imprint period information representing a period, in which the imaging target is in the storage motion image, in parallel with the imaging place index.

If an event name is detected, the person specification unit 39 associates, with the event index, event name information and one or a plurality of kinds of imprint period information representing a period, in which the event name is in the storage motion image, as information lower by one level in the hierarchy in parallel.

In this way, the person specification unit 39 hierarchically generates the file attribute information. If the file attribute information is generated, the person specification unit 39 stores the generated file attribute information in, for example, header data, updating the contents of header data. The person specification unit 39 returns header data with the contents updated to the video file generation unit 35.

Each time header data with the contents updated is returned from the person specification unit 39, the video file generation unit 35 adds header data to the video data again to update the contents of the video file. The video file generation unit 35 sends the video file with the contents updated to the storage/reproduction control unit 36.

Thus, the storage/reproduction control unit 36 sends the video file provided from the video file generation unit 35 to the storage medium 28 through the storage/reproduction unit 27, and stores the video file in the storage medium 28 again so as to be written over the video file before the contents are updated.

In this way, each time the imaged person specification processing is carried out using the video file, the person specification unit 39 generates the file attribute information of the video file, such that the video file itself or the contents of the video file can be easily detected.

[2-3 Life Album Creation Processing]

Even when a person is imaged frequently from his/her childhood for many years, the control unit 11 carries out the imaged person specification processing using the video files generated by imaging, such that the person in a plurality of video files can be specified as the same person, regardless of the change in the facial appearance.

For this reason, if a person is imaged frequently for many years, the control unit 11 extracts and combines the portions where the person appears from a plurality of video files generated and accumulated at that time, such that a life album showing the life of the person up to now can be created.

Hereinafter, life album creation processing will be described in which the control unit 11 creates the life album of a person designated by the user (hereinafter, also referred to as designated person).

If the user operates the operation key 12 to instruct creation of a life album, the control unit 11 carries out the life album creation processing. At this time, if the user operates the operation key 12 and a designated person who is a main character of the life album is designated, for example, by input of a name, the control unit 11 searches for the person registration information of the designated person on the basis of the name in the person database of the storage medium 28 through the storage/reproduction unit 27.

The control unit 11 reads the searched person registration information of the designated person from the storage medium 28 through the storage/reproduction unit 27. The control unit 11 loads all of the file identification information from the person registration information. The control unit 11 reads a video file identified by the file identification information from the storage medium through the storage/reproduction unit 27 on the basis of the file identification information.

The control unit 11 loads header data from all of the read video files, and also loads the file attribute information from header data. Thus, the control unit 11 first retrieves a video file generated by imaging a specific motion selected in advance, such as forward crawl, piggyback, hug, or eating conducted by the designated person in his/her childhood (young stage), on the basis of the motion information stored in the file attribute information. Then, the control unit 11 loads video data from the retrieved video file and sends video data to the codec 18.

At this time, the codec 18 separates video data provided from the control unit 11 into compressed image data, compressed right sound data, compressed left sound data, and compressed rear sound data, and also decompresses and decodes compressed image data to generate original storage motion image data.

The codec 18 also decompresses and decodes compressed right sound data, compressed left sound data, and compressed rear sound data to generate original right sound data, left sound data, and rear sound data. The codec 18 sends storage motion image data, right sound data, left sound data, and rear sound data to the control unit 11.

If storage motion image data, right sound data, left sound data, and rear sound data are provided from the codec 18, the control unit 11 loads motion information representing various motions described above from the file attribute information corresponding to the storage motion image data, right sound data, left sound data, and rear sound data.

The control unit 11 collectively extracts the portions corresponding to the motion period represented by the motion information as a partial image from storage motion image data, right sound data, left sound data, and rear sound data on the basis of the motion information.

That is, the control unit 11 collectively extracts the periods corresponding to the motion period of storage motion image data and the motion periods of right sound data, left sound data, and rear sound data as a partial image from storage motion image data, right sound data, left sound data, and rear sound data.

The control unit 11 loads address information from the person registration information of the designated person. The control unit 11 retrieves a video file generated by imaging the designated person at a position far away from the residence of the designated person as a video file generated by imaging the designated person at a travel destination on the basis of the address information and the imaging position/direction information stored in the file attribute information.

The control unit 11 loads video data from the retrieved video file and sends video data to the codec 18 to obtain storage motion image data, right sound data, left sound data, and rear sound data in the same manner as described above.

At this time, the control unit 11 loads the imprint period information of the designated person from the file attribute information corresponding to storage motion image data, right sound data, left sound data, and rear sound data. The control unit 11 collectively extracts the portions corresponding to the imprint period as a partial image from storage motion image data, right sound data, left sound data, and rear sound data on the basis of the imprint period information.

That is, the control unit 11 collectively extracts the periods corresponding to the imprint period of storage motion image data and the imprint periods of right sound data, left sound data, and rear sound data as a partial image from storage motion image data, right sound data, left sound data, and rear sound data.

The control unit 11 retrieves a video file generated by imaging the designated person in a specific event selected in advance, such as entrance ceremony, graduation ceremony, sports day, or recital, on the basis of the event name information stored in the file attribute information.

The control unit 11 loads video data from the retrieved video file and sends video data to the codec 18 to obtain storage motion image data, right sound data, left sound data, and rear sound data in the same manner as described above.

At this time, the control unit 11 loads the imprint period information of the designated person from the file attribute information corresponding to storage motion image data, right sound data, and left sound data. The control unit 11 collectively extracts the portions corresponding to the imprint period as a partial image from storage motion image data, right sound data, left sound data, and rear sound data in the same manner as described above on the basis of the imprint period information.

The control unit 11 generates single motion image data by combining the partial images obtained on the basis of the video files sequentially from the oldest partial image to the latest partial image on the basis of the imaging date-and-time information stored in the file attribute information. The control unit 11 also generates three kinds of right sound data, left sound data, and rear sound data which are reproduced in synchronization with motion image data.

The control unit 11 inserts a character string (that is, text) representing the type of a motion, a place name, an event name, or the like as a ticker at a position in motion image data corresponding to the head of a partial image of each motion, the head of a partial image of a travel, the head of a partial image of an event, or the like.

At this time, the control unit 11 uses, for example, a character string (that is, text) represented by the event name information or the motion name information stored in the motion information as the ticker inserted into motion image data.

The control unit 11 also adds music data of sound effect prepared in advance to motion image data, right sound data, left sound data, and rear sound data. In this way, the control unit 11 automatically generates life album data including motion image data, right sound data, left sound data, rear sound data, and music data with the ticker or sound effect added.

At this time, the control unit 11 simply combines a plurality of partial images, and if the user designates the reproduction time of the life album (that is, data length) in advance, calculates the total time of a plurality of partial images.

The control unit 11 compares the total time with the reproduction time designated in advance. As a result, if the total time is equal to or shorter than the reproduction time designated in advance, the control unit 11 combines a plurality of partial images as they are.

In contrast, if the total time is longer than the reproduction time designated in advance, the control unit 11 detects a scene where the designated person or a photographer is joyful (the volume level increases) from the individual partial images, for example, on the basis of the change in the volume level.

The control unit 11 further extracts the portions of the detected scenes from the individual partial images and combines the portions in time series in accordance with the reproduction time designated in advance to generate single motion image data and three kinds of right sound data, left sound data, and rear sound data. In this way, the control unit 11 may generate life album data so as to have the reproduction time designated in advance.

If multiple designated people are designated, instead of the single designated person, the control unit 11 may combine the partial images of the multiple designated people to generate the life album.

If life album data is generated in such a manner, the control unit 11 sends life album data to the codec 18. If life album data is provided from the control unit 11, the codec 18 compresses and encodes motion image data, right sound data, left sound data, rear sound data, and music data constituting life album data, and carries out time-division multiplexing to generate compressed album data. The codec 18 sends compressed album data to the control unit 11.

If compressed album data is provided from the codec 18, the control unit 11 generates an album file by filing from compressed album data. The control unit 11 sends the album file to the storage/reproduction unit 27, and stores the album file in the storage medium 28 through the storage/reproduction unit 27.

If the user operates the operation key to instruct reproduction of life album file data, the control unit 11 reads the album file from the storage medium 28 through the storage/reproduction unit 27. The control unit 11 loads compressed album data from the album file and also sends loaded compressed album data to the codec 18.

If compressed album data is provided from the control unit 11, the codec 18 separates compressed album data, and decompresses and decodes compressed album data to generate original life album data (that is, motion image data, right sound data, left sound data, rear sound data, and music data). The codec 18 sends life album data to the control unit 11.

If life album data is provided from the codec 18, the control unit 11 sends motion image data constituting life album data to the display unit 17. The control unit 11 also generates right channel data and left channel data on the basis of right sound data, left sound data, rear sound data, and music data constituting life album data, and sends right channel data and left channel data to the sound processing section 29. Thus, the control unit 11 displays a motion image based on motion image data on the display unit 17.

The sound processing section 29 carries out sound processing for right channel data and left channel data provided from the control unit 11, and sends the obtained right channel signal and left channel signal, for example, to a pair of stereo speakers 30 and 31.

Thus, the control unit 11 outputs stereo sound in synchronization with display of the motion image through a pair of speakers 30 and 31, and also appropriately outputs a sound effect through the speakers 28 and 29. In this way, the control unit 11 can allow the user to watch the life album created by collecting the partial images of the designated person.

[2-4 Imaged Person Specification Processing Procedure]

Figure 12:
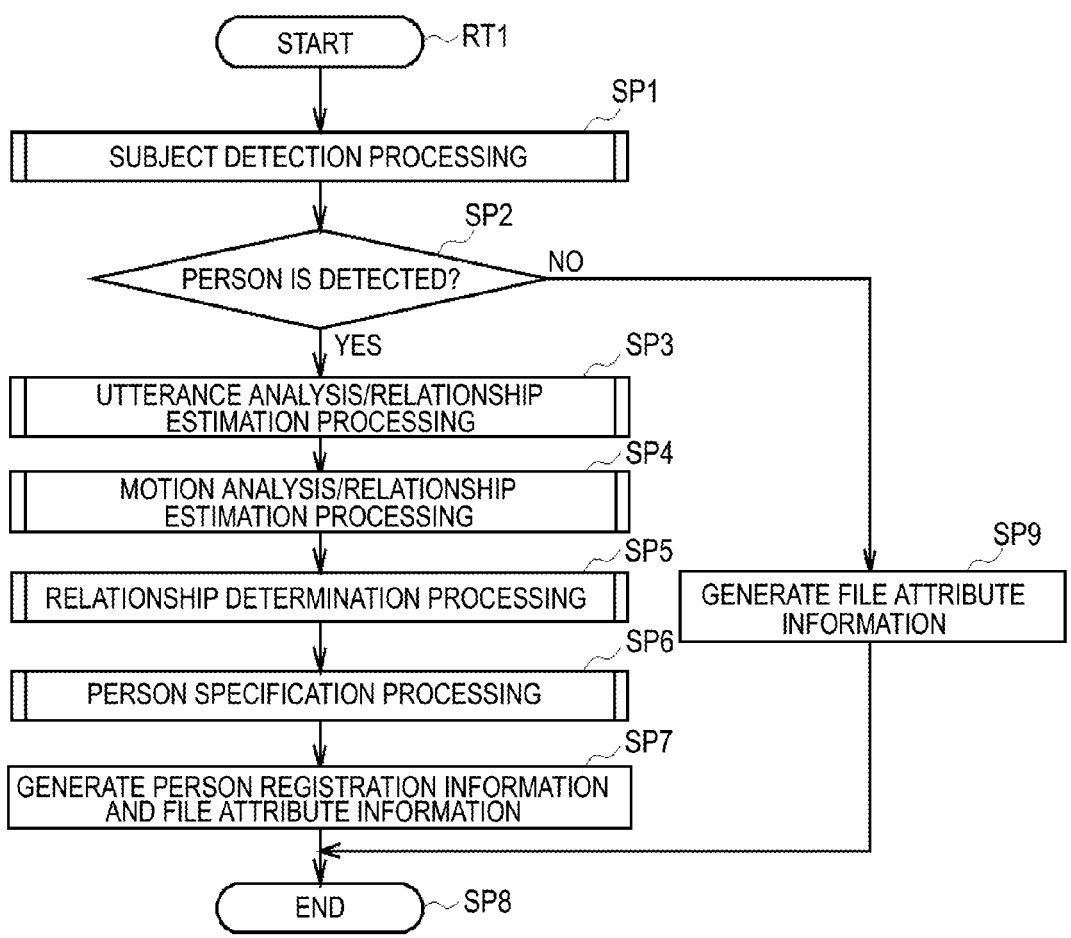
FIG. 12 is a flowchart showing an imaged person specification processing procedure.

Next, an imaged person specification processing procedure RT1 which is carried out in accordance with the imaged person specification program each time control unit 11 reads a video file from the storage medium 28 through the storage/reproduction unit 27 will be described with reference to FIG. 12.

If a video file is read from the storage medium 28 through the storage/reproduction unit 27, the control unit 11 loads video data from the video file and sends video data to the codec 18. As a result, if original storage motion image data, right sound data, left sound data, and rear sound data are provided from the codec 18, the control unit 11 starts the imaged person specification processing procedure RT1 shown in FIG. 12 in accordance with the imaged person specification processing stored in advance in the internal memory.

If the imaged person specification processing procedure RT1 starts, in Step SP1, the control unit 11 carries out subject detection processing to detect a subject in a storage motion image based on storage motion image data. Next, the process progresses to Step SP2.

In Step SP2, the control unit 11 determines whether a person is detected as the subject in the storage motion image. If the determination result in Step SP2 is positive, this indicates that a person in the storage motion image is likely to be specified and the relationship between multiple people is likely to be determined. Thus, if the determination result in Step SP2 is positive, the control unit 11 progresses to Step SP3.

In Step SP3, the control unit 11 carries out utterance analysis/relationship estimation processing to analyze right sound, left sound, and rear sound based on right sound data, left sound data, and rear sound data, thereby extracting the utterance of each person detected in the storage motion image. The control unit 11 appropriately specifies a person detected from the storage motion image on the basis of the utterance of each person, and calculates the familiarity between the multiple people. Then, the control unit 11 progresses to Step SP4.

In Step SP4, the control unit 11 carries out motion analysis/relationship estimation processing to analyze the storage motion image, thereby estimating the motions of the multiple people and also extracting the familiarity degree information between the multiple people from the storage motion image. The control unit 11 appropriately specifies a person and appropriately estimates the relationship between the multiple people on the basis of the estimated motion or the utterance of the person. Then, the control unit 11 progresses to Step SP5.

In Step SP5, the control unit 11 carries out relationship determination processing to appropriately determine the estimated relationship between the multiple people on the basis of the familiarity or familiarity degree information. Then, the control unit 11 progresses to Step SP6.

In Step SP6, the control unit 11 carries out person specification processing. If at least one person from among the determined multiple people is not specified, the control unit 11 appropriately specifies the unspecified person on the basis of the relationship and the person relationship information stored in the person registration information. Then, the control unit 11 progresses to Step SP7.

In Step SP7, the control unit 11 generates or updates the person registration information representing a person in the storage motion image, and also generates the file attribute information representing multiple people in the storage motion image, the relationship between the multiple people, or the like. Then, the control unit 11 progresses to Step SP8.

Thus, in Step SP8, the control unit 11 ends the imaged person specification processing procedure RT1. If the determination result in Step SP2 is negative, this indicates that, since there is no person in the storage motion image, and the relationship between the multiple people is unable to be determined. Hence, in Step SP2, if the determination result is negative, the control unit 11 progresses to Step SP9.

In Step SP9, the control unit 11 generates the file attribute information representing an imaging target other than a person in the storage motion image as a subject, and progresses to Step SP8. In Step SP8, the control unit 11 ends the imaged person specification processing procedure RT1.

[2-4-1 Subject Detection Processing]

Figure 13:
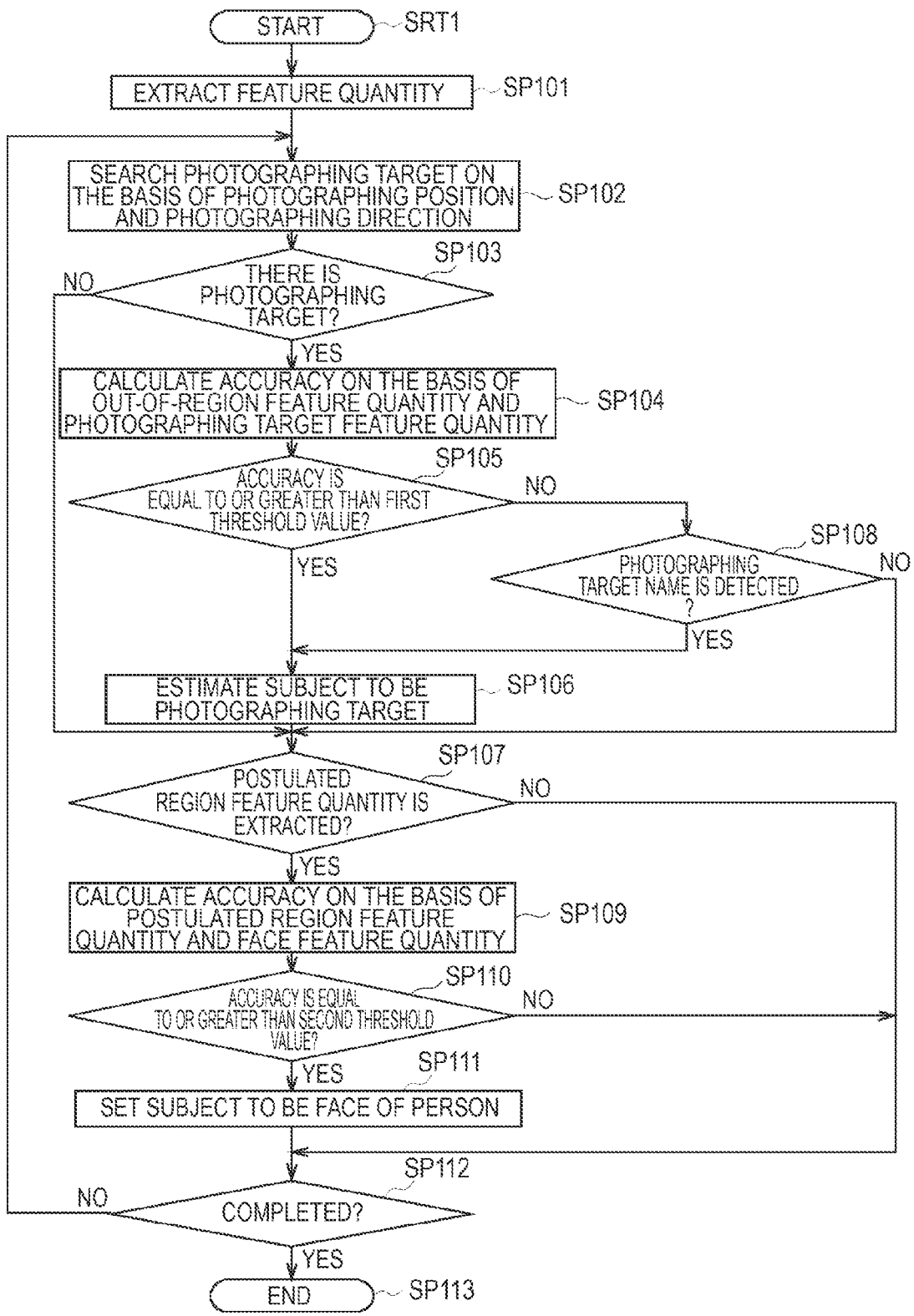
FIG. 13 is a flowchart showing a subject detection processing subroutine.

Next, subject detection processing which is carried out by the control unit 11 in Step SP1 of the above-described imaged person specification processing procedure RT1 will be described with reference to FIG. 13. If the imaged person specification processing procedure RT1 starts and the process progresses to Step SP1, the control unit 11 starts a subject detection processing subroutine SRT1 shown in FIG. 13.

If the subject detection processing subroutine SRT1 starts, in Step SP101, the control unit 11 sequentially uses a plurality of unit images constituting the storage motion image one by one, and extracts the feature quantity of the image from the unit image. Then, the control unit 11 progresses to Step SP102.

In Step SP102, the control unit 11 selects one set of imaging position and imaging direction in the detected time series from the imaging positions and imaging directions sequentially detected according to generation of the unit images at the time of imaging of the subject. The control unit 11 searches an imaging target which can be imaged by the imaging position and imaging direction on the basis of the selected set of imaging position and imaging direction. Then, the control unit 11 progresses to Step SP103.

In Step SP103, the control unit 11 determines whether or not there is an imaging target which can be imaged by the imaging position and imaging direction. If the determination result in Step SP103 is positive, this indicates that, when the imaging position and imaging direction selected in Step SP102 are detected, the digital video camera 10 is imaging toward the imaging target.

That is, the positive determination result indicates that the imaging target is likely to be in a single unit image generated when the imaging position and imaging direction selected in Step SP102 are detected. In Step SP103, if the determination result is positive, the control unit 11 progresses to Step SP104.

In Step SP104, the control unit 11 calculates accuracy on the basis of the out-of-region feature quantity extracted from the unit image and the imaging target feature quantity of the imaging target which can be imaged by the imaging position and imaging direction. Then, the control unit 11 progresses to Step SP105.

In Step SP105, the control unit 11 compares the accuracy with the first threshold value to determine whether or not the accuracy is equal to or greater than the first threshold value. If the determination result in Step SP105 is positive, this indicates that the imaging target is in the unit image.

In Step SP105, if the determination result is positive, the control unit 11 progresses to Step SP106. In Step SP106, the control unit 11 estimates the subject in the unit image as the imaging target. Then, the control unit 11 progresses to Step SP107.

Meanwhile, if the determination result in Step SP105 is negative, this indicates that the imaging target is unlikely to be in the unit image. In Step SP105, if the determination result is negative, the control unit 11 progresses to Step SP108.

In Step SP108, the control unit 11 determines whether or not the character string representing the imaging target is detected from the unit image. If the determination result in Step SP108 is positive, this indicates that the imaging target is in the unit image although the imaging target is under the shadow of something. Thus, in Step SP108, if the determination result is positive, the control unit 11 progresses to Step SP106.

In Step SP107, the control unit 11 determines whether or not the postulated region feature quantity is extracted from the unit image. If the determination result in Step SP107 is positive, this indicates that the postulated region in the unit image where the face of a person is postulated to appear, and the postulated region feature quantity is extracted from the postulated region.

In Step SP108, if the determination result is positive, the control unit 11 progresses to Step SP109. Thus, in Step SP109, the control unit 11 calculates accuracy on the basis of the postulated region feature quantity and the face detection feature quantity. Then, the control unit 11 progresses to Step SP110.

In Step SP110, the control unit 11 compares the accuracy with the second threshold value to determine whether or not the accuracy is equal to or greater than the second threshold value. If the determination result in Step SP110 is positive, this indicates that a person is in the unit image as a subject.

In Step SP110, if the determination result is positive, the control unit 11 progresses to Step SP111. In Step SP111, the control unit 11 estimates a subject in the unit image as a person. Then, the control unit 11 progresses to Step SP112.

In Step SP112, the control unit 11 determines whether or not the feature quantities extracted from a plurality of unit images constituting the storage motion image are completely used in detecting a subject. If the determination result in Step SP112 is negative, this indicates that the subject detection processing is not yet carried out for the entire storage motion image. Thus, in Step SP112, if the determination result is negative, the control unit 11 returns to Step SP102.

Meanwhile, if the determination result in Step SP103 is negative, this indicates that the digital video camera 10 is imaging a subject at a place where there is no imaging target. In Step SP103, if the determination result is negative, the control unit 11 progresses to Step SP107.

If the determination result in Step SP108 is negative, this indicates that an imaging target is not in the unit image. Thus, in Step SP108, if the determination result is negative, the control unit 11 progresses to Step SP107.

If the determination result in Step SP107 is negative, this indicates that the face of a person is not in the unit image. Thus, in Step SP107, if the determination result is negative, the control unit 11 progresses to Step SP112.

If the determination result in Step SP110 is negative, this indicates that a postulated region in the unit image is erroneously detected, and the face of a person is not in the unit image. Thus, in Step SP110, if the determination result is negative, the control unit 11 progresses to Step SP112.

Thereafter, the control unit 11 repeatedly carries out Steps SP102 to SP112 until the positive determination result is obtained in Step SP112. Thus, the control unit 11 carries out the subject detection processing by sequentially using the feature quantities extracted from a plurality of unit images constituting the storage motion image.

If the determination result in Step SP112 is positive, this indicates that the subject detection processing is completed for the entire storage motion image. Thus, in Step SP112, if the determination result is positive, the control unit 11 progresses to Step SP113. In Step SP113, the control unit 11 ends the subject detection processing subroutine SRT1 and progresses Step SP2 of the imaged person specification processing procedure RT1.

[2-4-2 Utterance Analysis/Relationship Estimation Processing]

Figure 14:
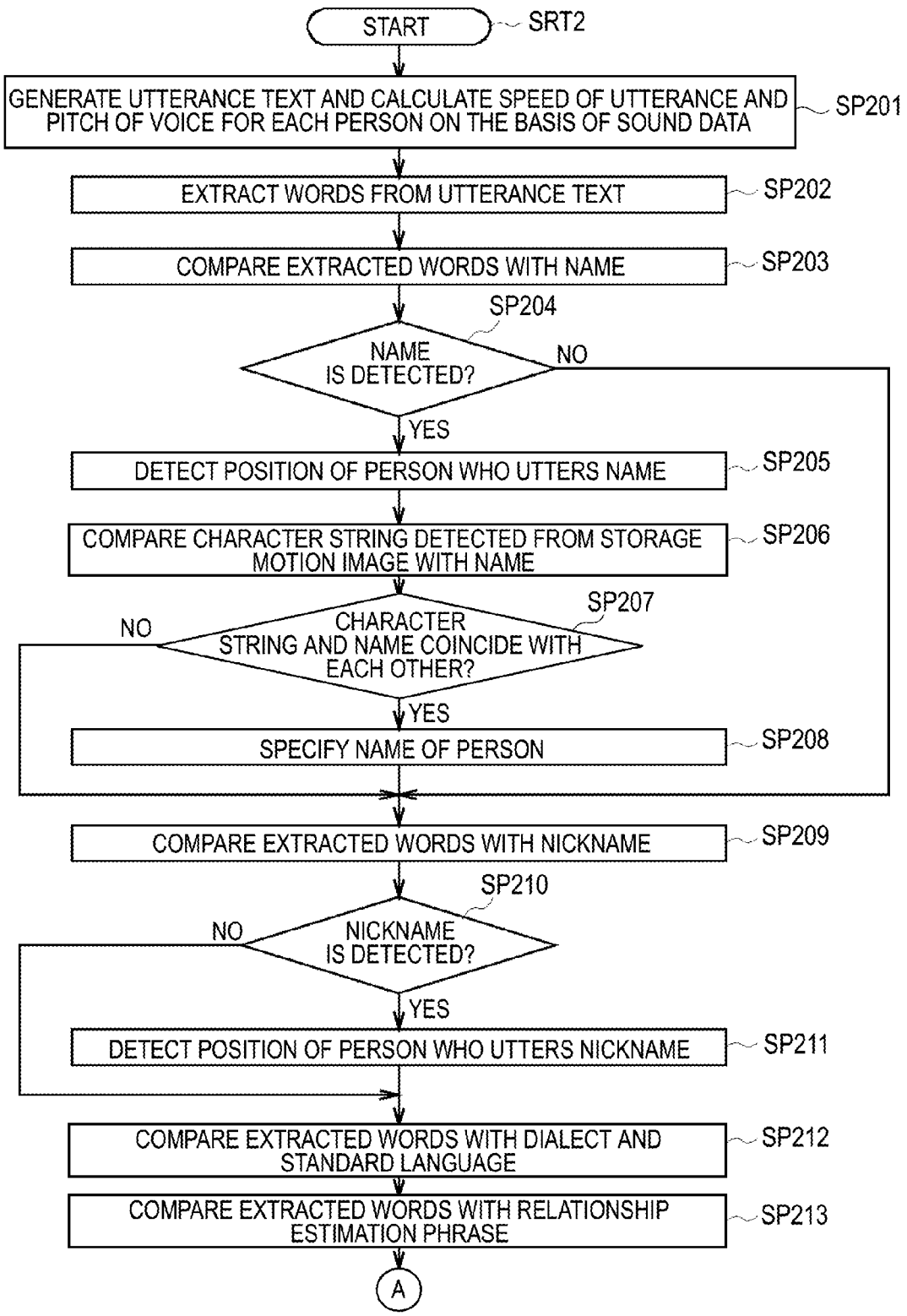
FIG. 14 is a flowchart showing an utterance analysis/relationship estimation processing subroutine (1).
Figure 15:
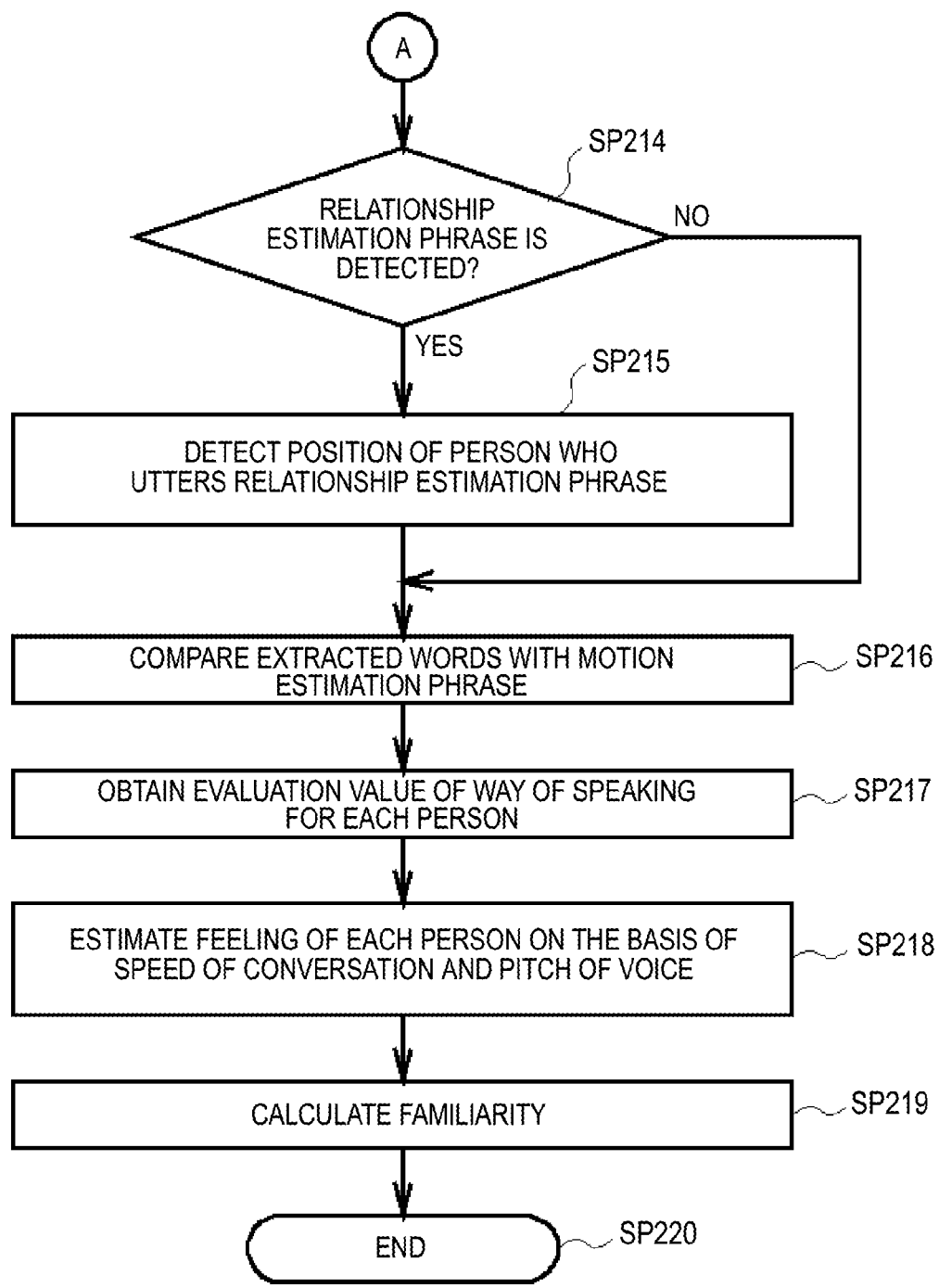
FIG. 15 is a flowchart showing an utterance analysis/relationship estimation processing subroutine (2).

Next, utterance analysis/relationship estimation processing which is carried out by the control unit 11 in Step SP3 of the imaged person specification processing procedure RT1 will be described with reference to FIGS. 14 and 15. If the process progresses to Step SP3 in the imaged person specification processing procedure RT1, the control unit 11 starts an utterance analysis/relationship estimation processing subroutine SRT2 shown in FIGS. 14 and 15.

If the utterance analysis/relationship estimation processing subroutine SRT2 starts, in Step SP201, the control unit 11 generates utterance text of each person (single utterance text or in-conversation utterance text) on the basis of right sound data, left sound data, and rear sound data.

At this time, if utterance text is generated from multiple people in a conversation, the control unit 11 obtains the speed of utterance and the pitch of voice for each person on the basis of the utterance text, right sound data, left sound data, and rear sound data. Then, the control unit 11 progresses to Step SP202.

In Step SP202, the control unit 11 morphologically analyzes utterance text of a person who is uttering alone or multiple people in a conversation to extract a plurality of words. Then, the control unit 11 progresses to Step SP203. In Step SP203, the control unit 11 compares the words extracted from the utterance text with a plurality of names of the people held in advance by a character matching method. Then, the control unit 11 progresses to Step SP204.

In Step SP204, the control unit 11 determines whether or not a word which coincides with the name of the person is detected from the words of the utterance text. If the determination result in Step SP204 is positive, this indicates that a person who is imaged or an imaging excluded person calls the name of the person. In Step SP204, if the determination result is positive, the control unit 11 progresses to Step SP205.

In Step SP205, at this time, if a name is detected from utterance text of a person in a conversation, the control unit 11 detects the position of a person who utters the name. Then, the control unit 11 progresses to Step SP206. In Step SP206, the control unit 11 compares the character string detected from the storage motion image with the name of the person by a character matching method. Then, the control unit 11 progresses to Step SP207.

In Step SP207, the control unit 11 determines whether or not the character string and the name of the person coincide with each other. If the determination result in Step SP207 is positive, this indicates that a person who is imaged wears a name tag on which a name called by another person is drawn.

In Step SP207, if the determination result is positive, the control unit 11 progresses to Step SP208. In Step SP208, the control unit 11 specifies the person who is imaged (the person who wears the name tag) as a person having the called name. Then, the control unit 11 progresses to Step SP209.

In Step SP209, the control unit 11 compares the words extracted from the utterance text with a plurality of nicknames of the people held in advance by a character matching method. Then, the control unit 11 progresses to Step SP210.

In Step SP210, the control unit 11 determines whether or not a word which coincides with the nickname of the person is detected from the words of the utterance text. If the determination result in Step SP210 is positive, this indicates that a person who is imaged or an imaging excluded person calls the nickname of the person.

In Step SP210, if the determination result is positive, the control unit 11 progresses to Step SP211. In Step SP211, if a nickname is detected from the utterance text of the person in a conversation, the control unit 11 detects the position of the person who utters the nickname. Then, the control unit 11 progresses to Step SP212.

In Step SP212, the control unit 11 compares the words extracted from the utterance text of the person in the conversation with a plurality of dialect words and standard-language words held in advance by character matching method. Then, the control unit 11 progresses to Step SP213.

In Step SP213, the control unit 11 compares the words extracted from the utterance text of the person in the conversation with a plurality of relationship estimation phrases held in advance by a character matching method. Then, the control unit 11 progresses to Step SP214.

In Step SP214, the control unit 11 determines whether or not a word which coincides with the relationship estimation phrase is detected from the words of the utterance text. If the determination result in Step SP214 is positive, this indicates that a person who is imaged or an imaging excluded person calls another person by the relationship estimation phrase which can be used in estimating the relationship between people.

In Step SP214, if the determination result is positive, the control unit 11 progresses to Step SP215. In Step SP215, the control unit 11 detects the position of the person who utters the relationship estimation phrase. Then, the control unit 11 progresses to Step SP216.

In Step SP216, the control unit 11 compares the words extracted from the utterance text of the person in the conversation with a plurality of motion estimation phrases held in advance by a character matching method. Then, the control unit 11 progresses to Step SP217.

In Step SP217, the control unit 11 defines the name, nickname, dialect word, strain, or the like detected from the utterance text of each person in the conversation as utterance information for detecting the way of speaking of the person. For each person, the control unit 11 obtains the evaluation values VA corresponding to the friendship determination items CO representing the way of speaking of the person on the basis of the utterance information. Then, the control unit 11 progresses to Step SP218.

In Step SP218, for each person in the conversation, the control unit 11 estimates the feeling at the time of the conversation on the basis of the speed of conversation and the pitch of voice. Then, the control unit 11 progresses to Step SP219. In Step SP219, the control unit 11 calculates the familiarity between the multiple people in the conversation by using the evaluation values VA of the way of speaking of each person in the conversation or estimated feeling at the time of the conversation. Then, the control unit 11 progresses to Step SP220. In Step SP220, the control unit 11 ends the utterance analysis/relationship estimation processing subroutine SRT2 and progresses to Step SP4 of the imaged person specification processing procedure RT1.

Meanwhile, if the determination result in Step SP204 is negative, this indicates that a person who is imaged or an imaging excluded person does not call any name of the person. In Step SP204, if the determination result is negative, the control unit 11 progresses to Step SP209.

If the determination result in Step SP207 is negative, this indicates that a character string different from the name of the person is detected from the storage motion image, and the name of the person is unable to be specified. In Step SP207, if the determination result is negative, the control unit 11 progresses to Step SP209.

If the determination result in Step SP210 is negative, this indicates that a person who is imaged or an imaging excluded person does not call any nickname of the person. In Step SP210, if the determination result is negative, the control unit 11 progresses to Step SP212.

If the determination result in Step SP214 is negative, this indicates that a person who is imaged or an imaging excluded person does not call another person by the relationship estimation phrase which can be used in estimating the relationship between the people. In Step SP214, if the determination result is negative, the control unit 11 progresses to Step SP216.

Though not shown, when only utterance text of a person who utters alone is generated, the control unit 11 carries out only Steps SP201 to SP204, Steps SP206 to SP210, and Step SP212.

[2-4-3 Motion Analysis/Relationship Estimation Processing]

Figure 16:
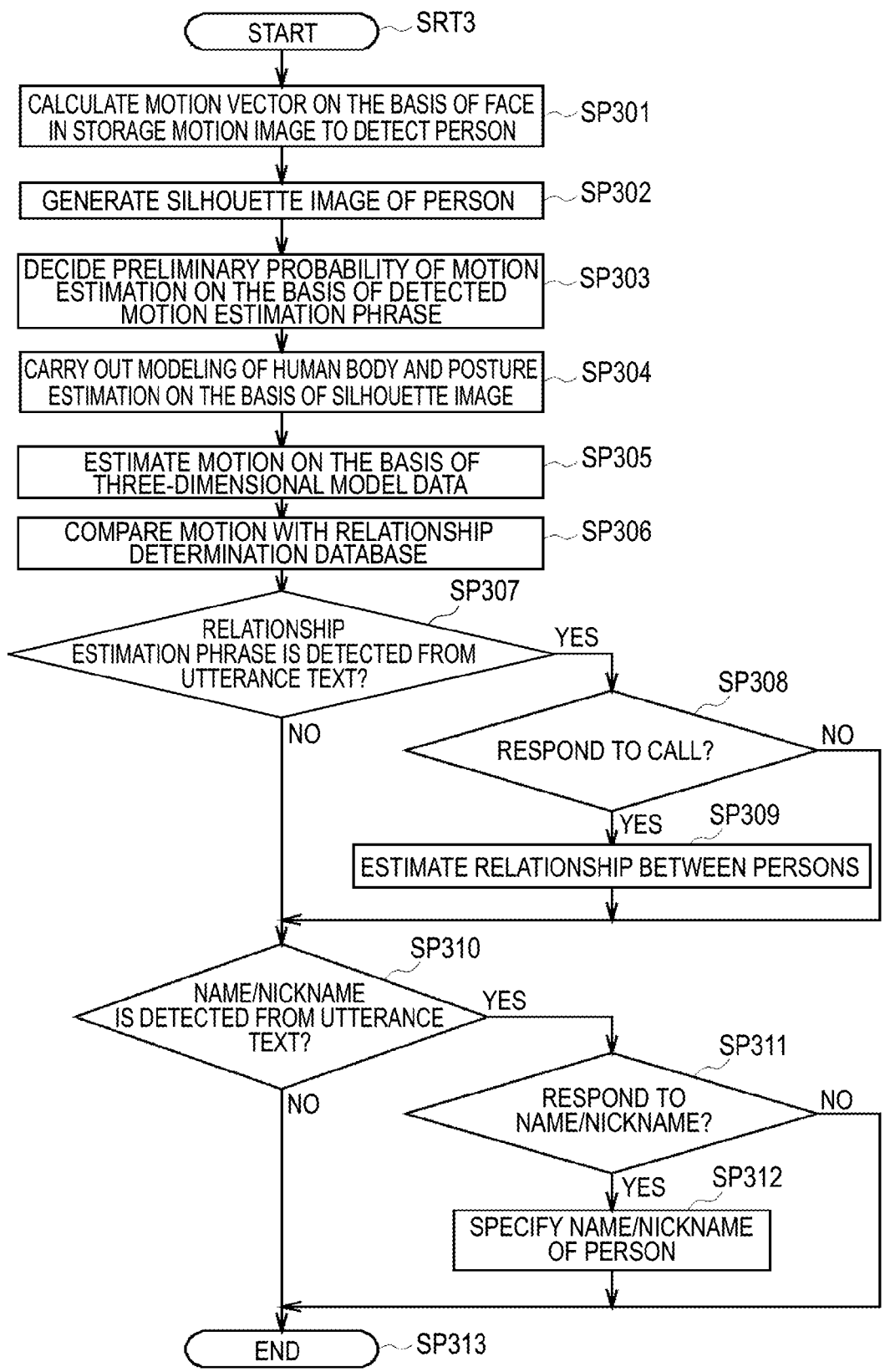
FIG. 16 is a flowchart showing a motion analysis/relationship estimation processing subroutine.

Next, motion analysis/relationship estimation processing which is carried out by the control unit 11 in Step SP4 of the imaged person specification processing procedure RT1 will be described with reference to FIG. 16. If the process progresses to Step SP4 in the imaged person specification processing procedure RT1, the control unit 11 starts a motion analysis/relationship estimation processing subroutine SRT3 shown in FIG. 16.

If the motion analysis/relationship estimation processing subroutine SRT3 starts, in Step SP301, the control unit 11 sequentially detects motion vectors from the storage motion image on the basis of one or a plurality of faces of people.

Thus, the control unit 11 sequentially detects one person or multiple people in a plurality of consecutive unit images of the storage motion image on the basis of the motion vectors. Then, the control unit 11 progresses to Step SP302.

In Step SP302, the control unit 11 generates the silhouette image of each person on the basis of one person or multiple people detected from a plurality of consecutive unit images. Then, the control unit 11 progresses to Step SP303.

In Step SP303, if a word which coincides with the motion estimation phrase is detected from the words of the utterance text, the control unit 11 decides a preliminary probability of motion estimation on the basis of the motion estimation phrase. Then, the control unit 11 progresses to Step SP304.

In Step SP304, for each person, the control unit 11 carries out modeling and pose estimation of the human body on the basis of the silhouette image to generate three-dimensional model data. Then, the control unit 11 progresses to Step SP305.

In Step SP305, the control unit 11 estimates a motion conducted by a person during imaging on the basis of three-dimensional model data. Then, the control unit 11 progresses to Step SP306. In Step SP306, the control unit 11 compares a motion conducted concurrently by multiple people with the relationship determination database to estimate the relationship between the multiple people. Then, the control unit 11 progresses to Step SP307.

In Step SP307, the control unit 11 determines whether or not a word which coincides with the relationship estimation phrase is detected from the words of the utterance text of the person who is imaged. If the determination result in Step SP307 is positive, this indicates that the person who is imaged is likely to call another person who is imaged by the relationship estimation phrase. In Step SP307, if the determination result is positive, the control unit 11 progresses to Step SP308.

In Step SP308, the control unit 11 determines whether there is a person who conducts a motion responsive to the call by the relationship estimation phrase from among the people who are imaged or not on the basis of the estimated motions for the people.

If the determination result in Step SP308 is positive, this indicates that the relationship between the person who conducts the call by the relationship estimation phrase and a person who responds to the call can be estimated by the relationship estimation phrase.

In Step SP308, if the determination result is positive, the control unit 11 progresses to Step SP309. In Step SP309, the control unit 11 estimates the relationship between the person who conducts the call by the relationship estimation phrase and the person who responds to the call in accordance with the relationship estimation phrase. Then, the control unit 11 progresses to Step SP310.

In Step SP310, the control unit 11 determines whether or not a word which coincides with the name or nickname of the person from among the words of the utterance text. If the determination result in Step SP310 is positive, this indicates that the person who is imaged is likely to be a person having the name or nickname. In Step SP310, if the determination result is positive, the control unit 11 progresses to Step SP311.

In Step SP311, the control unit 11 determines whether there is a person who conducts a motion responsive to the call by the name or nickname from among the people who are imaged or not on the basis of the estimated motions for the people.

If the determination result in Step SP311 is positive, this indicates that there is a person having the name or nickname from among the people who are imaged. In Step SP311, if the determination result is positive, the control unit 11 progresses to Step SP312.

In Step SP312, the control unit 11 specifies a person who responds to the call as the person having the name or nickname. Then, the control unit 11 progresses to Step SP313. In Step SP313, the control unit 11 ends the motion analysis/relationship estimation processing subroutine SRT3, and progresses to Step SP5 of the imaged person specification processing procedure RT1.

Meanwhile, if the determination result in Step SP307 is negative, this indicates that, since a person who is imaged does not call another person who is imaged by the relationship estimation phrase, the relationship between the multiple people is unable to be estimated by the relationship estimation phrase. In Step SP307, if the determination result is negative, the control unit 11 progresses to Step SP310.

If the determination result in Step SP308 is negative, this indicates that, since there is no person who responds to the call by the relationship estimation phrase from among the people who are imaged, the relationship between the multiple people is unable to be estimated by the relationship estimation phrase. In Step SP308, if the determination result is negative, the control unit 11 progresses to Step SP310.

If the determination result in Step SP310 is negative, this indicates that there is no person having the name or nickname from among the people who are imaged. In Step SP310, if the determination result is negative, the control unit 11 progresses to Step SP313.

If the determination result in Step SP311 is negative, this indicates that there is no person who responds to the call by the name or nickname from among the people who are imaged. In Step SP311, if the determination result is negative, the control unit 11 progresses to Step SP313.

[2-4-4 Relationship Determination Processing]

Figure 17:
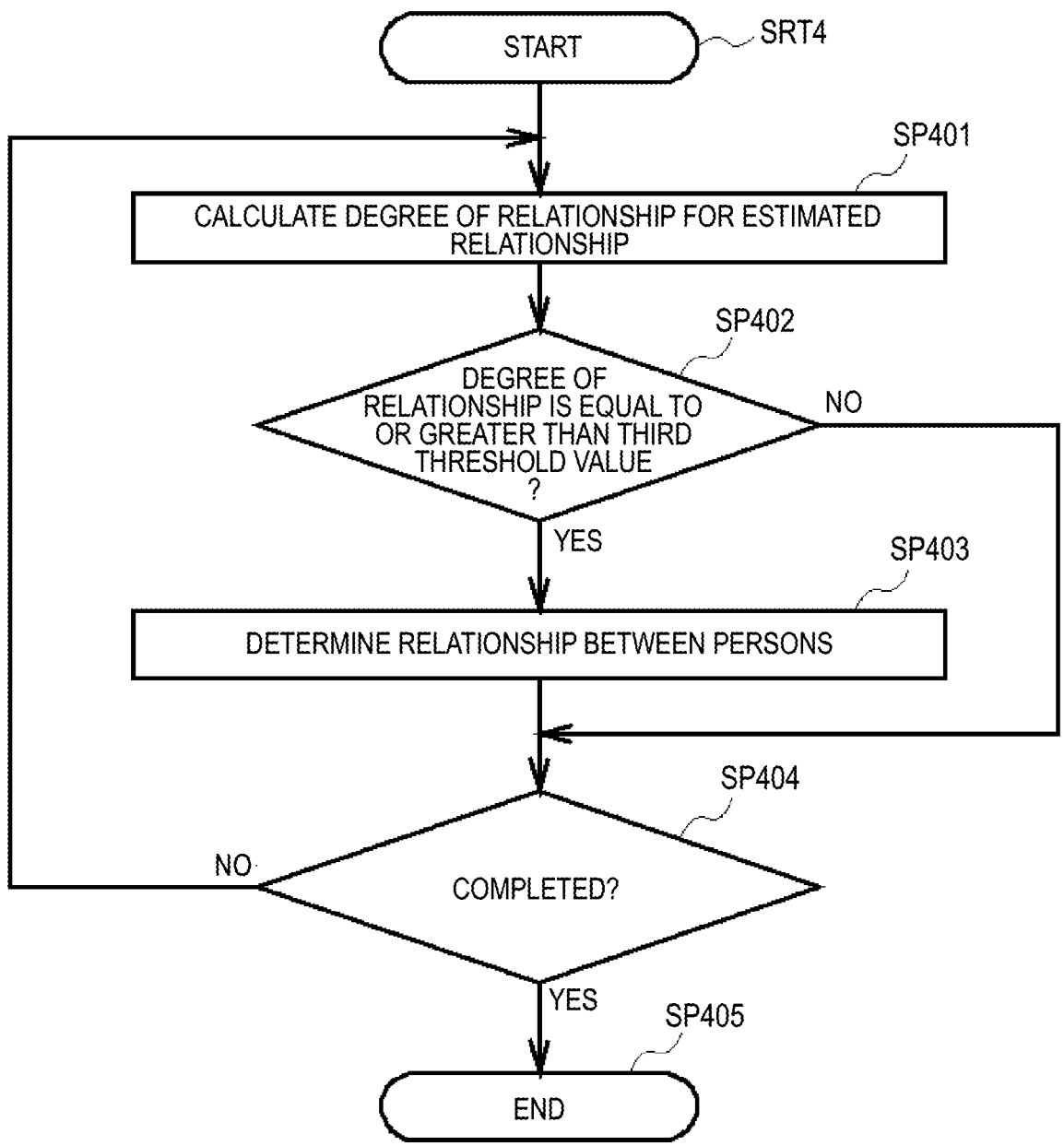
FIG. 17 is a flowchart showing a relationship determination processing subroutine.

Next, relationship determination processing which is carried out by the control unit 11 in Step SP5 of the imaged person specification processing procedure RT1 will be described with reference to FIG. 17. If the process progresses to Step SP5 in the imaged person specification processing procedure RT1, the control unit 11 starts a relationship determination processing subroutine SRT4 shown in FIG. 17.

If the relationship determination processing subroutine SRT4 starts, in Step SP401, the control unit 11 calculates the degree of relationship for the estimated relationship between multiple people on the basis of the familiarity or familiarity degree information. Then, the control unit 11 progresses to Step SP402.

In Step SP402, the control unit 11 compares the degree of relationship with the third threshold value to determine whether or not the degree of relationship is equal to or greater than the third threshold value. If the determination result in Step SP402 is positive, this indicates that the relationship between multiple people is accurately estimated. In Step SP402, if the determination result is positive, the control unit 11 progresses to Step SP403.

In Step SP403, the control unit 11 determines the relationship between the multiple people as estimated. Then, the control unit 11 progresses to Step SP404. In Step SP404, the control unit 11 determines whether or not the relationship determination ends.

If the determination result in Step SP404 is negative, this indicates that the relationship still remains as estimated. In Step SP404, if the determination result is negative, the control unit 11 returns to Step SP401.

Thereafter, the control unit 11 repeatedly carries out Steps SP401 to SP404 until the positive determination result is obtained in Step SP404. Thus, the control unit 11 determines whether or not the previously estimated relationships between the multiple people are accurate sequentially.

If the determination result in Step SP404 is positive, this indicates that the determination of whether all of the relationships are accurate or not is completed. In Step SP404, if the determination result is positive, the control unit 11 progresses to Step SP405. In Step SP404, the control unit 11 ends the relationship determination processing subroutine SRT3, and progresses to Step SP6 of the imaged person specification processing procedure RT1.

[2-4-5 Person Specification Processing]

Figure 18:
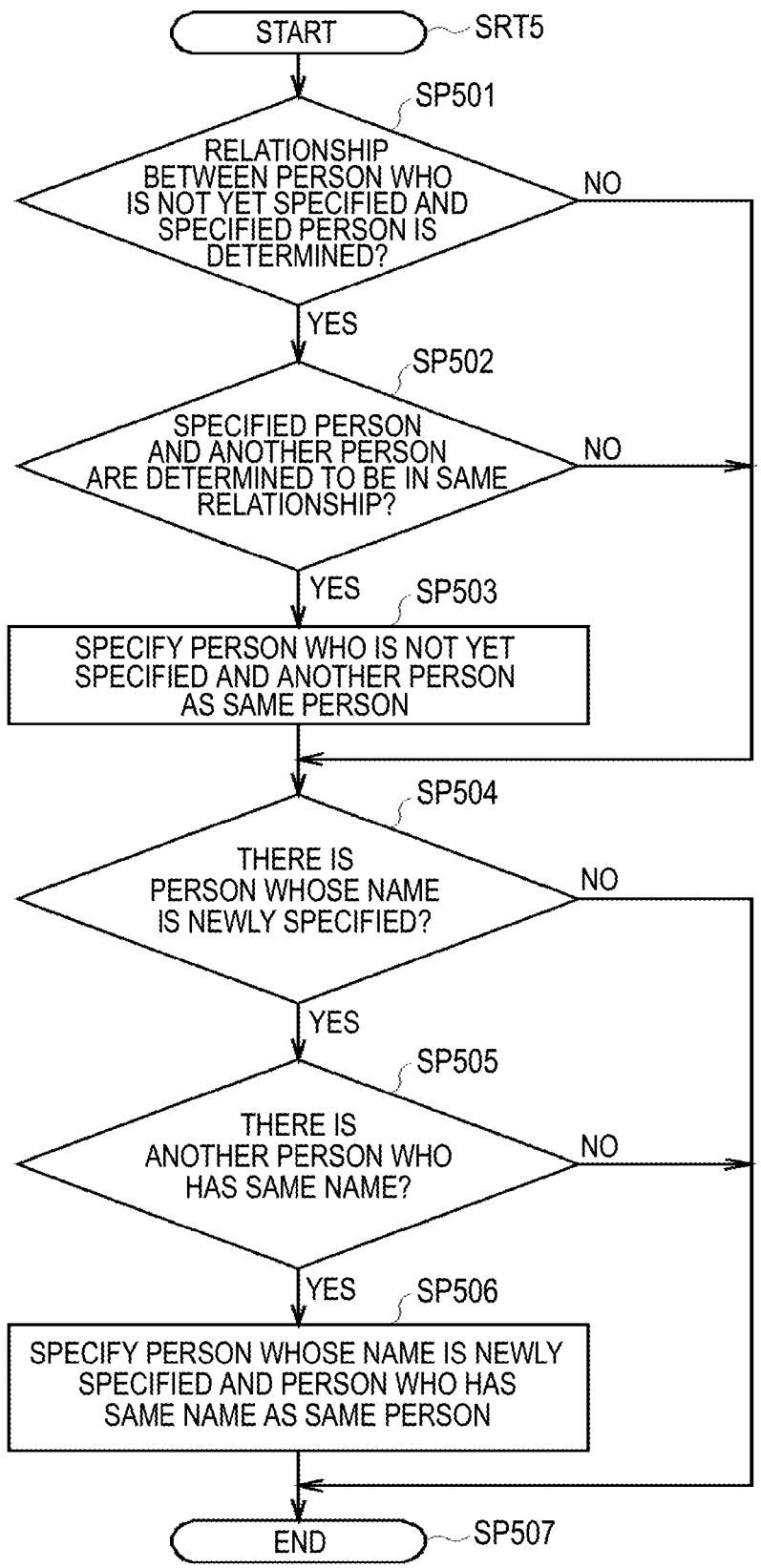
FIG. 18 is a flowchart showing a person specification processing subroutine.

Next, person specification processing which is carried out by the control unit 11 in Step SP6 of the imaged person specification processing procedure RT1 will be described with reference to FIG. 18. If the process progresses to Step SP6 in imaged person specification processing procedure RT1, the control unit 11 starts a person specification processing subroutine SRT5 shown in FIG. 18.

If the person specification processing subroutine SRT5 starts, in Step SP501, the control unit 11 determines whether the relationship between a person who is not yet specified and a specified person is determined or not on the basis of the current determination result of the relationship between the people.

If the determination result in Step SP501 is positive, this indicates that a person who is not yet specified and another person are likely to be specified as the same person. In Step SP501, if the determination result is positive, the control unit 11 progresses to Step SP502.

In Step SP502, the control unit 11 determines whether it is determined that a specified person and another specified person are in the same relationship or not on the basis of the person registration information. If the determination result in Step SP502 is positive, this indicates that a person who is not yet specified is the same person as another specified person.

In Step SP502, if the determination result is positive, the control unit 11 progresses to Step SP503. In Step SP503, the control unit 11 specifies a person who is not yet specified as the same person as another specified person. Then, the control unit 11 progresses to Step SP504.

In Step SP504, the control unit 11 determines whether there is a person having a newly specified name or not on the basis of the current person specification result. If the determination result in Step SP504 is positive, this indicates that a currently specified person is likely to be specified as the same person as a person who is already specified. In Step SP504, if the determination result is positive, the control unit 11 progresses to Step SP505.

In Step SP505, the control unit 11 determines whether there is a person who is already specified with the same name as the name of a person having a newly specified name or not on the basis of the person registration information. If the determination result in Step SP505 is positive, this indicates that a person having a newly specified name is the same person as a person who is already specified with the same name.

In Step SP505, if the determination result is positive, the control unit 11 progresses to Step SP506. In Step SP506, the control unit 11 specifies the person having the currently specified name to be the same person as the person who is already specified with the same name. Then, the control unit 11 progresses to Step SP507. In Step SP507, the control unit 11 ends the person specification processing subroutine SRT5, and progresses to Step SP6 of the imaged person specification processing procedure RT1.

[2-5 Life Album Creation Processing Procedure]

Figure 19:
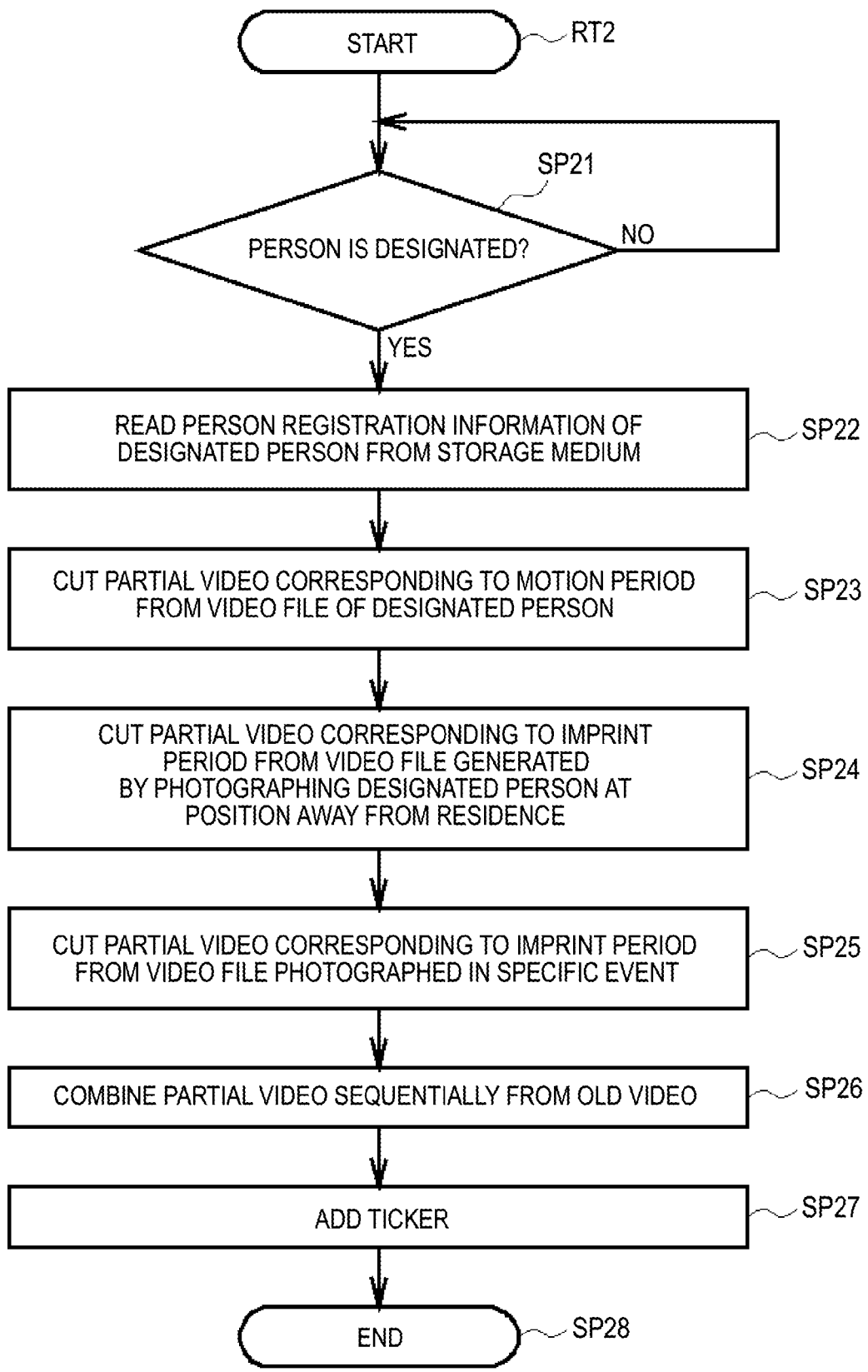
FIG. 19 is a flowchart showing a life album creation processing procedure.

Next, a life album creation processing procedure RT2 which is carried out by the control unit 11 in accordance with a user's instruction will be described with reference to FIG. 19. If the user instructs creation of a life album, the control unit 11 starts the life album creation processing procedure RT2 shown in FIG. 19 in accordance with an album creation processing stored in advance in an internal memory.

If the life album creation processing procedure RT2 starts, in Step SP21, the control unit 11 waits until the user designates a designated person who is the main character of the life album. If a designated person who is the main character of the life album is designated by a name, the control unit 11 progresses to Step SP22.

In Step SP22, the control unit 11 reads the person registration information of the designated person on the basis of the name from the person database of the storage medium 28 through the storage/reproduction unit 27. Then, the control unit 11 progresses to Step SP23.

In Step SP23, the control unit 11 reads a video file identified by the file identification information from the storage medium 28 through the storage/reproduction unit 27 on the basis of the file identification information stored in the person registration information. The control unit 11 loads header data from the video file and also loads the file attribute information from header data.

The control unit 11 retrieves the video files generated by imaging various motions of the designated person on the basis of the motion information in the file attribute information. The control unit 11 collectively extracts the portions corresponding to the motion period represented by the motion information as a partial image from storage motion image data, right sound data, left sound data, and rear sound data obtained on the basis of the retrieved video files. Then, the control unit 11 progresses to Step SP23.

In Step SP23, the control unit 11 retrieves a video file generated by imaging the designated person at a position far away from the residence of the designated person on the basis of the address information in the person registration information of the designated person and the imaging position/direction information in the file attribute information.

The control unit 11 collectively extracts the portions corresponding to the imprint period as a partial image from storage motion image data, right sound data, left sound data, and rear sound data obtained on the basis of the video file. Then, the control unit 11 progresses to Step SP24.

In Step SP24, the control unit 11 retrieves a video file generated by imaging the designated person in a specific event on the basis of the event name information in the file attribute information. The control unit 11 collectively extracts the portions corresponding to the imprint period as a partial image from storage motion image data, right sound data, left sound data, and rear sound data obtained on the basis of the retrieved video file. Then, the control unit 11 progresses to Step SP25.

In Step SP25, the control unit 11 generates single motion image data by combining a plurality of partial images sequentially from the oldest partial image to the latest partial image on the basis of the imaging date-and-time information in the file attribute information. The control unit 11 also generates three kinds of right sound data, left sound data, and rear sound data which are reproduced in synchronization with motion image data. Then, the control unit 11 progresses to Step SP26.

In Step SP26, the control unit 11 inserts a ticker into motion image data, and also adds music data of sound effect to motion image data, right sound data, left sound data, and rear sound data to generate life album data. Then, the control unit 11 progresses to Step SP27. In Step SP27, the control unit 11 ends the life album creation processing procedure RT2.

[2-6 Operation and Effect of First Embodiment]

With the above-described configuration, the control unit 11 of the digital video camera 10 images the subject to generate storage motion image data, right sound data, left sound data, and rear sound data, and stores storage motion image data, right sound data, left sound data, and rear sound data in the storage medium 28. Thereafter, the control unit 11 of the digital video camera 10 reads storage motion image data, right sound data, left sound data, and rear sound data from the storage medium 28.

The control unit 11 of the digital video camera 10 carries out the imaged person specification processing to detect a person in the storage motion image based on storage motion image data. The control unit 11 of the digital video camera 10 appropriately specifies a person and determines the relationship between the person and another person on the basis of the analysis result of right sound data, left sound data, and rear sound data and the analysis result of storage motion image data. The control unit 11 of the digital video camera 10 stores the person relationship information representing the relationship between the people in the storage medium 28.

Each time newly stored storage motion image data, right sound data, left sound data, and rear sound data are read from the storage medium 28, the control unit 11 of the digital video camera 10 carries out the imaged person specification processing to determine the relationship between the people. The control unit 11 of the digital video camera 10 stores the person relationship information representing the determined relationship in the storage medium 28.

During the imaged person specification processing, if the relationship between an unspecified person and a specified person is determined, the control unit 11 of the digital video camera 10 specifies the unspecified person on the basis of the determined relationship and the relationship between the people represented by the person relationship information which is already stored.

Therefore, even when a person detected from the storage motion image is the same person as a person detected from another storage motion image with the facial appearance changed, the control unit 11 of the digital video camera 10 can specify the person detected from the storage motion image to be the same person as the person detected from another storage motion image.

According to the above-described configuration, the digital video camera 10 images a person to generate storage motion image data, right sound data, left sound data, and rear sound data, if multiple people are detected from the storage motion image based on storage motion image data, appropriately specifies multiple people on the basis of the analysis result of right sound data, left sound data, and rear sound data and the analysis result of storage motion image data, and determines the relationship between the multiple people. The digital video camera 10 stores the person relationship information representing the determined relationship in the storage medium 28, and when the relationship between an unspecified person and a specified person is determined, specifies the unspecified person on the basis of the determined relationship and the relationship between the multiple people represented by the person relationship information which is already stored. Therefore, even when a person detected from the storage motion image is the same person as a person detected from another storage motion image with the facial appearance changed, the digital video camera 10 can specify the person detected from the storage motion image to be the same person as the person detected from another storage motion image. As a result, even when the facial appearance is changed with the growth of the person, the digital video camera 10 can accurately retrieve the storage motion image in which the person appears.

The control unit 11 of the digital video camera 10 analyzes storage motion image data to detect a specific motion of a person, and determines the relationship between multiple people on the basis of the detected motion. Therefore, the control unit 11 of the digital video camera 10 can accurately determine the relationship between multiple people, and can specify a person on the basis of the relationship determined in such a manner, such that the person can be accurately specified.

The control unit 11 of the digital video camera 10 analyzes right sound data, left sound data, and rear sound data to obtain the utterance of people at the time of imaging, and determines the relationship between multiple people on the basis of the utterance and the motions of the people.

Therefore, the control unit 11 of the digital video camera 10 can more accurately determine the relationship between multiple people, and can specify a person on the basis of the relationship determined in such a manner, such that the person can be more accurately specified.

The control unit 11 of the digital video camera 10 analyzes right sound data, left sound data, and rear sound data to obtain the familiarity between people from the conversation, and estimates the relationship between multiple people by motions or combinations of utterance and motions. The control unit 11 of the digital video camera 10 finally determines the estimated relationship by using the familiarity.

Therefore, the control unit 11 of the digital video camera 10 can more accurately determine the relationship between multiple people, and can specify a person on the basis of the relationship determined in such a manner, such that the person can be more accurately specified.

When the relationship between multiple people is estimated, the control unit 11 of the digital video camera 10 extracts the familiarity degree information representing the degree of familiarity between the multiple people from the storage motion image, and finally determines the estimated relationship by using the familiarity degree information along with the familiarity.

Therefore, the control unit 11 of the digital video camera 10 can more accurately determine the relationship between multiple people, and can specify a person on the basis of the relationship determined in such a manner, such that the person can be more accurately specified.

<3. Second Embodiment>
[3-1 Circuit Configuration of Printing Apparatus]

Figure 20:
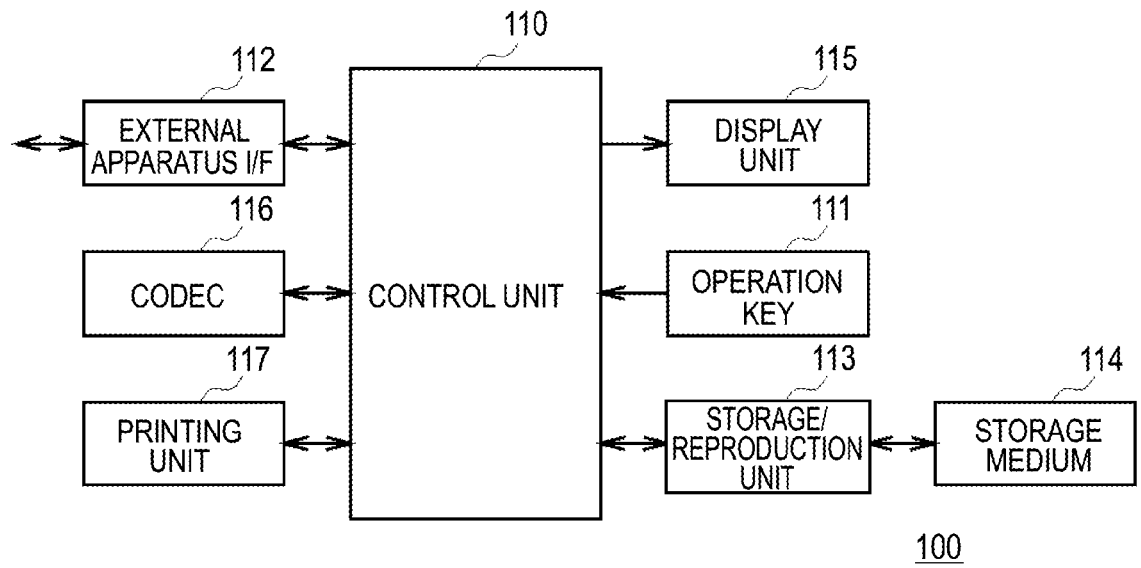
FIG. 20 is a block diagram showing the circuit configuration by hardware circuit blocks of a printing apparatus.

Next, the circuit configuration by hardware circuit blocks of a printing apparatus 100 which is a specific example of the above-described information processing apparatus 1 (FIG. 1) will be described with reference to FIG. 20. As shown in FIG. 20, the printing apparatus 100 has a control unit 110 which is constituted by, for example, a microprocessor.

The control unit 110 performs overall controls of the printing apparatus 100 and carries out predetermined arithmetic processing in accordance with various programs stored in advance in an internal memory (not shown). The control unit 110 loads an input signal input in accordance with an operation of an operation key 111 provided, for example, in the housing of the printing apparatus 100 and carries out various kinds of processing in accordance with the input signal.

As the operation key 111, the housing of the printing apparatus 100 is provided with a load instruction key for instructing to load a video file or an image file from an external apparatus.

As the operation key 111, the housing of the printing apparatus 100 is also provided with an image designation key for designating an image to be printed for a picture, a printing instruction key for instruction printing of an image, and the like.

Actually, an external apparatus, such as a digital video camera, digital still camera, a camera-equipped mobile phone, a personal computer, or a data storage apparatus, can be connected to the control unit 110 through an external apparatus interface 112.

An external apparatus, such as a digital video camera, a digital still camera, or a camera-equipped mobile phone, which has an imaging function for a motion image images a subject for a motion image and generates a video file having the same configuration as in the digital video camera 10 according to the above-described first embodiment.

If a subject is video-recorded and a video file is generated in such a manner, the external apparatus stores the generated video file. In the following description, imaging for a motion image is also called video-recording.

Meanwhile, an external apparatus, such as a digital video camera, a digital still camera, or a camera-equipped mobile phone, which has an imaging function for a picture images a subject for a picture and generates still image data of the subject. In the following description, imaging for a picture is also called picture-capturing.

At this time, such an external apparatus compresses and encodes still image data to generate compressed image data. The external apparatus also generates header data which stores attribute information of still image data (hereinafter, also called still image attribute information).

The external apparatus adds header data, which stores the still image attribute information, to the header of compressed image data generated on the basis of still image data to generate an image file. If the subject is picture-captured and an image file is generated, the external apparatus stores the generated image file.

When the subject is picture-captured, the external apparatus stores, in header data added to the header of compressed image data, identification information (for example, a file name which is hereinafter also called file identification information) for individually identifying an image file as the still image attribute information.

The file identification information of the video file and the file identification information of the image file are generated such that it is possible to differentiate whether a corresponding file is a video file or an image file, for example, by an extension as a part of the file name.

When the subject is picture-captured, the external apparatus carries out reduction processing for thinning out the pixels in still image data obtained by picture-capturing. Thus, the external apparatus generates reduced image data (hereinafter, also called thumbnail data) of a reduced image (hereinafter, also called a thumbnail image) for use in retrieving a still image based on still image data.

The external apparatus also stores thumbnail data in the header data as still image attribute information. The external apparatus also stores, in the header data, imaging date-and-time information representing imaging date and time of picture-capturing of the subject detected by a timer, imaging position information representing the imaging position (latitude and longitude) positioned by the GPS, and the like as still image attribute information.

In addition, an external apparatus, such as a personal computer or a data storage apparatus, which has a file holding function, loads and stores video files or image files from a digital video camera, a digital still camera, a camera-equipped mobile phone, or the like.

In a state of being connected to an external apparatus through the external apparatus interface 112, if the load instruction key is operated to instruct loading of a video file, the control unit 110 of the printing apparatus 100 loads a video file from the external apparatus.

At this time, the control unit 110 sends the video file loaded from the external apparatus to a storage/reproduction unit 113, and stores the video file in a storage medium 114 through the storage/reproduction unit 113. In this way, the control unit 110 can save a plurality of video files in the storage medium 114.

The storage/reproduction unit 113 is, for example, a hard disk drive which is incorporated in the printing apparatus 100, and the storage medium 114 is a hard disk which is provided in the hard disk drive.

In a state of being connected to the external apparatus through the external apparatus interface 112, if the load instruction key is operated to instruct loading of an image file, the control unit 110 loads an image file from the external apparatus.

At this time, the control unit 110 sends the image file loaded from the external apparatus to the storage/reproduction unit 113, and stores the image file in the storage medium 114 through the storage/reproduction unit 113. In this way, the control unit 110 can save a plurality of image files in the storage medium 114.

Meanwhile, for example, if the operation key 111 is operated to select a printing function to manually designate the number of print copies of an image, the control unit 110 is put in a printing mode (hereinafter, also called number-of-copies designation printing mode) in which the number of print copies is manually designated and an image is printed.

If the number-of-copies designation printing mode is carried out, the control unit 110 sequentially reads a plurality of stored image files from the storage medium 114 through the storage/reproduction unit 113.

The control unit 110 loads header data from a plurality of image files and also loads thumbnail data from header data along with the file identification information. The control unit 110 generates thumbnail list image data on the basis of a plurality of kinds of thumbnail data and file identification information, and sends generated thumbnail list image data to a display unit 115.

Therefore, the control unit 110 displays a list of a plurality of thumbnails on the basis of thumbnail list image data on the display unit 115 in association with text (character strings) representing the file identification information respectively so as to allow the user to confirm a printable still image as a thumbnail.

The display unit 115 is a liquid crystal display, a plasma display, an organic EL display, a field emission display (FED), or the like which is incorporated in or externally attached to the printing apparatus 100.

In this state, if the printing instruction key is operated to select one still image on the display screen as a thumbnail, and printing of the selected still image is instructed along with the number of print copies, the control unit 110 loads compressed image data from the image file corresponding to the selected still image. The control unit 110 sends compressed image data to a codec 116.

At this time, the codec 116 decompresses and decodes compressed image data provided from the control unit 110 to generate original still image data. The codec 116 sends the still image data to the control unit 110.

If still image data is provided from the codec 116, the control unit 110 sends the still image data and a number-of-copies instruction signal for instructing the number of print copies of the still image based on still image data to a printing unit 117 as printing data.

The printing unit 117 has a sheet feed unit (not shown). If printing data is provided from the control unit 110, the printing unit 117 prints the still image on the printing sheet while sequentially loading the printing sheets corresponding to the instructed number of print copies through the sheet feed unit on the basis of printing data, and discharges the printing sheets with the still image printed.

The printing unit 117 prints a still image or unit images constituting a storage motion image described below on a printing sheet by any printing method from among various printing methods, such as a laser method, an ink jet method, a thermal transfer method, a dot impact method, and the like.

In this way, the control unit 110 allows the user to designate a still image to be printed from among a plurality of still images obtained by picture-capturing the subject along with the number of print copies, and sequentially prints the designated still image on the printing sheets corresponding to the designated number of print copies, providing the still image as a picture.

[3-2 Imaged Person Specification Processing]

If a video file is stored in the storage medium 114, the control unit 110 carries out the imaged person specification processing procedure RT1 (FIG. 12) in accordance with the imaged person specification program stored in advance in the internal memory in the same manner as in the digital video camera 10 (FIG. 2) according to the first embodiment.

That is, the control unit 110 holds various databases, such as a face feature database 48, a motion estimation phrase database 61, a motion database 63, and a relationship determination database 64, similarly to the control unit 11 (FIG. 2) of the digital video camera 10 according to the first embodiment.

In this state, the control unit 110 reads a video file from the storage medium 114 through the storage/reproduction unit 113, loads video data from the video file, and sends the video data to the codec 116. At this time, the control unit 110 also loads header data added to the header of video data from the video file.

If video data is provided from the control unit 110, the codec 116 generates original storage motion image data and original right sound data, left sound data, and rear sound data on the basis of video data. The codec 116 returns these storage motion image data, right sound data, left sound data, and rear sound data to the control unit 110.

In this way, each time a video file is read from the storage medium 114, the control unit 110 obtains original storage motion image data, right sound data, left sound data, and rear sound data by using the codec 116.

The control unit 110 carries out various kinds of processing, such as subject detection processing, utterance analysis/relationship estimation processing, and motion analysis/relationship estimation processing, as the imaged person specification processing by using header data, along with storage motion image data, right sound data, left sound data, and rear sound data.

Thus, the control unit 110 determines the relationship between multiple people in the storage motion image based on storage motion image data, and specifies the person to generate person registration information.

The control unit 110 newly stores the person registration information in the storage medium 114 through the storage/reproduction unit 113, such that the person registration information is registered in a person database constructed in advance in the storage medium 114.

The control unit 110 specifies a person in the storage motion image based on storage motion image data on the basis of the relationship between the multiple people, and updates (unifies) the contents of the person registration information of the specified person. The control unit 110 stores the person registration information in the storage medium 114 through the storage/reproduction unit 113, thereby updating the person registration information which is already registered in the person database.

The control unit 110 generates the file attribute information for the video file used in determining and specifying the relationship between people, and adds header data, which stores the generated file attribute information, to video data again, thereby updating the contents of the video file.

The control unit 110 sends the video file with the contents updated to the storage/reproduction unit 113, and stores the video file again in the storage medium 114 through the storage/reproduction unit 113 so as to be written over the video file before the contents are updated.

In this way, the control unit 110 stores the video file with the contents updated in the storage medium 114, and registers the person registration information regarding multiple people in the storage motion image in the person database of the storage medium 114 while appropriately updating the contents.

[3-3 Printing Processing]

As described above, although, during the number-of-copies designation printing mode, the control unit 110 can print a still image while the number of print copies is manually designated, a still image or unit images constituting a storage motion image may be printed for a picture while the number of print copies is automatically selected.

Hereinafter, printing processing (hereinafter, also called number-of-copies selection/printing processing) will be described in which the control unit 110 prints a still image or unit images constituting a storage motion image for a picture while the number of print copies is automatically selected.

If the operation key is operated to select a printing function to print a still image or unit images constituting a storage motion image for a picture while the number of print copies is automatically selected, thus the control unit 110 is put in a printing mode in which an image is printed while the number of print copies is automatically selected.

In the following description, the printing function to print a still image or unit images constituting a storage motion image for a picture while the number of print copies is automatically selected is also called a number-of-copies selection/printing function. In the following description, the printing mode in which a still image or unit images constituting a storage motion image are printed for a picture while the number of print copies is automatically selected is also called a number-of-copies selection/printing mode.

If the number-of-copies selection/printing mode is carried out, the control unit 110 is configured such that, with regard to the type of image to be printed for a picture, only one of a still image, only each unit image constituting a storage motion image, or both a still image and a unit image is arbitrarily designated through the image designation key. In the following description, the type of image to be printed for a picture is also called a printing image type.

When the printing image type is designated to be only a still image, the control unit 110 is configured such that an image to be printed is designated, for example, as a still image generated by picture-capturing a subject on a desired imaging date through the image designation key.

When the printing image type is designated to be both a still image and a unit image, the control unit 110 is configured such that an image to be printed is designated, for example, as a still image generated by picture-capturing a subject on a desired imaging date or a storage motion image generated by video-recording the subject through the image designation key.

That is, when the printing image type is designated to be only a still image or to be both a still image and a unit image, the control unit 110 is configured such that an image to be printed is designated as the imaging date of the subject through the image designation key.

At this time, the control unit 110 is configured such that the imaging date is designated as one desired day or a period of two or more desired consecutive days (several consecutive days from a desired date to another desired date or one or two or more months) through the image designation date. In the following description, an imaging date of one day for designating an image to be printed is also called a designated date, and a period of two or more consecutive days is also called a designated period.

When the printing image type is designated to be only a unit image, the control unit 110 is configured such that an image to be printed is designated, for example, as a storage motion image of a person who conducts a desired motion through the image designation key.

That is, when the printing image type is designated to be only a unit image, the control unit 110 is configured such that an image to be printed is designated, for example, as a desired motion (hug, piggyback, or the like) through the image designation key. In the following description, a desired motion which is designated through the image designation key is also called a designated motion.

Hereinafter, first, printing of a still image when the image designation key is operated to designate the printing image type to be only a still image will be described. Next, printing a still image and a unit image when the image designation key is operated to designate the printing image type to be both a still image and a unit image will be described. Subsequently, printing of a unit image when the image designation key is operated to designate the printing image type to be only a unit image will be described.

Figure 21:
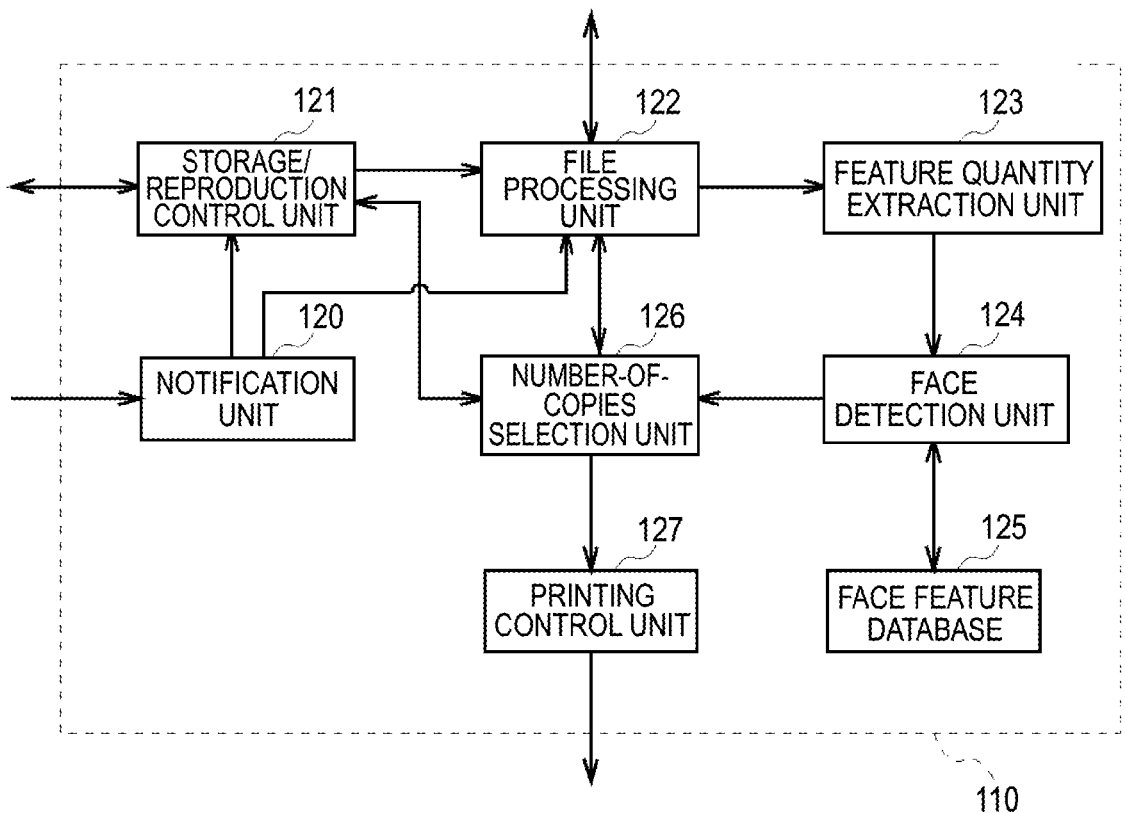
FIG. 21 is a block diagram showing the circuit configuration by functional circuit blocks for description of the functions of a control unit.

Meanwhile, at this time, the control unit 110 carries out various kinds of processing as the number-of-copies selection/printing processing in accordance with a printing control program stored in advance in the internal memory, realizing various functions. Hereinafter, description will be provided with reference to FIG. 21 while various functions realized by the control unit 110 in accordance with the printing control program are referred to as functional circuit blocks, and various kinds of processing carried out by the control unit 110 are referred to as processing carried out by the functional circuit blocks, for convenience.

First, if the image designation key is operated, and the still image as the printing image type and the designated date or designated period are designated, a notification unit 120 sends a designation signal representing the designated contents to a storage/reproduction control unit 121.

If the designation signal is provided from the notification unit 120, the storage/reproduction control unit 121 compares the imaging date-and-time information included in a plurality of image files in the storage medium 114 with the designated date or designated period on the basis of the designation signal through the storage/reproduction unit 113.

Thus, the storage/reproduction control unit 121 retrieves all image files generated by picture-capturing the subject on the designated date or the designated period designated by the user from among a plurality of image files in the storage medium 114.

The storage/reproduction control unit 121 sequentially reads the retrieved image files from the storage medium 114 through the storage/reproduction unit 113 and sends the image files to a file processing unit 122.

If a single image file is provided from the storage/reproduction control unit 121, the file processing unit 122 loads compressed image data from the image file and sends compressed image data to the codec 116.

At this time, the codec 116 decompresses and decodes compressed image data provided from the file processing unit 122 to generate original still image data. The codec 116 sends the still image data to the file processing unit 122.

If still image data is provided from the codec 116, the file processing unit 122 sends the still image data to the feature quantity extraction unit 123. In this way, each time an image file is read from the storage medium 114 through the storage/reproduction control unit 121, the file processing unit 122 obtains original still image data by using the codec 116, and sends still image data to the feature quantity extraction unit 123.

Each time still image data is provided from the file processing unit 122, the feature quantity extraction unit 123 carries out feature quantity extraction processing. Actually, the feature quantity extraction unit 123 holds in advance face information representing the rough luminance distribution of the face of the person and the pattern of the rough structure of the face for use in the above-described imaged person specification processing (subject detection processing).

Thus, if still image data is provided from the file processing unit 122, and the feature quantity extraction processing is carried out, the feature quantity extraction unit 123 retrieves one or a plurality of postulated regions postulated to include the face of the person in the still image based on the still image data on the basis of the face information.

As a result, if one or a plurality of postulated regions are detected in the still image, for each detected postulated region, the feature quantity extraction unit 123 extracts, for example, the shapes of a plurality of outlines, the position relationship between the plurality of outlines, colors, and the like as the postulated region feature quantity from the postulated region. The feature quantity extraction unit 123 sends the extracted postulated region feature quantity to a face detection unit 124, along with still image data.

However, if all of the postulated regions in the still image are not detected, the feature quantity extraction unit 123 sends only still image data of the still image to the face detection unit 124.

Each time one or a plurality of postulated region feature quantities are provided from the feature quantity extraction unit 123 along with still image data, or each time only still image data is provided from the feature quantity extraction unit 123, the face detection unit 124 carries out face detection processing.

That is, if one or a plurality of postulated region feature quantities are provided from the feature quantity extraction unit 123 along with still image data, and the face detection processing is carried out, the face detection unit 124 reads a plurality of types of face detection feature quantities for use in the above-described imaged person specification processing (subject estimation processing) from the face feature database 125.

The face detection unit 124 sequentially uses a plurality of types of face detection feature quantities, and carries out arithmetic processing on the basis of the face detection feature quantity and the postulated region feature quantity. Thus, for each postulated region of the still image, the face detection unit 124 calculates a plurality of accuracies representing how much the subject in the postulated region is probable as the face of a man or a woman by age.

The face detection unit 124 sequentially compares a plurality of accuracies calculated for each postulated region with a threshold value selected in advance (that is, second threshold value in the subject detection processing).

As a result, if at least one of a plurality of accuracies calculated for a certain postulated region of the still image is equal to or greater than the threshold value, the face detection unit 124 estimates that subject in the postulated region of the still image is the face of the person.

If it is estimated that the subject in the postulated region of the still image is the face of the person, the face detection unit 124 defines the postulated region feature quantity of the postulated region where the face of the person appears as the subject (that is, the postulated region feature quantity extracted from the postulated region) as the person face feature quantity.

In this way, the face detection unit 124 detects the face of the person in the postulated region of the still image, and detects the postulated region feature quantity of the postulated region where the face of the person appears as the person face feature quantity of the face of the person. In the following description, the person face feature quantity of the face of the person detected from the still image is specifically also called a detected person face feature quantity.

If all of a plurality of accuracies calculated for a certain postulated region of the still image are smaller than the threshold value, the face detection unit 124 determines that the subject in the postulated region of the still image is not the face of the person. That is, the face detection unit 124 determines that the face of the person is not in the postulated region of the still image.

If it is determined that the subject in a certain postulated region of the still image is not the face of the person, the face detection unit 124 discards the postulated region feature quantity of the postulated region (that is, the postulated region feature quantity extracted from the postulated region) without defining as the detected person face feature quantity.

When the detected person face feature quantity is detected from the still image in such a manner along with the face of the person, the face detection unit 124 sends the detected person face feature quantity detected to a number-of-copies selection unit 126 along with still image data of the still image.

When any detected person face feature quantity could not be detected from the still image along with the face of the person, the face detection unit 124 sends only still image data of the still image to the number-of-copies selection unit 126.

When only still image data is provided from the feature quantity extraction unit 123, and the face detection processing is carried out, the face detection unit 124 sends only still image data to the number-of-copies selection unit 126 as it is.

Each time the detected person face feature quantity is provided from the face detection unit 124 along with still image data, or each time only still image data is provided, the number-of-copies selection unit 126 carries out number-of-copies selection processing.

Actually, if the detected person face feature quantity is provided from the face detection unit 124 along with still image data, and the number-of-copies selection processing is carried out, the number-of-copies selection unit 126 detects the number of detected person face feature quantities. That is, the number-of-copies selection unit 126 detects the number of people in the still image as the number of detected person face feature quantities detected from the still image.

If it is detected that the number of detected person face feature quantities is at least two (that is, at least two people are in the still image), the number-of-copies selection unit 126 requests storage/reproduction control unit 121 to read the person registration information.

At this time, the storage/reproduction control unit 121 reads all kinds of person registration information from the storage medium 114 through the storage/reproduction unit 113 in accordance with the reading request from the number-of-copies selection unit 126, and sends a plurality of kinds of read person registration information to the number-of-copies selection unit 126.

If a plurality of kinds of person registration information are provided from the storage/reproduction control unit 121, the number-of-copies selection unit 126 sequentially compares a plurality of detected person face feature quantities respectively with the person face feature quantities stored in the person information of a plurality of kinds of person registration information. In the following description, the person face feature quantity stored in the person information of the person registration information is specifically also called a registered person face feature quantity.

Thus, the number-of-copies selection unit 126 determines whether there is the registered person face feature quantity, which coincides with the detected person face feature quantity, from among a plurality of kinds of person registration information or not on the basis of the comparison result of the detected person face feature quantity and the registered person face feature quantity.

That is, the number-of-copies selection unit 126 determines whether or not each of the multiple people in the still image is already registered as the person registration information.

Actually, in determining whether multiple people in the still image are already registered or not, the number-of-copies selection unit 126 calculates the degree of coincidence representing how much the detected person face feature quantity and the registered person face feature quantity coincide with each other on the basis of the detected person face feature quantity and the registered person face feature quantity.

The number-of-copies selection unit 126 compares the degree of coincidence with a predetermined threshold value selected in advance and, if the degree of coincidence is equal to or greater than the threshold value, determines that the person face feature quantity and the person face feature quantity coincide with each other. That is, if the degree of coincidence is equal to or greater than the threshold value, the number-of-copies selection unit 126 determines that the detected person face feature quantity and the registered person face feature quantity are the person face feature quantities of the same person.

The number-of-copies selection unit 126 compares the degree of coincidence with the threshold value and, if the degree of coincidence is smaller than the threshold value, determines that the detected person face feature quantity does not coincide with the registered person face feature quantity. That is, if the degree of coincidence is smaller than the threshold value, the number-of-copies selection unit 126 determines that the detected person face feature quantity and the registered person face feature quantity are the person face feature quantities of different people.

When it is determined that the detected person face feature quantity and the registered person face feature quantity coincide with each other, the number-of-copies selection unit 126 determines that the person who has the face of the detected person face feature quantity (that is, the person in the still image) is already registered. In this way, the number-of-copies selection unit 126 determines whether or not each of the multiple people in the still image is already registered.

As a result, when it is detected that all of the people in the still image are already registered, the number-of-copies selection unit 126 determines the relationship between the multiple people, such as a family or friends, on the basis of the detected person face feature quantity of the registered person and the person relationship information in the person registration information.

The number-of-copies selection unit 126 detects, for example, the number of groups of people as a family from among the multiple people and the total number of person in all of the groups on the basis of the determination result of the relationship between the people. The number-of-copies selection unit 126 also detects the number of people who do not have any relatives from among the multiple people on the basis of the determination result of the relationship between the people.

Two or more people as relatives are people who are a married couple, parent and child, brothers, sisters, a family, or the like. In the following description, a group of two or more people who are a married couple, parent and child, brothers, sisters, a family, or the like as relatives is also called a person group.

In the following description, a person who does not have any relatives from among the multiple people in the still image is specifically called an out-of-group person.

When one or more person groups are detected from the multiple people, the number-of-copies selection unit 126 selects the number of print copies of the still image for all of the person groups to be the same as the number of person groups such that the still image is printed one copy for one person group.

That is, the number-of-copies selection unit 126 selects the number of print copies in terms of the person groups such that only one copy of the still image is printed and shared, instead of printing the still image for each of two or more people who belong to one person group.

When one out-of-group person or multiple out-of-group people are detected from among the multiple people, the number-of-copies selection unit 126 selects the number of print copies of the still image for all of the out-of-group people to be the same as the number of out-of-group people such that the still image is printed one copy for each of the out-of-group people.

At this time, if no out-of-group person is in the still image and only people in one or more person groups are in the still image, the number-of-copies selection unit 126 decides the number of print copies selected for all of the person groups as the number of print copies of the still image as it is.

If people in one or more person groups and one out-of-group person or multiple out-of-group people are in the still image, the number-of-copies selection unit 126 adds the numbers of print copies respectively selected for all of the person groups and for all of the out-of-group people. The number-of-copies selection unit 126 decides the number of print copies (the sum of the numbers of print copies) obtained by addition as the number of print copies of the still image.

If only one out-of-group person or multiple out-of-group people are in the still image, the number-of-copies selection unit 126 decides the number of print copies selected for all of the out-of-group people as the number of print copies of the still image as it is.

Meanwhile, as a result of the determination of whether or not the multiple people in the still image are already registered, when it is detected that two or more people from among the multiple people, not all of the multiple people, are registered, the number-of-copies selection unit 126 determines the relationship between the multiple registered people. That is, at this time, the number-of-copies selection unit 126 determines the relationship between the multiple registered people on the basis of the detected person face feature quantities of the multiple registered people and the person relationship information in the person registration information.

In this case, the number-of-copies selection unit 126 detects the number of person groups from among the multiple people and the total number of people in all of the person groups on the basis of the determination result of the relationship, and also detects the number of out-of-group people.

At this time, since there is no person registration information for one unregistered person or multiple unregistered people, and the people as relatives are unable to be detected, the number-of-copies selection unit 126 detects the number of people for all of the unregistered people as out-of-group people who do not have any relatives.

In the following description, one out-of-group person or multiple out-of-group people from among the multiple registered people are also called registered out-of-group people, and one unregistered person or multiple unregistered people are also called unregistered out-of-group people.

When one or more person groups are detected from among the multiple registered people, the number-of-copies selection unit 126 selects the number of print copies of the still image for all of the person groups to be the same as the number of person groups such that the still image is printed one copy for one group.

When one registered out-of-group person or multiple registered out-of-group people are detected, the number-of-copies selection unit 126 selects the number of print copies of the still image for all of the registered out-of-group people to be the same as the number of registered out-of-group people such that the still image is printed one copy for one registered out-of-group person.

The number-of-copies selection unit 126 selects the number of print copies of the still image for all of the unregistered out-of-group people to be the same as the number of unregistered out-of-group people such that the still image is printed one copy for one unregistered out-of-group person.

If no registered out-of-group person is in the still image, and the people in one or more person groups are in the still image, the number-of-copies selection unit 126 adds the numbers of print copies respectively selected for all of the unregistered out-of-group people and for all of the person groups. The number-of-copies selection unit 126 decides the number of print copies obtained by addition (the sum of the numbers of print copies) as the number of print copies of the still image.

If no person in the person group is in the still image, and one registered out-of-group person or multiple registered out-of-group people are in the still image, the number-of-copies selection unit 126 adds the numbers of print copies respectively selected for all of the unregistered out-of-group people and for all of the registered out-of-group people. The number-of-copies selection unit 126 decides the number of print copies obtained by addition (the sum of the numbers of print copies) as the number of print copies of the still image.

If one registered out-of-group person or multiple registered out-of-group people and the people in one or more person groups are in the still image, the number-of-copies selection unit 126 adds the numbers of print copies selected for all of the unregistered out-of-group people, for all of the registered out-of-group people, and for all of the person groups. The number-of-copies selection unit 126 decides the number of print copies obtained by addition (the sum of the numbers of print copies) as the number of print copies of the still image.

As a result of the determination of whether or not the multiple people in the still image are already registered, when it is determined that only one person from among the multiple people is registered, the number-of-copies selection unit 126 does not determine the relationship between the multiple people.

The number-of-copies selection unit 126 defines all of the people in the still image as out-of-group people who do not have any relatives, regardless of registered or unregistered. That is, even when there are two or more unregistered people, when there is only one registered person, there is no person registration information of the unregistered person, and the people as relatives are unable to be detected, thus the number-of-copies selection unit 126 defines all of the people as out-of-group person who do not have any relatives.

For this reason, at this time, the number-of-copies selection unit 126 selects the number of print copies such that the still image is printed by the number of people in the still image, regardless of the people being registered or unregistered, and decides the selected number of print copies.

As a result of the determination of whether or not the multiple people in the still image are already registered, when it is detected that all of the multiple people are not registered, the number-of-copies selection unit 126 defines all of the unregistered people as out-of-group people who do not have any relatives.

At this time, the number-of-copies selection unit 126 selects the number of print copies such that the still image is printed by the number of people in the still image, and decides the selected number of print copies.

In this way, if the face detection unit 124 detects multiple people in the still image, the number-of-copies selection unit 126 determines whether the multiple people are already registered or not on the basis of the detected person face feature quantity and the registered person face feature quantities of the multiple people.

As a result, if multiple registered people are detected from the multiple people in the still image, the number-of-copies selection unit 126 determines the relationship between the multiple registered people on the basis of the detected person face feature quantity of the multiple registered people and the person relationship information in the person registration information.

If the relationship between the multiple registered people from among the multiple people in the still image is determined, the number-of-copies selection unit 126 selects the number of print copies of the still image by using the determination result.

Meanwhile, if the number-of-copies selection processing is carried out and it is detected that one detected person face feature quantity is provided from the face detection unit 124 (one person is in the still image), the number-of-copies selection unit 126 does not request the storage/reproduction control unit 121 to read the person registration information.

At this time, the number-of-copies selection unit 126 selects the number of print copies such that only one copy of the still image is printed for one person in the still image, and decides the selected number of print copies.

If the number of print copies of the still image is decided in such a manner, the number-of-copies selection unit 126 sends the number-of-copies instruction signal representing the decided number of print copies to a printing control unit 127 as printing data along with still image data.

Meanwhile, the printing apparatus 100 is configured such that, in the number-of-copies selection/printing mode, a still image to be printed is designated as the designated date or designated period. For this reason, in the printing apparatus 100, in the number-of-copies selection/printing mode, a still image in which people appear may be designated as a printing target by the designated date or designated period, or a still image in which a natural object or an artifact appears and no person appears may be designated as a printing target.

Thus, when a still image in which no person appears is designated as a printing target by the designated date or designated period, the number-of-copies selection unit 126 is configured to selectively set whether to print one copy of the still image or not to print the still image in advance.

That is, the number-of-copies selection unit 126 is configured to selectively set the number of print copies as either one copy or no copy in advance when a still image in which no person appears is designated as a printing target.

Thus, if only still image data is provided from the face detection unit 124 without detecting the detected person face feature quantity along with the face of the person, and the number-of-copies selection processing is carried out, the number-of-copies selection unit 126 selects and decides the number of print copies of the still image as one copy or no copy in accordance with the user's setting.

At this time, if the number of print copies of the still image is selected and decided as one copy, the number-of-copies selection unit 126 sends the number-of-copies instruction signal representing the number of print copies to be one copy to the printing control unit 127 as printing data along with still image data of the still image.

At this time, if the number of print copies of the still image is selected and decided to be no copy, the number-of-copies selection unit 126 discards still image data of the still image and sends nothing to the printing control unit 127, such that the still image is not printed.

Each time printing data (still image data and number-of-copies instruction signal) is provided from the number-of-copies selection unit 126, the printing control unit 127 carries out printing control processing. Actually, if still image data and the number-of-copies instruction signal are provided from the number-of-copies selection unit 126 as printing data, and the printing control processing is carried out, the printing control unit 127 sends still image data to the printing unit 117 and also controls the number of print copies of the still image for the printing unit 117 on the basis of the number-of-copies instruction signal.

Thus, the printing control unit 127 causes the printing unit 117 to sequentially print the still image on the printing sheets corresponding to the number of print copies selected (that is, decided) by the number-of-copies selection unit 126.

In this way, each time still image data and the number-of-copies instruction signal are provided from the number-of-copies selection unit 126 as printing data, the printing control unit 127 controls the printing unit 117 to print the still image on the printing sheets corresponding to the selected (that is, decided) number of print copies respectively.

Printing of a plurality of still images in the number-of-copies selection/printing mode will be specifically described with reference to FIGS. 22 to 25. With regard to such printing, as shown in FIGS. 22 and 23, description will be provided for an example where four still images of first to fourth still images 130 to 133 are printed in which a person A and a person B who are a married couple and a person C who is a common friend of the married couple appear in different combinations.

First, three people of the people A to C are in the first still image 130 from among the four still images of the first to fourth still images 130 to 133. Further, two people of the people B and C are in the second still image 131 from among the four still images of the first to fourth still images 130 to 133.

Two people of the people A and C are in the third still image 132 from among the four still images of the first to fourth still images 130 to 133. Further, two people of the people A and B are in the fourth still image 133 from among the four still images of the first to fourth still images 130 to 133.

In this case, the people A and B in the first still image 130 are a married couple, thus the number-of-copies selection unit 126 selects the number of print copies such that only one copy of the first still image 130 is printed for the married couple (that is, for a person group).

The person C in the first still image 130 is not a relative of the person A or the person B who appears in the first still image 130 concurrently, thus the number-of-copies selection unit 126 selects the number of print copies such that only one copy of the first still image 130 is also printed for the person C (that is, for an out-of-group person).

For the first still image 130, the number-of-copies selection unit 126 adds the numbers of print copies for the married couple and the person C, and selects and decides the number of print copies such that two copies are printed in total.

The person B and the person C in the second still image 131 are not relatives, thus the number-of-copies selection unit 126 selects the number of print copies such that the second still image 131 is printed one copy for each of the person B and the person C. That is, for the second still image 131, the number-of-copies selection unit 126 selects and decides the number of print copies such that two copies in total are printed for the person B and the person C.

The person A and the person C in the third still image 132 are not relatives, thus the number-of-copies selection unit 126 selects the number of print copies such that the third still image 132 is printed one copy for each of the person A and the person C. That is, for the third still image 132, the number-of-copies selection unit 126 selects and decides the number of print copies such that two copies in total are printed for the person A and the person C.

The person A and the person B in the fourth still image 133 are a married couple, thus the number-of-copies selection unit 126 selects and decides the number of print copies such that only one copy of the fourth still image 133 is printed for the married couple.

Figure 24:
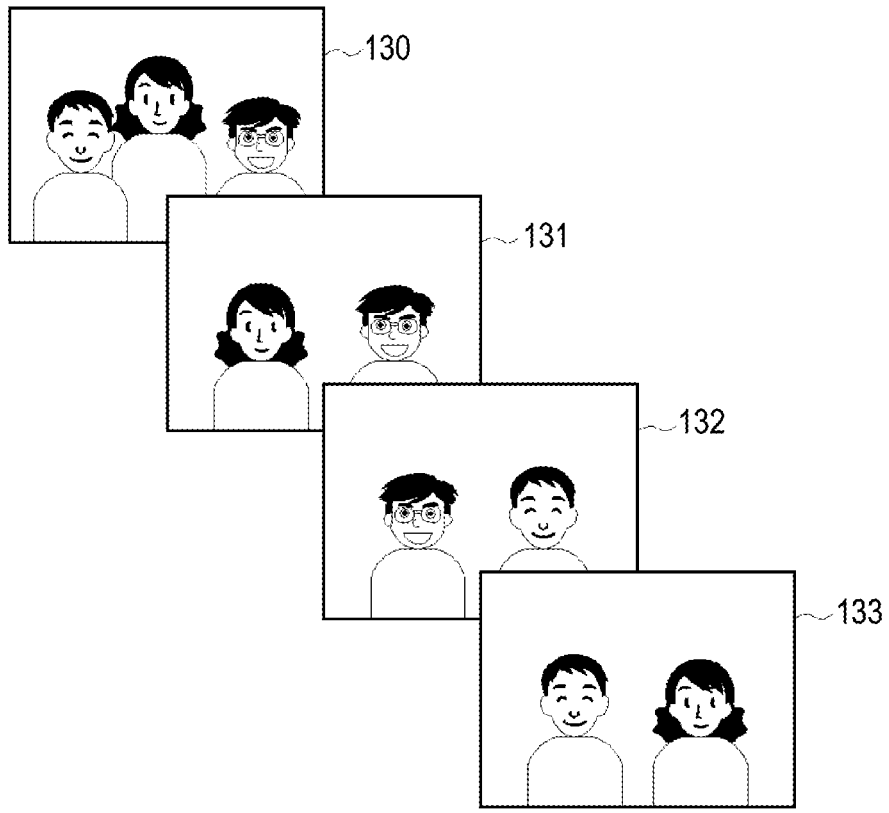
FIG. 24 is a schematic view for description of printing of still images for a person A and a person B as a married couple.

Thus, as shown in FIG. 24, the printing control unit 127 can print the first still image 130, in which the two people of the person A and the person B who are a married couple concurrently appear, one copy for the person A and the person B, not one copy for each of the person A and the person B.

For the second and third still images 131 and 132 in which one of the person A and the person B who are a married couple appears, the printing control unit 127 can print one copy for the person A and the person B.

For the fourth still image 133 in which the two people of the person A and the person B who are a married couple concurrently appear, the printing control unit 127 can print only one copy for the person A and the person B, not one copy for each of the person A and the person B.

Figure 25:
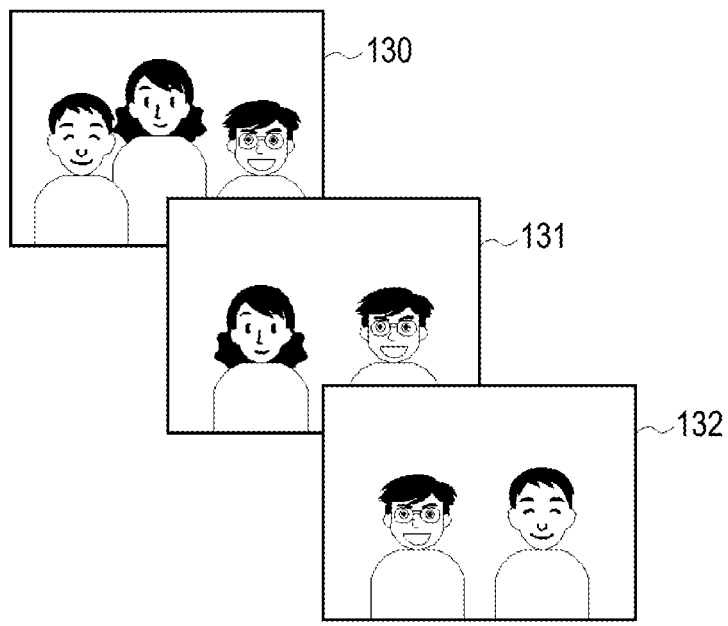
FIG. 25 is a schematic view for description of printing of still images for a person C.
Figure 26:
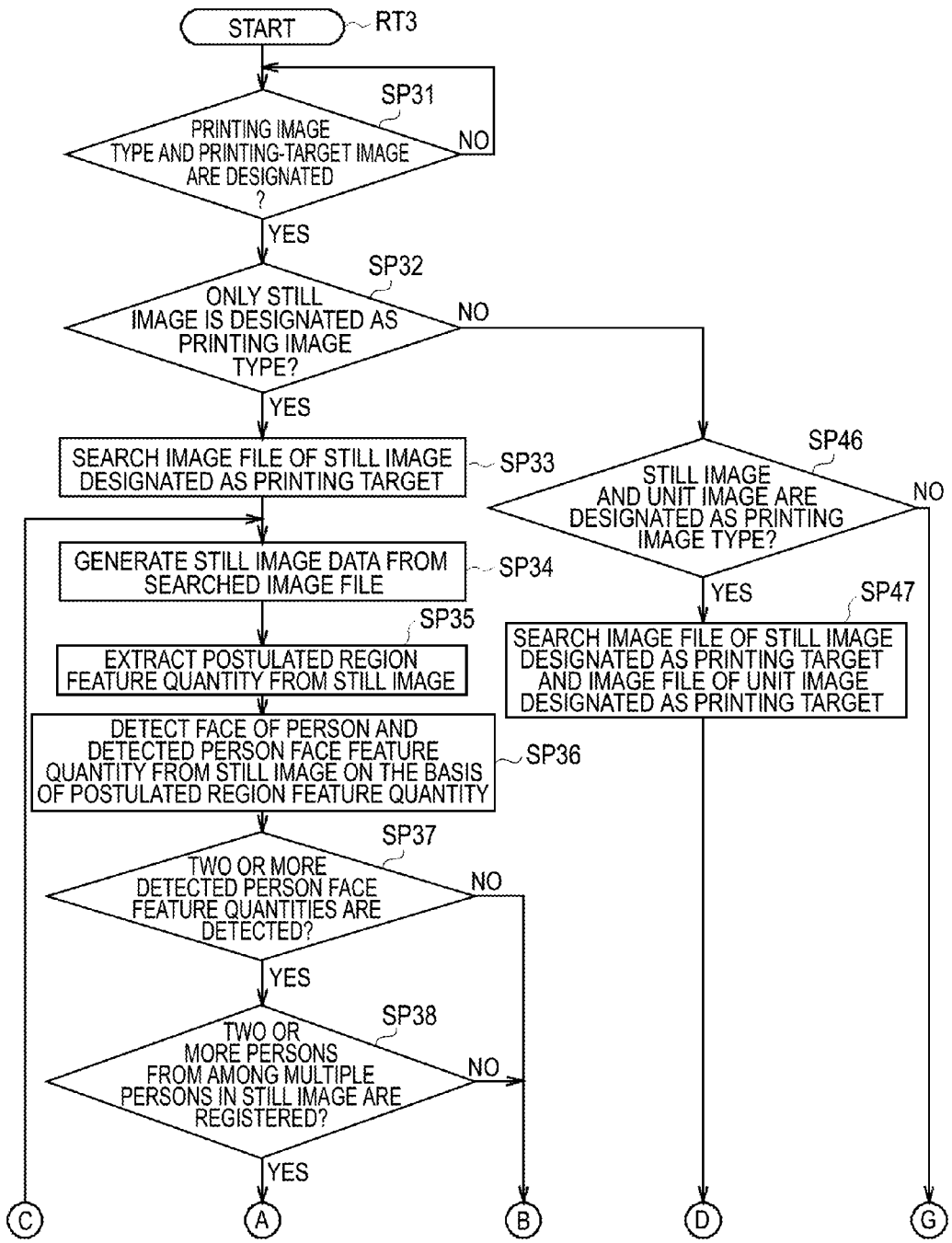
FIG. 26 is a flowchart showing a number-of-copies selection/printing processing procedure (1).
Figure 27:
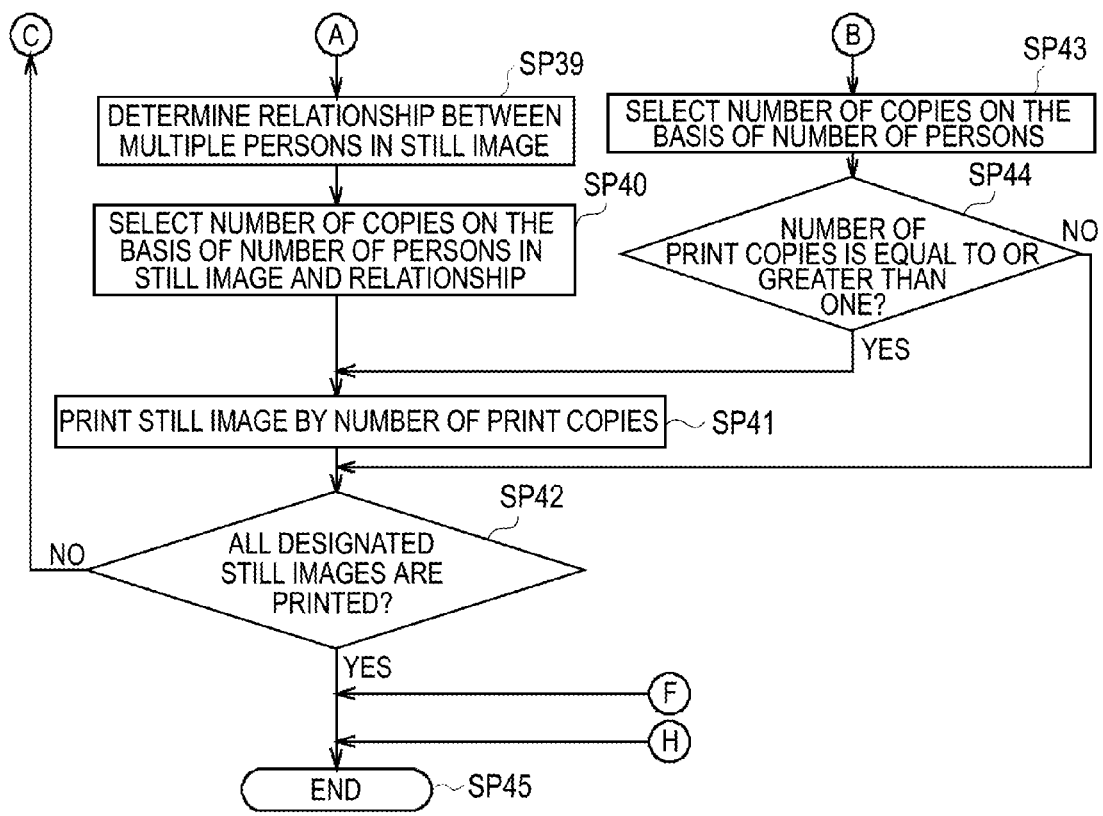
FIG. 27 is a flowchart showing a number-of-copies selection/printing processing procedure (2).
Figure 28:
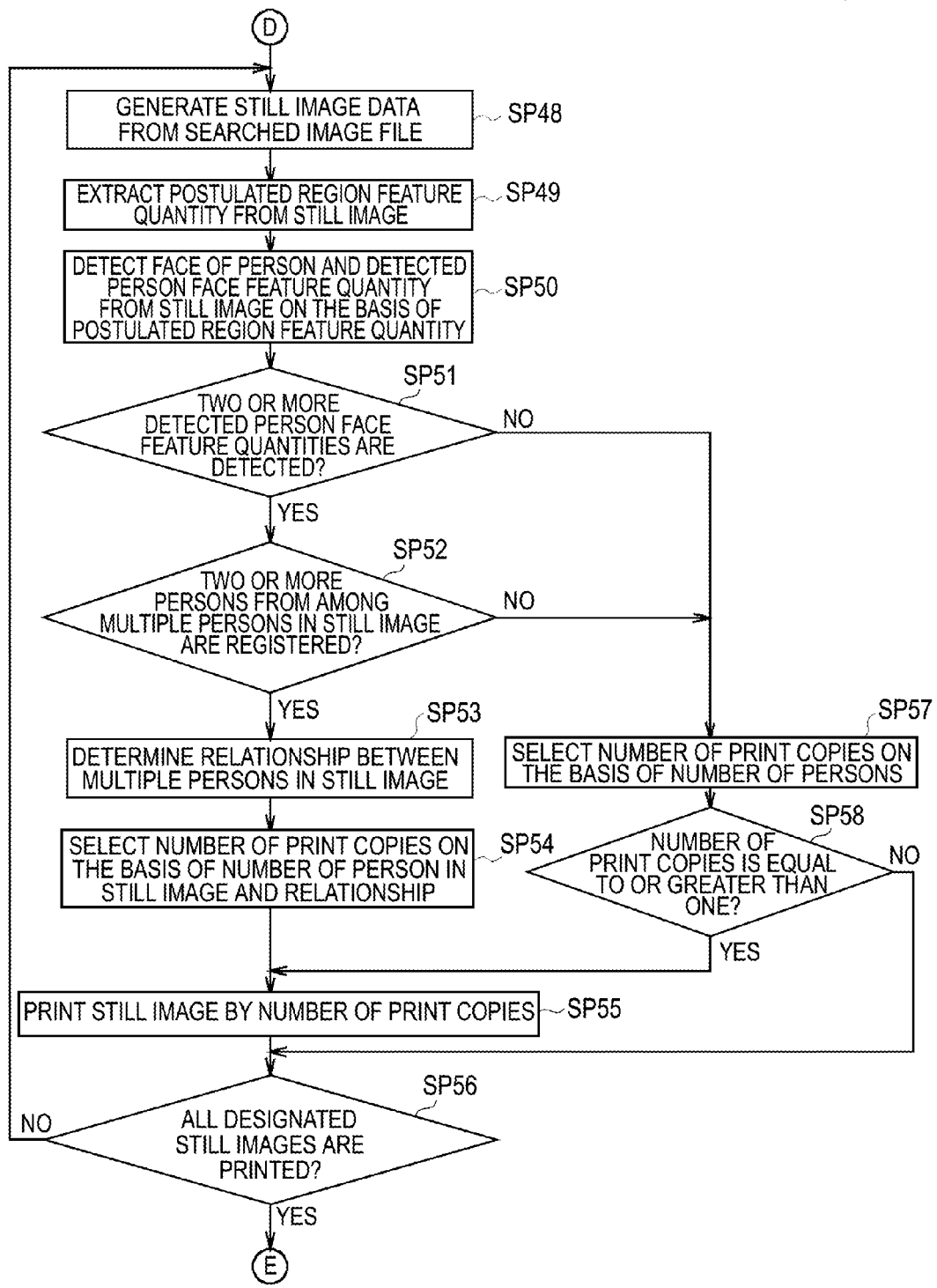
FIG. 28 is a flowchart showing a number-of-copies selection/printing processing procedure (3).
Figure 29:
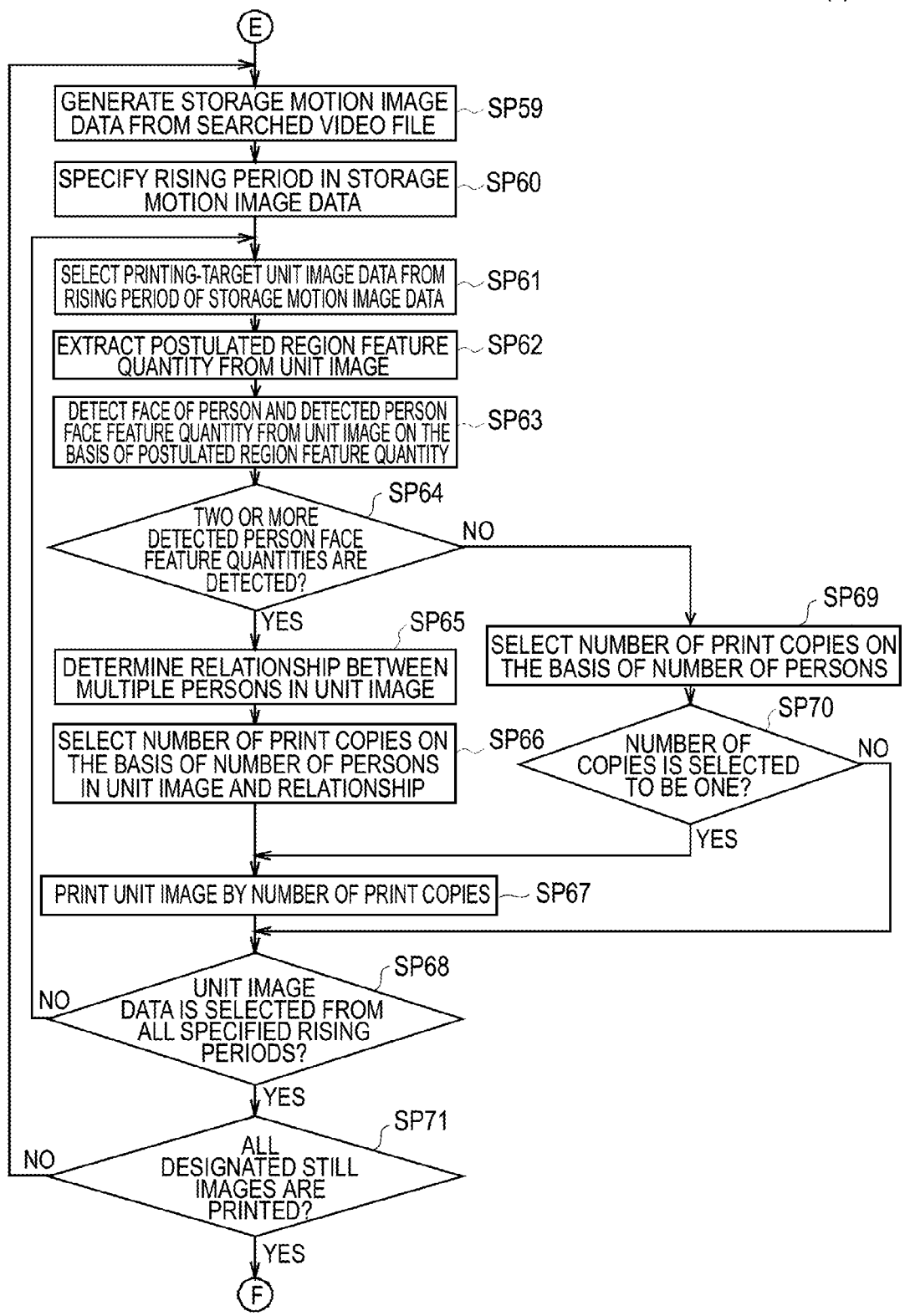
FIG. 29 is a flowchart showing a number-of-copies selection/printing processing procedure (4).

In addition, as shown in FIG. 25, for the first to third still images 130 to 132 in which the person C appears, the printing control unit 127 can print one copy for the person C.

If the image designation key is operated, and the still image and the unit image as the printing image type and the designated date or designated period are designated, the notification unit 120 sends the designation signal representing the designated contents to the storage/reproduction control unit 121 and the file processing unit 122.

If the designation signal is provided from the notification unit 120, the storage/reproduction control unit 121 compares the imaging date-and-time information included in a plurality of image files in the storage medium 114 through the storage/reproduction unit 113 with the designated date or designated period on the basis of the designation signal.

Thus, the storage/reproduction control unit 121 retrieves all image files generated by picture-capturing the subject on the designated date or in the designated period designated by the user from among a plurality of image files in the storage medium 114.

At this time, the storage/reproduction control unit 121 compares the imaging date-and-time information included in a plurality of video files in the storage medium 114 through the storage/reproduction unit 113 with the designated date or designated period on the basis of the designation signal.

Thus, the storage/reproduction control unit 121 retrieves all video files generated by video-recording the subject on the designated date or in the designated period designated by the user from among a plurality of video files in the storage medium 114.

The storage/reproduction control unit 121 sequentially reads the retrieved image files from the storage medium 114 through the storage/reproduction unit 113 and sends the image files to the file processing unit 122.

If all of the retrieved image files are read, subsequently, the storage/reproduction control unit 121 sequentially reads the retrieved video files from the storage medium 114 through the storage/reproduction unit 113 and sends the video files to the file processing unit 122.

Each time the image file is provided from the storage/reproduction control unit 121, in the same manner as described above, first, the file processing unit 122 obtains original still image data by using the codec 116 and sends still image data to the feature quantity extraction unit 123.

If the processing for the image file is completed, the file processing unit 122 sets the processing contents of target selection processing for selecting unit image data to be printed in accordance with the designation signal provided from the notification unit 120 at this time (designation of the still image and the unit image as the printing image type).

For example, at this time, the file processing unit 122 sets the processing contents of the target selection processing such that unit image data to be printed is selected from storage motion image data on the basis of the climax at the time of video-recording of the subject.

In this state, if the video files are provided from the storage/reproduction control unit 121 subsequently to the image files, each time the video file is provided, the file processing unit 122 carries out the target selection processing.

Actually, if the video file is provided from the storage/reproduction control unit 121, and the target selection processing is carried out, first, the file processing unit 122 loads video data and header data from the video file, and sends the video data to the codec 116.

At this time, the codec 116 generates original storage motion image data, and original right sound data, left sound data, and rear sound data on the basis of video data provided from the file processing unit 122. The codec 116 sends these storage motion image data, right sound data, left sound data, and rear sound data to the file processing unit 122.

If storage motion image data, right sound data, left sound data, and rear sound data are provided from the codec 18, the file processing unit 122 compares the data level from the head to the tail in each of the right sound data, left sound data, and rear sound data with a predetermined threshold value.

Thus, the file processing unit 122 detects the time information of the head position and the tail position in one or each of a plurality of periods, in which the data level is equal to or greater than the threshold value, in right sound data, left sound data, and rear sound data on the basis of the comparison result between the data level and the threshold value.

The file processing unit 122 specifies one or each of a plurality of periods in storage motion image data represented by the time information as a climax period in which the atmosphere of the scene climaxes at the time of video-recording of the subject.

The file processing unit 122 loads, from one or each of a plurality of climax periods in storage motion image data, single unit image data at a predetermined position, such as the head or center of the climax period, as a printing target. The file processing unit 122 sequentially sends one or a plurality of kinds of unit image data loaded from storage motion image data to the feature quantity extraction unit 123.

In this way, if the target selection processing is carried out each time the video file is read from the storage medium 114 through the storage/reproduction control unit 121, the file processing unit 122 obtains original storage motion image data by using the codec 116.

The file processing unit 122 sends single unit image data in the climax period from among a plurality of kinds of unit image data constituting storage motion image data to the feature quantity extraction unit 123 as a printing target.

Each time still image data is provided from the file processing unit 122, in the same manner as described above, the feature quantity extraction unit 123 carries out the feature quantity extraction processing. Thus, the feature quantity extraction unit 123 sends one or a plurality of postulated region feature quantities to the face detection unit 124 along with still image data, or sends only still image data to the face detection unit 124.

When unit image data is provided from the file processing unit 122, as described above, the feature quantity extraction unit 123 also carries out the feature quantity extraction processing in the same manner as when still image data is provided from the file processing unit 122.

Thus, the feature quantity extraction unit 123 detects one or a plurality of postulated region feature quantities from unit image data along with one or a plurality of postulated regions, and sends one or a plurality of detected postulated region feature quantities to the face detection unit 124 along with unit image data.

However, if all of the postulated regions in the unit image are not detected, the feature quantity extraction unit 123 sends only unit image data of the unit image to the face detection unit 124.

Each time one or a plurality of postulated region feature quantities are provided from the feature quantity extraction unit 123 along with still image data, or each time only still image data is provided from the feature quantity extraction unit 123, the face detection unit 124 carries out the face detection processing in the same manner as described above.

Thus, the face detection unit 124 sends one or a plurality of detected person face feature quantities to the number-of-copies selection unit 126 along with still image data, or sends only still image data to the number-of-copies selection unit 126.

When unit image data is provided from the feature quantity extraction unit 123, as described above, the face detection unit 124 also carries out the face detection processing in the same manner as when still image data is provided from the feature quantity extraction unit 123.

Thus, the face detection unit 124 detects one or a plurality of detected person face feature quantities from unit image data along with one or a plurality of faces of people, and sends one or a plurality of detected person face feature quantities to the number-of-copies selection unit 126 along with unit image data.

However, when no detected person face feature quantity is detected from the unit image along with the face of the person, the face detection unit 124 sends only unit image data of the unit image to the number-of-copies selection unit 126.

When only unit image data is provided from the feature quantity extraction unit 123, and the face detection processing is carried out, the face detection unit 124 sends only unit image data to the number-of-copies selection unit 126 as it is.

Each time one or a plurality of detected person face feature quantities are provided from the face detection unit 124 along with still image data, or each time only still image data is provided from the face detection unit 124, the number-of-copies selection unit 126 carries out the number-of-copies selection processing in the same manner as described above. Thus, the number-of-copies selection unit 126 appropriately sends still image data and the number-of-copies instruction signal to the printing control unit 127 as printing data.

Each time one or a plurality of detected person face feature quantities are provided from the face detection unit 124 along with unit image data, or each time only unit image data is provided from the face detection unit 124, the number-of-copies selection unit 126 carries out the number-of-copies selection processing which is basically the same as when still image data is provided from the face detection unit 124.

Any person in the unit image is already registered when the above-described imaged person specification processing is carried out. The person relationship information representing the relationship between the people in the unit image is already stored in header data added to storage motion image data as the file attribute information.

For this reason, if two or more people are in the unit image, the number-of-copies selection unit 126 causes the file processing unit 122 to load the person relationship information included in the file attribute information in header data. On the basis of the respective detected person face feature quantities of multiple people in the unit image and the person relationship information, the number-of-copies selection unit 126 determines the relationship between the multiple people.

If the relationship between the people in the unit image is determined in such a manner, the number-of-copies selection unit 126 carries out subsequent processing in the same manner as when still image data is provided from the face detection unit 124, and selects the number of print copies.

When only one person is in the unit image or when no person is in the unit image, the number-of-copies selection unit 126 carries out processing in the same manner as when still image data is provided from the face detection unit 124, and selects the number of print copies.

In this way, the number-of-copies selection unit 126 appropriately selects (decides) the number of print copies of unit image data, and sends the number-of-copies instruction signal representing the selected number of print copies to the printing control unit 127 as printing data along with unit image data.

Each time still image data and the number-of-copies instruction signal are provided from the number-of-copies selection unit 126 as printing data, the printing control unit 127 carries out the printing control processing in the same manner as described above. Thus, the printing control unit 127 causes the printing unit 117 to print the still image based on still image data on the printing sheets corresponding to the number of print copies represented by the number-of-copies instruction signal.

When unit image data and the number-of-copies instruction signal are provided from the number-of-copies selection unit 126 as printing data, as described above, the printing control unit 127 carries out the printing control processing in the same manner as when still image data is provided from the number-of-copies selection unit 126. Thus, the printing control unit 127 causes the printing unit 117 to print the unit image based on unit image data on the printing sheets corresponding to the number of print copies represented by the number-of-copies instruction signal.

When the image designation key is operated, and the unit image as the printing image type and the designated motion are designated, the notification unit 120 sends the designation signal representing the designated contents to the storage/reproduction control unit 121 and the file processing unit 122.

If the designation signal is provided from the notification unit 120, the storage/reproduction control unit 121 compares the file attribute information (motion information) in header data included in a plurality of video files in the storage medium 114 through the storage/reproduction unit 113 with the designated motion on the basis of the designation signal.

Thus, the storage/reproduction control unit 121 retrieves all video files with a scene where a person conducts the designated motion, such as hug or piggyback, from among a plurality of video files in the storage medium 114.

The storage/reproduction control unit 121 sequentially reads the retrieved video files from the storage medium 114 through the storage/reproduction unit 113 and sends the video files to the file processing unit 122.

At this time, the file processing unit 122 sets the processing contents of the target selection processing for selecting unit image data to be printed in accordance with the designation signal provided from the notification unit 120 (designation of the unit image as the printing image type).

For example, at this time, the file processing unit 122 sets the processing contents of the target selection processing such that unit image data to be printed is selected from storage motion image data on the basis of the designated motion.

In this state, each time the video file is provided from the storage/reproduction control unit 121, the file processing unit 122 carries out the target selection processing. Actually, if the video file is provided from the storage/reproduction control unit 121 and the target selection processing is carried out, first, the file processing unit 122 loads video data and header data from the video file and sends the video data to the codec 116.

At this time, the codec 116 generates original storage motion image data, and original right sound data, left sound data, and rear sound data on the basis of video data provided from the file processing unit 122. The codec 116 sends these storage motion image data, right sound data, left sound data, and rear sound data to the file processing unit 122.

If storage motion image data, right sound data, left sound data, and rear sound data are provided from the codec 18, the file processing unit 122 loads one or a plurality of kinds of motion information representing the motion period, in which a person conducts the designated motion, from the file attribute information in header data.

On the basis of one or a plurality of kinds of motion information, the file processing unit 122 specifies the motion period represented by the motion information in storage motion image data (that is, the motion period in which a person conducts the designated motion).

The file processing unit 122 loads, from one or each of a plurality of motion periods specified in storage motion image data, single unit image data at a predetermined position, such as the head or center of the motion period, as a printing target.

The file processing unit 122 sequentially sends one or a plurality of kinds of unit image data loaded from storage motion image data (that is, unit image data in which a person who conducts the designated motion appears) to the feature quantity extraction unit 123.

In this way, if the target selection processing is carried out each time the video file is read from the storage medium 114 through the storage/reproduction control unit 121, the file processing unit 122 obtains original storage motion image data by using the codec 116.

The file processing unit 122 sends single unit image data in the motion period, in which a person conducts the designated motion (that is, unit image data in which a person appears), from among a plurality of kinds of unit image data constituting storage motion image data to the feature quantity extraction unit 123 as a printing target.

The feature quantity extraction unit 123 carries out the feature quantity extraction processing in the same manner as described above each time unit image data is provided from the file processing unit 122. Thus, the feature quantity extraction unit 123 sends one or a plurality of postulated region feature quantities to the face detection unit 124 along with unit image data.

That is, at this time, at least one person who conducts the designated motion is in the unit image, thus the feature quantity extraction unit 123 extracts one or a plurality of postulated region feature quantities from the unit image, and sends one or a plurality of postulated region feature quantities to the face detection unit 124 along with unit image data.

Each time one or a plurality of postulated region feature quantities are provided from the feature quantity extraction unit 123 along with unit image data, the face detection unit 124 carries out the face detection processing in the same manner as described above. Thus, the face detection unit 124 sends one or a plurality of detected person face feature quantities to the number-of-copies selection unit 126 along with the unit image data.

Each time one or a plurality of detected person face feature quantities are provided from the face detection unit 124 along with unit image data, the number-of-copies selection unit 126 carries out the number-of-copies selection processing in the same manner as described above. Thus, the number-of-copies selection unit 126 sends unit image data and the number-of-copies instruction signal to the printing control unit 127 as printing data.

Each time printing data (unit image data and the number-of-copies instruction signal) are provided from the number-of-copies selection unit 126, the printing control unit 127 carries out the printing control processing in the same manner as described above. Thus, the printing control unit 127 causes the printing unit 117 to print the unit image based on unit image data on the printing sheets corresponding to the number of print copies represented by the number-of-copies instruction signal.

In this way, the number-of-copies selection unit 126 and the printing control unit 127 are configured such that only one copy of the unit image is printed and shared for two or more people in a person group, and the unit image is printed one copy for each person out of the person group person, in the same manner as printing of the still image described above with reference to FIGS. 22 to 25.

[3-4 Number-of-Copies Selection/Printing Processing Procedure]

Next, a number-of-copies selection/printing processing procedure RT3 which is carried out by the control unit 110 in the number-of-copies selection/printing mode will be described with reference to FIGS. 26 to 30.

If the operation key is operated and the number-of-copies selection/printing function is selected, the control unit 110 is put in the number-of-copies selection/printing mode, and starts the number-of-copies selection/printing processing procedure RT3 in accordance with the printing control program stored in advance in the internal memory.

If the number-of-copies selection/printing processing procedure RT3 starts, in Step SP31, the control unit 110 waits until the user designates the printing image type and the image to be printed (that is, the designated date, designated period, or designated motion). If the user designates the printing image type and the image to be printed, the control unit 110 progresses to Step SP32.

In Step SP32, the control unit 110 determines whether or not only the still image is designated as the printing image type. If the determination result in Step SP32 is positive, this indicates that printing of only a still image generated by picture-capturing the subject is requested. In Step SP32, if the determination result is positive, the control unit 110 progresses to Step SP33.

In Step SP33, the control unit 110 retrieves all image files of the still image to be printed, which is designated by the user as the designated date or designated period, from among a plurality of image files in the storage medium 114 through the storage/reproduction unit 113. Then, the control unit 110 progresses to Step SP34.

In Step SP34, the control unit 110 generates original still image data on the basis of one image file from among all of the retrieved image files by using the codec 116. Then, the control unit 110 progresses to Step SP35.

In Step SP35, the control unit 110 retrieves one or a plurality of postulated regions postulated to include the face of the person in the still image based on still image data on the basis of the face information. As a result, if one or a plurality of postulated regions are detected in the still image, the control unit 110 extracts the postulated region feature quantity from the detected postulated region. Then, the control unit 110 progresses to Step SP36.

In Step SP35, even when a postulated region in the still image is retrieved on the basis of the face information, if any postulated region is not obtained, the control unit 110 does not obtain the postulated region feature quantity. Then, the control unit 110 progress to Step SP36.

In Step SP36, the control unit 110 detects whether the subject in the postulated region of the still image is the face of the person or not on the basis of a plurality of types of face detection feature quantities and one or a plurality of postulated region feature quantities.

If it is detected that the subject in the postulated region of the still image is the face of the person, the control unit 110 defines the postulated region feature quantity of the postulated region, in which the face of the person appears, as the detected person face feature quantity. If one or a plurality of detected person face feature quantities are detected from the still image along with one or a plurality of faces of people in such a manner, the control unit 110 progresses to Step SP37.

In Step SP36, if it is detected that the face of the person is not in the still image, at this time, the control unit 110 does not detect the detected person face feature quantity and progresses to Step SP37.

In Step SP37, the control unit 110 detects the number of detected person face feature quantities detected from the still image (that is, the number of people in the still image), and determines whether or not two or more detected person face feature quantities are detected.

If the determination result in Step SP37 is positive, this indicates that the relationship between multiple people in the still image is likely to be detected. In Step SP37, if the determination result is positive, the control unit 110 progresses to Step SP38.

In Step SP38, the control unit 110 reads all kinds of person registration information from the storage medium 114 through the storage/reproduction unit 113. The control unit 110 determines whether at least two people from among the multiple people in the still image are already registered or not on the basis of a plurality of detected person face feature quantities detected from the still image, and the registered person face feature quantities in a plurality of kinds of person registration information.

If the determination result in Step SP38 is positive, this indicates that at least two people who are already registered from among the multiple people in the still image are likely to be detected as relatives. In Step SP38, if the determination result is positive, the control unit 110 progresses to Step SP39.

In Step SP39, on the basis of the detected person face feature quantities of multiple registered people from among multiple people in the still image and the person relationship information in the person registration information, the control unit 110 determines the relationship between the multiple registered people.

On the basis of the determination result of the relationship between the people, the control unit 110 detects the number of person groups, and also detects the number of registered out-of-group people and the number of unregistered out-of-group people. Then, the control unit 110 progresses to Step SP40.

In Step SP40, the control unit 110 selects the number of print copies of the still image on the basis of the number of person groups, the number of registered out-of-group people, and the number of unregistered out-of-group people (the number of multiple people in the still image and the relationship between the multiple people). Then, the control unit 110 progresses to Step SP41.

In Step SP41, the control unit 110 controls the printing unit 117 to print the still image based on still image data on the printing sheets corresponding to the number of print copies selected for printing of the still image. Then, the control unit 110 progresses to Step SP42.

In Step SP42, the control unit 110 determines whether or not all still images to be printed which are designated by the user as the designated date or designated period are printed. If the determination result in Step SP42 is negative, this indicates that there is a still image which is not yet printed from among a plurality of still images designated by the user as the printing target. In Step SP42, if the determination result is negative, the control unit 110 returns to Step SP34.

Meanwhile, if the determination result in Step SP37 is negative, this indicates that, since only one person is in the still image, or since no person is in the still image, the relationship between the people is unable to be determined. In Step SP37, if the determination result is negative, the control unit 110 progresses to Step SP43.

If the determination result in Step SP38 is negative, this indicates that one or no person is registered from among the multiple people in the still image, and the people as relatives are unable to be detected. In Step SP38, if the determination result is negative, the control unit 110 progresses to Step SP43.

In Step SP43, the control unit 110 selects the number of print copies of the still image on the basis of the number of people (that is, the number of people in a still image in which the people appear, or the number of print copies set in advance for a still image in which no person appears). Then, the control unit 110 progresses to Step SP44.

In Step SP44, the control unit 110 determines whether or not the selected number of print copies of the still image is equal to or greater than one. If the determination result in Step SP44 is positive, this indicates that the number of print copies is selected such that a still image in which one person or multiple people appear is printed by the number of people, or such that a still image in which no person appears is printed one copy in accordance with preliminary setting. In Step SP44, if the determination result is positive, the control unit 110 progresses to Step SP41.

If the determination result in Step SP44 is negative, this indicates that the number of print copies of a still image in which no person appears is selected to be no copy in accordance with preliminary setting, thus the still image is not printed. In Step SP44, if the determination result is negative, the control unit 110 progresses to Step SP42.

In this way, when only the still image is designated as the printing image type, the control unit 110 repeatedly carries out Steps SP34 to SP44 until the positive determination result is obtained in Step SP42. Thus, when a plurality of still images are designated as a printing target, the control unit 110 sequentially prints the plurality of still images while selecting the number of print copies, such that a plurality of still images are printed by the selected number of print copies.

If the determination result in Step SP42 is positive, this indicates that printing of a plurality of still images designated by the user as a printing target is completed. In Step SP42, if the determination result is positive, the control unit 110 progresses to Step SP45 and ends the number-of-copies selection/printing processing procedure RT1.

Meanwhile, if the determination result in Step SP32 is negative, this indicates that printing of both the still image and the unit image is requested or printing of only the unit image is requested. In Step SP32, if the determination result is negative, the control unit 110 progresses to Step SP46.

In Step SP46, the control unit 110 determines whether or not both the still image and the unit image as the printing image type are designated. If the determination result in Step SP46 is positive, this indicates that printing of a still image generated by picture-capturing the subject and unit images constituting a storage motion image generated by video-recording the subject is requested. In Step SP46, if the determination result is positive, the control unit 110 progresses to Step SP47.

In Step SP47, the control unit 110 retrieves all image files of the still image to be printed, which is designated by the user as the designated date or designated period, from among a plurality of image files in the storage medium 114 through the storage/reproduction unit 113.

The control unit 110 also retrieves all video files of the storage motion image including the unit images to be printed, which are designated by the user as the designated date or designated period, from among a plurality of video files in the storage medium 114 through the storage/reproduction unit 113. Then, the control unit 110 progresses to Step SP48.

In Step SP48, the control unit 110 generates original still image data on the basis of one image file from among all of the retrieved image files by using the codec 116. Then, the control unit 110 progresses to Step SP49.

In Step SP49, the control unit 110 retrieves one or a plurality of postulated regions postulated to include the face of the person in the still image based on still image data on the basis of the face information. As a result, if one or a plurality of postulated regions are detected in the still image, the control unit 110 extracts the postulated region feature quantities from the detected postulated regions. Then, the control unit 110 progresses to Step SP50.

In Step SP49, even when a postulated region in the still image is retrieved on the basis of the face information, if any postulated region is unable to be detected, the control unit 110 does not obtain the postulated region feature quantity and progresses to Step SP50.

In Step SP50, the control unit 110 detects whether the subject in the postulated region of the still image is the face of the person or not on the basis of a plurality of types of face detection feature quantities and one or a plurality of postulated region feature quantities.

If it is detected that the subject in the postulated region of the still image is the face of the person, the control unit 110 defines the postulated region feature quantity of the postulated region, in which the face of the person appears, as the detected person face feature quantity. If one or a plurality of detected person face feature quantities are detected from the still image along with one or a plurality of faces of people, the control unit 110 progresses to Step SP51.

In Step SP50, if it is detected that the face of the person is not in the still image, the control unit 110 does not detect the detected person face feature quantity at this time and progresses to Step SP51.

In Step SP51, the control unit 110 detects the number of detected person face feature quantities detected from the still image (that is, the number of people in the still image), and determines whether or not two or more detected person face feature quantities are detected.

If the determination result in Step SP51 is positive, this indicates that the relationship between multiple people in the still image is likely to be determined. In Step SP51, if the determination result is positive, the control unit 110 progresses to Step SP52.

In Step SP52, the control unit 110 reads all kinds of person registration information from the storage medium 114 through the storage/reproduction unit 113. The control unit 110 determines whether at least two people from among the multiple people in the still image are already registered or not on the basis of a plurality of detected person face feature quantities detected from the still image and the registered person face feature quantities in a plurality of kinds of person registration information.

If the determination result in Step SP52 is positive, this indicates that at least two people who are already registered from among the multiple people in the still image are likely to be detected as relatives. In Step SP52, if the determination result is positive, the control unit 110 progresses to Step SP53.

In Step SP53, on the basis of the detected person face feature quantities of multiple registered people from among the multiple people in the still image and the person relationship information in the person registration information, the control unit 110 determines the relationship between the multiple registered people.

On the basis of the determination result of the relationship between the people, the control unit 110 detects the number of person groups, the number of registered out-of-group people, and the number of unregistered out-of-group people. Then, the control unit 110 progresses to Step SP54.

In Step SP54, the control unit 110 selects the number of print copies of the still image on the basis of the number of person groups, the number of registered out-of-group people, and the number of unregistered out-of-group people (the number of multiple people in the still image and the relationship between the multiple people). Then, the control unit 110 progresses to Step SP55.

In Step SP55, the control unit 110 controls the printing unit 117 to print the still image based on still image data on the printing sheet corresponding to the number of print copies selected for printing of the still image. Then, the control unit 110 progresses to Step SP56.

In Step SP56, the control unit 110 determines whether or not printing of all of the still images designated by the user as designated date or designated period is completed. If the determination result in Step SP56 is negative, this indicates that there is a still image, which is not yet printed, from among a plurality of still images designated by the user as a printing target. In Step SP56, if the determination result is negative, the control unit 110 returns to Step SP48.

Meanwhile, if the determination result in Step SP51 is negative, this indicates that only one person is in the still image or no person is in the still image, thus the relationship between people is unable to be determined. In Step SP51, if the determination result is negative, the control unit 110 progresses to Step SP57.

If the determination result in Step SP52 is negative, this indicates that one or no person is registered from among the multiple people in the still image, and the people as relatives are unable to be detected. In Step SP52, if the determination result is negative, the control unit 110 progresses to Step SP57.

In Step SP57, the control unit 110 selects the number of print copies of the still image on the basis of the number of people (that is, the number of people in a still image in which the people appear, or the number of print copies set in advance for a still image in which no person appears). Then, the control unit 110 progresses to Step SP58.

In Step SP58, the control unit 110 determines whether or not the selected number of print copies of the still image is equal to or greater than one. If the determination result in Step SP58 is positive, this indicates that the number of print copies is set such that a still image in which one person or multiple people appear is printed by the number of people, or such that a still image in which no person appears is printed one copy in accordance with preliminary setting. In Step SP58, if the determination result is positive, the control unit 110 progresses to Step SP55.

If the determination result in Step SP58 is negative, this indicates that the number of print copies of a still image in which no person appears is selected to be no copy in accordance with preliminary setting, thus the still image is not printed. In Step SP58, if the determination result is negative, the control unit 110 progresses to Step SP56.

In this way, when the still image is designated as the printing image type along with the unit image, the control unit 110 repeatedly carries out Step SP48 to Step SP58 until the positive determination result is obtained in Step SP56.

Thus, when a plurality of still images are designated as the printing target along with the unit images, the control unit 110 sequentially prints a plurality of still images while selecting the number of print copies, such that the still images are printed by the selected number of print copies.

If the determination result in Step SP56 is positive, this indicates that printing of a plurality of still images designated by the user as a printing target is completed. In Step SP56, if the determination result is positive, the control unit 110 progresses to Step SP59.

In Step SP59, the control unit 110 generates original storage motion image data, and original right sound data, left sound data, and rear sound data on the basis of one video file from among all of the retrieved video files by using the codec 116. Then, the control unit 110 progresses to Step SP60.

In Step SP60, the control unit 110 specifies one or a plurality of climax periods in storage motion image data on the basis of the data levels of right sound data, left sound data, and rear sound data. Then, the control unit 110 progresses to Step SP61.

In Step SP61, the control unit 110 selects and loads single unit image data as the printing target from any one of climax periods of storage motion image data. Thereafter, the control unit 110 progresses to Step SP62.

In Step SP62, the control unit 110 retrieves one or a plurality of postulated region postulated to include the face of the person in the unit image based on unit image data on the basis of the face information. As a result, if one or a plurality of postulated regions are detected in the unit image, the control unit 110 extracts the postulated region feature quantities from the detected postulated regions. Then, the control unit 110 progresses to Step SP63.

In Step SP62, even when a postulated region in the unit image is retrieved on the basis of the face information, if any postulated region is unable to be detected, the control unit 110 does not obtain the postulated region feature quantity, and progresses to Step SP63.

In Step SP63, the control unit 110 detects whether the subject in the postulated region of the unit image is the face of the person or not on the basis of a plurality of types of face detection feature quantities and one or a plurality of postulated region feature quantities.

If it is detected that the subject in the postulated region of the unit image is the face of the person, the control unit 110 defines the postulated region feature quantity of the postulated region, in which the face of the person appears, as the detected person face feature quantity. If one or a plurality of detected person face feature quantities are detected from the unit image along with one or a plurality of faces of people in such a manner, the control unit 110 progresses to Step SP64.

In Step SP63, if it is detected that the face of the person is not in the unit image, the control unit 110 does not detect the detected person face feature quantity at this time and progresses to Step SP64.

In Step SP64, the control unit 110 detects the number of detected person face feature quantities detected from the unit image (that is, the number of people in the unit image), and determines whether or not two or more detected person face feature quantities are detected.

If the determination result in Step SP64 is positive, this indicates that the relationship between the multiple people in the unit image can be determined. In Step SP64, if the determination result is positive, the control unit 110 progresses to Step SP65.

In Step SP65, the control unit 110 determines the relationship between the multiple people in the unit image on the basis of a plurality of detected person face feature quantity detected from the unit image and the person relationship information in the file attribute information corresponding to the unit image.

On the basis of the determination result of the relationship between the people, the control unit 110 detects the number of person groups, and also detects the number of out-of-group people. Then, the control unit 110 progresses to Step SP66.

In Step SP66, the control unit 110 selects the number of print copies of the unit image on the basis of the number of person groups, the number of out-of-group people (the number of multiple people in the unit image and the relationship between the multiple people). Then, the control unit 110 progresses to Step SP67.

In Step SP67, the control unit 110 controls the printing unit 117 to print the unit image based on unit image data on the printing sheets corresponding to the number of print copies selected for printing of the unit image. Then, the control unit 110 progresses to Step SP68.

Meanwhile, if the determination result in Step SP64 is negative, this indicates that only one person is in the unit image, or no person is in the unit image, thus the relationship between the people is unable to be determined. In Step SP64, if the determination result is negative, the control unit 110 progresses to Step SP69.

In Step SP69, the control unit 110 selects the number of print copies of the unit image on the basis of the number of people (that is, the number of people in a unit image in which the people appear, or the number of print copies set in advance for a unit image in which no person appears). Then, the control unit 110 progresses to Step SP70.

In Step SP70, the control unit 110 determines whether or not the number of print copies of the unit image is selected to be one copy. If the determination result in Step SP70 is positive, this indicates that the number of print copies is set such that a unit image in which one person appears is printed one copy for one person, or a unit image in which no person appears is printed one copy in accordance with preliminary setting. In Step SP70, if the determination result is positive, the control unit 110 progresses to Step SP67.

If the determination result in Step SP70 is negative, this indicates that the number of print copies of a unit image in which no person appears is selected to be no copy in accordance with preliminary setting, thus the unit image is not printed. In Step SP70, if the determination result is negative, the control unit 110 progresses to Step SP68.

In Step SP68, the control unit 110 determines whether or not unit image data to be printed is selected from all of the climax periods of storage motion image data.

If the determination result in Step SP68 is negative, this indicates that a plurality of climax periods are specified in storage motion image data, and there remain one or more climax periods in which unit image data to be printed are not yet selected. In Step SP68, if the determination result is negative, the control unit 110 returns to Step SP61.

Thus, when a plurality of climax periods are specified in storage motion image data, the control unit 110 repeatedly carries out Steps SP61 to SP70 until the positive determination result is obtained in Step SP68. Thus, the control unit 110 sequentially selects unit image data to be printed from a plurality of climax periods specified in storage motion image data and processes unit image data for printing.

Meanwhile, if the determination result in Step SP68 is positive, this indicates that unit image data to be printed has been selected from all the climax periods specified in storage motion image data and processed for printing. In Step SP71, if the determination result is positive, the control unit 110 progresses to Step SP69.

In Step SP71, the control unit 110 determines whether or not printing of all unit images to be printed which are designated by the user as the designated date or designated period is completed (that is, all of the retrieved video files have been processed for printing).

If the determination result in Step SP71 is negative, this indicates that there are one or more unit images, which are not yet processed for printing, from among a plurality of unit images designated by the user as a printing target. In Step SP71, if the determination result is negative, the control unit 110 returns to Step SP59.

When the unit image is designated as the printing image type along with the still image in such a manner, the control unit 110 repeatedly carries out Steps SP59 to SP71 until the positive determination result is obtained in Step SP71.

Thus, when a plurality of unit images are designated as a printing target along with the still image, the control unit 110 sequentially prints a plurality of unit images while selecting the number of print copies, such that the unit images are printed by the number of print copies.

If the determination result in Step SP71 is positive, this indicates that printing of a plurality of unit images designated by the user as a printing target is completed. In Step SP71, if the determination result is positive, the control unit 110 progresses to Step SP45 and ends the number-of-copies selection/printing processing procedure RT1.

Meanwhile, if the determination result in Step SP46 is negative, this indicates that printing of only the unit image is requested. In Step SP46, if the determination result is negative, the control unit 110 progresses to Step SP72.

In Step SP72, the control unit 110 retrieves all video files of the storage motion image with a scene where a person conducts the designated motion from among a plurality of video files in the storage medium 114 through the storage/reproduction unit 113 on the basis of the designated motion. Then, the control unit 110 progresses to Step SP73.

In Step SP73, the control unit 110 generates original storage motion image data, and original right sound data, left sound data, and rear sound data on the basis of one video file from among all of the retrieved video files by using the codec 116. Then, the control unit 110 progresses to Step SP74.

In Step SP74, the control unit 110 specifies all the motion periods, in which the designated motion of the person appears, in storage motion image data on the basis of the designated motion and one or a plurality of kinds of motion information in the file attribute information corresponding to storage motion image data. Then, the control unit 110 progresses to Step SP75.

In Step SP75, the control unit 110 selects and loads single unit image data as the printing target from any one motion period of storage motion image data. Thereafter, the control unit 110 progresses to Step SP76.

In Step SP76, the control unit 110 retrieves one or a plurality of postulated regions postulated to include the face of the person in the unit image based on unit image data on the basis of the face information. As a result, if one or a plurality of postulated regions are detected in the unit image, the control unit 110 extracts the postulated region feature quantity from the detected postulated region. Then, the control unit 110 progresses to Step SP77.

In Step SP77, the control unit 110 detects whether the subject in the postulated region of the unit image is the face of the person or not on the basis of a plurality of types of face detection feature quantities and one or a plurality of postulated region feature quantities.

If it is detected that the subject in the postulated region of the unit image is the face of the person, the control unit 110 defines the postulated region feature quantity of the postulated region, in which the face of the person appears, as the detected person face feature quantity. If one or a plurality of detected person face feature quantities are detected from the unit image along with one or a plurality of faces of people in such a manner, the control unit 110 progresses to Step SP78.

In Step SP78, the control unit 110 detects the number of detected person face feature quantities detected from the unit image (that is, the number of people in the unit image), and determines whether or not two or more detected person face feature quantities are detected.

If the determination result in Step SP78 is positive, this indicates that the relationship between multiple people in the unit image can be determined. In Step SP78, if the determination result is positive, the control unit 110 progresses to Step SP79.

In Step SP79, the control unit 110 determines the relationship between the multiple people in the unit image on the basis of a plurality of detected person face feature quantities detected from the unit image and the person relationship information in the file attribute information corresponding to the unit image.

On the basis of the determination result of the relationship between the person, the control unit 110 detects the number of person groups and also detects the number of out-of-group people. Then, the control unit 110 progresses to Step SP80.

In Step SP80, the control unit 110 selects the number of print copies of the unit image on the basis of the number of person groups and the number of out-of-group people (the number of multiple people in the unit image and the relationship between the multiple people). Then, the control unit 110 progresses to Step SP81.

In Step SP81, the control unit 110 controls the printing unit 117 to print the unit image based on unit image data on the printing sheets corresponding to the number of print copies selected for printing of the unit image. Then, the control unit 110 progresses to Step SP82.

Meanwhile, if the determination result in Step SP78 is negative, this indicates that only one person is in the unit image, thus the relationship between the people are unable to be determined. In Step SP78, if the determination result is negative, the control unit 110 progresses to Step SP83.

In Step SP83, the control unit 110 selects the number of print copies of the unit image to be one copy on the basis of the number of people (that is, one person in the unit image). Then, the control unit 110 progresses to Step SP81.

Thus, in Step SP81, the control unit 110 controls the printing unit 117 to print the unit image based on unit image data on one printing sheet corresponding to the number of print copies selected for printing of the unit image. Then, the control unit 110 progresses to Step SP82.

In Step SP82, the control unit 110 determines whether or not unit image data to be printed has been selected from all of the specified motion periods in storage motion image data.

If the determination result in Step SP82 is negative, this indicates that a plurality of motion periods, in which the designated motion of the person appears, in storage motion image data, and there remain one or more motion periods in which unit image data to be printed are not yet selected. In Step SP82, if the determination result is negative, the control unit 110 returns to Step SP75.

Thus, when a plurality of motion periods are specified in storage motion image data, the control unit 110 repeatedly carries out Steps SP75 to SP83 until the positive determination result is obtained in Step SP82. Thus, the control unit 110 sequentially selects unit image data to be printed from a plurality of motion periods specified in storage motion image data and processes unit image data for printing.

Meanwhile, if the determination result in Step SP82 is positive, this indicates that unit image data to be printed has been selected from all of the motion periods, in which the designated motion of the person appears, specified in storage motion image data, and processed for processing. In Step SP82, if the determination result is positive, the control unit 110 progresses to Step SP84.

In Step SP84, the control unit 110 determines whether or not printing of all of the unit images to be printed which are designated by the user as the designated motion is completed (that is, all of the retrieved video files have been processed for printing).

If the determination result in Step SP84 is negative, this indicates that there remain one or more unit images, which are not yet processed for printing, from among a plurality of unit images designated by the user as a printing target. In Step SP84, if the determination result is negative, the control unit 110 returns to Step SP73.

When only the unit image is designated as the printing image type in such a manner, the control unit 110 repeatedly carried out Step SP73 to Step SP84 until the positive determination result is obtained in Step SP84.

Thus, when a plurality of unit images are designated as a printing target, the control unit 110 sequentially prints a plurality of unit images while selecting the number of print copies, such that the unit images are printed by the selected number of print copies.

If the determination result in Step SP84 is positive, this indicates that printing of a plurality of unit images designated by the user as a printing target is completed. In Step SP84, if the determination result is positive, the control unit 110 progresses to Step SP45 and ends the number-of-copies selection/printing processing procedure RT1.

[3-5 Operation and Effect of Second Embodiment]

With this configuration, the control unit 110 of the printing apparatus 100 loads and stores the image file of the still image generated by imaging the subject or a video file of a storage motion image generated by video-recording the subject from the external apparatus.

When the video file is loaded and stored, the control unit 110 of the printing apparatus 100 carries out the imaged person specification processing by using the video file. Thus, the control unit 110 of the printing apparatus 100 determines the relationship between the people in the storage motion image from the storage motion image, and stores the person relationship information representing the determined relationship between the people in the storage medium 114.

In this state, if printing of the still image or the unit images constituting the storage motion image is requested, the control unit 110 of the printing apparatus 100 detects multiple people in the still image or the unit image to be printed. The control unit 110 of the printing apparatus 100 determines the relationship between the multiple people in the still image or the unit image on the basis of the person relationship information.

The control unit 110 of the printing apparatus 100 sets the number of print copies on the basis of the number of multiple people in the still image or unit image and the relationship between the multiple people such that only one copy of the still image or unit image is printed for a person group, and the still image or unit image is printed one copy for one out-of-group person. The control unit 110 of the printing apparatus 100 prints the still image or unit image by the selected number of print copies.

Thus, the control unit 110 of the printing apparatus 100 can prevent the printed still image or unit image from being wasted since the still image or unit image is printed one copy for each of the multiple people in the person group, such as a family, a married couple, brothers, or the like.

According to the above-described configuration, the printing apparatus 100 loads and stores an image file or a video file. When the video file is loaded and stored, the printing apparatus 100 carries out the imaged person specification processing by using the video file to determine the relationship between people in the storage motion image, and also stores the person relationship information representing the determined relationship between the people in the storage medium 114. When printing of a still image or each unit image constituting a storage motion image is requested, the printing apparatus 100 detects multiple people in the still image or unit image to be printed, determines the relationship between the multiple people on the basis of the person relationship information, and selects the number of print copies of the still image or unit image on the basis of the number of multiple people and the relationship between the multiple people. Therefore, the printing apparatus 100 can obtain the same effects as in the first embodiment, and can also prevent the printed still image or unit image from being wasted since the still image or unit image is printed one copy for each of the multiple people in the person group, such as a family, a married couple, brothers, or the like. Further, the printing apparatus 100 can accurately print the still image or unit image for group or individual.

The control unit 110 of the printing apparatus 100 determines the relationship between multiple people when a video file is loaded and stored and accumulates the person relationship information in the storage medium 114. When printing of a still image or unit image is requested, the control unit 110 of the printing apparatus 100 determines the relationship between multiple people in the still image or unit image to be printed on the basis of the person relationship information accumulated in the storage medium 114 up to that point of time.

Therefore, when the still image or unit image is printed, the control unit 110 of the printing apparatus 100 determines the relationship between the multiple people in the still image or unit image, preventing the number of print copies from being inaccurately selected since the relationship is unable to be sufficiently determined.

At the time of printing, the control unit 110 of the printing apparatus 100 determines the relationship between the people by using a plurality of video files stored up to that point of time, preventing additional processing from being increased.

<4. Modifications>

[4-1 Modification 1]

In the first and second embodiments, a case has been described where, even when three or more people are in a conversation, the familiarity between the multiple people is calculated only by using the utterance text of each person generated on the basis of right sound data, left sound data, and rear sound data.

However, the invention is not limited thereto. When three or more people are in a conversation, a storage motion image is used along with the utterance text of each person, and the direction of the face or the movement of the mouth of each person at the time of the conversation is detected from the storage motion image.

For example, a combination of people who are in a face-to-face conversation and the transition of the combination may be detected, and the familiarity between people who are actually in the conversation may be calculated. With this configuration, the familiarity between the people can be further accurately calculated from the conversation.

[4-2 Modification 2]

In the first embodiment, a case has been described where storage motion image data, right sound data, left sound data, and rear sound data generated by imaging a person are temporarily stored in the storage medium 28, and read again to determine the relationship between the person and another person and to specify the person.

However, the invention is not limited thereto. While storage motion image data, right sound data, left sound data, and rear sound data are generated by imaging a person, the relationship between multiple people may be determined and the person may be specified.

Further, if the relationship between multiple people may be determined and the person may be specified while storage motion image data, right sound data, left sound data, and rear sound data are generated by imaging a person, when the determination or specification has been completed, a life album may be automatically created.

[4-3 Modification 3]

In the first embodiment, a case has been described where, by using storage motion image data, right sound data, left sound data, and rear sound data generated by imaging a person, the digital video camera 10 determines the relationship between the person and another person and specifies the person.

However, the invention is not limited thereto. The digital video camera 10 loads storage motion image data, right sound data, left sound data, and rear sound data supplied from the outside. The digital video camera 10 may determine the relationship between multiple people and may specify the person by using storage motion image data, right sound data, left sound data, and rear sound data loaded from the outside.

With this configuration, previous storage motion image data, right sound data, left sound data, and rear sound data held in an apparatus different from the digital video camera can be used for relationship determination or person specification.

With this configuration, previous storage motion image data, right sound data, left sound data, and rear sound data held in an apparatus different from the digital video camera 10 can be used in generating a life album.

[4-4 Modification 4]

In the first and second embodiments, a case has been described where storage motion image data, right sound data, left sound data, and rear sound data are used for determination of the relationship between multiple people and person specification.

However, the invention is not limited thereto. For example, only storage motion image data may be used for determination of the relationship between multiple people and person specification. With this configuration, the processing load when the relationship between multiple people is determined and the person is specified can be reduced.

[4-5 Modification 5]

In the first and second embodiments, a case has been described where in-conversation utterance text is generated on the basis of right sound data, left sound data, and rear sound data, and the name or nickname of the person or the relationship estimation phrase is detected from the utterance text and used for determination or specification of multiple people.

However, the invention is not limited thereto. For example, right sound data, left sound data, and rear sound data may be frequency-analyzed, such that sound of the name or nickname, or the relationship estimation phrase maybe detected and used for determination or specification of multiple people.

[4-6 Modification 6]

In the first and second embodiments, a case has been described where, after the relationship between multiple people is estimated on the basis of the motions or utterance of the people, the relationship is finally determined on the basis of the familiarity and the familiarity degree information.

However, the invention is not limited thereto. For example, the relationship between multiple people may be determined on the basis of at least the motions of the people from among the motions and utterance of the people, without using the familiarity and the familiarity degree information.

[4-7 Modification 7]

In the first and second embodiments, a case has been described where, after the relationship between multiple people is estimated on the basis of the motions or utterance of the people, and the relationship is finally determined on the basis of the familiarity and the familiarity degree information. However, the invention is not limited thereto. For example, the relationship between multiple people may be determined on the basis of one of the familiarity and the familiarity degree information along with the motions and utterance of the people.

[4-8 Modification 8]

In the first and second embodiments, a case has been described where, after the relationship between multiple people is estimated on the basis of the motions or utterance of the people, the relationship is finally determined on the basis of the familiarity and the familiarity degree information. However, the invention is not limited thereto. For example, the relationship between multiple people maybe determined on the basis of at least one of the familiarity and the familiarity degree information along with the motions of the people.

[4-9 Modification 9]

In the second embodiment, a case has been described where a still image or unit image to be printed is designated by a designated date, a designated period, or a designated motion. However, the invention is not limited thereto. For example, a still image or unit image to be printed may be designated by various other methods, such as an event, an imaging place, all image files or video files stored in the storage medium 114, and the like.

Further, for example, information representing an event may be stored in, for example, header data of an image file generated by picture-capturing a subject, such that a still image to be printed may be designated by an event.

[4-10 Modification 10]

In the second embodiment, a case has been described where, for a still image or unit image to be printed, the control unit 110 adds the number of person groups, the number of registered out-of-group people, and the number of unregistered out-of-group people to select the number of print copies.

However, the invention is not limited thereto. For example, the control unit 110 may detect the number of all people in a still image or unit image to be printed, may correct the number of people by the number of person groups and the total number of people in all of the person groups, and may select the number of print copies to be the same as the corrected number.

[4-11 Modification 11]

In the second embodiment, a case has been described where the control unit 110 determines the relationship between multiple people in a still image or unit image to be printed, and detects a person group on the basis of the determination result.

However, the invention is not limited thereto. For example, the user selects a type of person group to be detected, such as a married couple, parent and child, brothers, or the like, prior to printing. When the relationship between multiple people in a still image or unit image to be printed has been determined, the control unit 110 may detect a person group of a type selected in advance from among the multiple people on the basis of the determination result. With this configuration, a still image or unit image can be printed as the user intended.

Further, a list of the members of a club team, such as soccer or baseball, or a list of the names of friends is stored in advance in the storage medium 114 of the printing apparatus 100. If the relationship between multiple people in a still image or unit image to be printed is determined, the control unit 110 detects the members of the club team or friends as a group other than relatives by using the list. Thus, the control unit 110 may print a still image or unit image to be printed one copy for the group other than relatives through the printing unit 117.

[4-12 Modification 12]

In the second embodiment, a case has been described where each of the still image or unit image is printed by the number of print copies. However, the invention is not limited thereto. For example, the control unit 110 counts the number of print copies of the still image or unit image along with the relationship between the people. The control unit 110 may print the still image or unit image by person group or out-of-group person on the basis of the counting result.

With this configuration, when a still image or unit image is printed, a sorting operation of printing sheets on which the still image or unit image is printed can be omitted, and the user-friendliness of the printing apparatus 100 can be significantly improved.

[4-13 Modification 13]

In the second embodiment, when the control unit 110 loads and stores the video file, the relationship between multiple people is determined, and the person relationship information is stored in the storage medium 114. In the second embodiment, a case has been described where, when the still image or the unit image is printed, the control unit 110 uses the person relationship information.

However, the invention is not limited thereto. For example, when the unit image is printed, the control unit 110 may determine the relationship between multiple people by using the video file of the unit image, and may use the determined relationship in selecting the number of print copies.

[4-14 Modification 14]

In the first and second embodiments, a case has been described where the information processing apparatus of the invention is applied to the information processing apparatus 1, the digital video camera 10, and the printing apparatus 100 described with reference to FIGS. 1 to 30.

However, the invention is not limited thereto and may be applied to an information processing apparatus, such as a computer, a mobile phone, a PDA (Personal Digital Assistance), a portable game machine, or a printing apparatus, which is capable of reproducing the video file.

The invention may be applied to an information processing apparatus having various other configuration, such as a digital still camera having a video recording function or a storage/reproduction apparatus, for example, a hard disk recorder.

Further, a printing system may be constructed in which the digital video camera 10 according to the first embodiment and a printer are connected to each other, and the control unit 11 of the digital video camera 10 may function the same as the control unit 110 of the printing apparatus 100 according to the second embodiment.

That is, in such a printing system, the control unit 11 of the digital video camera 10 may carry out the number-of-copies selection/printing processing procedure RT3 described with reference to FIG. 26 to FIG. 30.

[4-15 Modification 15]

In the first and second embodiments, the information processing program of the invention is applied to the imaged person specification program stored in advance in the internal memory of the control units 11 and 110 described with reference to FIGS. 1 to 30.

A case has been described where the control units 11 and 110 carry out the imaged person specification processing procedure RT1 described with reference to FIGS. 12 to 18 in accordance with the imaged person specification program.

However, the invention is not limited thereto. For example, the information processing program may be installed by a computer-readable storage medium in which the information processing program is recorded to be readable by the digital video camera 10 and the printing apparatus 100. The control units 11 and 110 may carry out the imaged person specification processing procedure RT1 in accordance with the installed information processing program.

The digital video camera 10 and the printing apparatus 100 may install the information processing program from the outside by using a wire or wireless communication medium, such as a local area network, Internet, or digital satellite broadcast.

The computer-readable storage medium which allows the information processing program to be installed and run on the digital video camera 10 and the printing apparatus 100 may be realized by, for example, a package media, such as a flexible disk.

The computer-readable storage medium which allows the information processing program to be installed and run on the digital video camera 10 and the printing apparatus 100 may be realized by a package media, such as a CD-ROM (Compact Disc-Read Only Memory).

The computer-readable storage medium which allows the information processing program to be installed and run on the digital video camera 10 and the printing apparatus 100 may be realized by a package media, such as a DVD (Digital Versatile Disc).

The computer-readable storage medium may be realized by a semiconductor memory or a magnetic disk in which various programs are temporarily or permanently stored, as well as a package media.

As the device for storing the information processing program in the computer-readable storage medium, a wire or wireless communication medium such as a local area network, Internet, or digital satellite broadcast, may be used. The information processing program may be stored in the computer-readable storage medium through various communication interfaces, such as a router and a modem.

[4-16 Modification 16]

In the first and second embodiment, a case has been described where the storage unit 2 and the storage/reproduction units 27 and 113 described with reference to FIGS. 1 to 30 may be used as a storage unit which stores the person relationship information representing the relationship between multiple people as a subject in the storage medium.

However, the invention is not limited thereto. For example, a storage unit having various other configuration may be used, like a storage unit provided outside the digital video camera 10 and the printing apparatus 100.

[4-17 Modification 17]

In the first and second embodiments, a case has been described where the acquisition unit 4, the lens unit 13, the imaging unit 14, the analog-to-digital conversion unit 15, the digital processing unit 16, and the external apparatus interface 112 described with reference to FIGS. 1 to 30 are used as an acquisition unit which acquires image data generated by imaging a person as a subject.

However, the invention is not limited thereto. For example, an acquisition unit having various other configuration may be used, like a communication interface which acquires image data from the outside by wireless communication or wire communication.

[4-18 Modification 18]

In the first and second embodiments, a case has been described where the detection unit 5 and the control units 11 and 110 described with reference to FIGS. 1 to 30 may be used as a detection unit which detects a person in an image based on image data acquired by the acquisition unit.

However, the invention is not limited thereto, and a CPU (Central Processing Unit) or a DSP (Digital Signal Processor) may be used. A detection unit having various other configuration may be widely used, like a detection circuit having a hardware circuit configuration which detects a person in an image based on image data acquired by the acquisition unit.

[4-19 Modification 19]

In the first and second embodiments, a case has been described where the specification unit 6 and the control units 11 and 110 described with reference to FIGS. 1 to 30 are used as a specification unit which specifies the person detected from the image by the detection unit.

However, the invention is not limited thereto, and a CPU or a DSP may be used. Further, a specification unit having various other configuration may be used, like a specification circuit having hardware circuit configuration which specifies the person detected from the image by the detection unit.

[4-20 Modification 20]

In the first and second embodiment, a case has been described where the determination unit 7 and the control units 11 and 110 described with reference to FIGS. 1 to 30 are used as a determination unit which determines the relationship between multiple people detected from the image by the detection unit.

However, the invention is not limited thereto, and a CPU or a DSP may be used. Further, a determination unit having various other configuration, like a determination circuit having a hardware circuit configuration which determines the relationship between multiple people detected from the image by the detection unit.

[4-21 Modification 21]

In the first and second embodiments, a case has been described where the control units 11 and 110 described with reference to FIGS. 1 to 30 are used as a motion estimation unit which analyzes image data acquired by the acquisition unit to estimate the motion of the person detected by the detection unit.

However, the invention is not limited thereto, and a CPU or a DSP maybe used. Further, a motion estimation unit having various other configuration may be used, like a motion estimation circuit having a hardware circuit configuration which analyzes image data acquired by the acquisition unit to estimate the motion of the person detected by the detection unit.

[4-22 Modification 22]

In the first and second embodiments, a case has been described where the control units 11 and 110 described with reference to FIGS. 1 to 30 are used as an utterance extraction unit which analyzes sound data acquired by the acquisition unit to extract the utterance of the person.

However, the invention is not limited thereto, and a CPU or a DSP may be used. Further, an utterance extraction unit having various other configuration may be used, like an utterance extraction circuit having a hardware circuit configuration which analyzes sound data acquired by the acquisition unit to extract the utterance of the person.

[4-23 Modification 23]

In the first and second embodiments, a case has been described where the control units 11 and 110 described with reference to FIGS. 1 to 30 are used as a familiarity calculation unit which calculates the familiarity between the multiple people on the basis of the utterance of a conversation between the multiple people extracted by the utterance extraction unit.

However, the invention is not limited thereto, and a CPU or a DSP may be used. Further, a familiarity calculation unit having various other configuration may be used, like a familiarity calculation circuit having a hardware circuit configuration which calculates the familiarity between the multiple people on the basis of the utterance of a conversation between the multiple people extracted by the utterance extraction unit.

[4-24 Modification 24]

In the first and second embodiments, a case has been described where the control units 11 and 110 described with reference to FIGS. 1 to 30 are used as a familiarity degree extraction unit which extracts the familiarity degree information representing the degree of familiarity between multiple people from an image based on image data.

However, the invention is not limited thereto, and a CPU or a DSP may be used. Further, a familiarity degree extraction unit having various other configuration may be widely used, like a familiarity degree extraction circuit having a hardware circuit configuration which extracts the familiarity degree information representing the degree of familiarity between multiple people from an image based on image data.

[4-25 Modification 25]

In the first and second embodiments, a case has been described where the control unit 110 described with reference to FIGS. 1 to 30 is used as a number-of-copies selection unit which selects the number of print copies of an image on the basis of the number of people detected from the image by the detection unit and the relationship between multiple people determined by the determination unit.

However, the invention is not limited thereto, and a CPU or a DSP may be used. Further, a number-of-copies selection unit having various other configuration may be widely used, like a number-of-copies selection circuit having a hardware circuit configuration which selects the number of print copies of an image on the basis of the number of people detected from the image by the detection unit and the relationship between multiple people determined by the determination unit.

The invention can be used in a digital video camera, a computer, or an information processing apparatus, such as a printing apparatus.

The present application contains subject matter related to that disclosed in Japanese Priority Patent Application JP 2010-056390 filed in the Japan Patent Office on Mar. 12, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
at least one storage medium configured to store feature information relating to facial features of each of multiple people and person relationship information representing one or more relationships between the multiple people; and
at least one microprocessor programmed to:
acquire image data generated by imaging the multiple people as a subject;
detect each person from among the multiple people in an image based at least in part on the image data;
determine that a first person from among the multiple people cannot be identified by comparing feature information for the first person in the acquired image data to feature information for the first person stored in the at least one storage medium;
in response to determining that the first person cannot be identified by comparing feature information, determine the relationship between the multiple people detected from the image based at least in part on a motion of the multiple people during a verbal and/or physical interaction between the multiple people, represented in the acquired image data; and
identify the first person based at least in part on the determined relationship between the multiple people and the person relationship information stored in the at least one storage medium.

2. The information processing apparatus according to claim 1, wherein the at least one microprocessor is programmed to:
analyze acquired image data to estimate a motion of each of the multiple people; and
determine the relationship between the multiple people based at least in part on estimated specific motion of each of the multiple people.

3. The information processing apparatus according to claim 2, wherein the at least one microprocessor is programmed to:
acquire sound data generated along with the image data; and determine the relationship between the multiple people at least in part on the basis of the estimated motion of each person and the acquired sound data.

4. The information processing apparatus according to claim 3, wherein the at least one microprocessor is programmed to:
analyze the acquired sound data to extract an utterance of each person from among the multiple people;
calculate a familiarity between the multiple people on the basis of the extracted utterance of each person from among the multiple people, wherein a conversation between the multiple people comprises the utterance of each person from among the multiple people, and
determine the relationship between the multiple people on the basis of the estimated motion of each person from among the multiple people and the calculated familiarity between the multiple people.

5. The information processing apparatus according to claim 4, wherein the at least one microprocessor is programmed to:
extract familiarity degree information representing a degree of familiarity between the multiple people from the image based at least in part on the image data,
determine the relationship between the multiple people at least in part on the basis of the estimated motion of each person, the calculated familiarity between the multiple people, and the extracted familiarity degree information between the multiple people.

6. The information processing apparatus according to claim 5, wherein the at least one microprocessor is programmed to: select a number of print copies of the image based at least in part on a number of people detected from the image and the determined relationship between the multiple people.

7. The information processing apparatus according to claim 3, wherein the at least one microprocessor is programmed to:
analyze the acquired sound data to extract an utterance of each person from among the multiple people, and
determine the relationship between the multiple people at least in part on the basis of the estimated motion of each person from among the multiple people and the extracted utterance of each person from among the multiple people.

8. The information processing apparatus according to claim 7, wherein the at least one microprocessor is programmed to:
calculate a familiarity between the multiple people at least in part on the basis of the utterance of a conversation between the multiple people, and
determine the relationship between the multiple people at least in part on the basis of the estimated motion of each person from among the multiple people, the extracted utterance of each person from among the multiple people, and the calculated familiarity between the multiple people.

9. The information processing apparatus according to claim 8, wherein the at least one microprocessor is programmed to:
extract familiarity degree information representing a degree of familiarity between the multiple people from the image based at least in part on the image data, and determine the relationship between the multiple people at least in part on the basis of the estimated motion of each person from among the multiple people, the extracted utterance of each person, the calculated familiarity between the multiple people, and the extracted familiarity degree information between the multiple people.

10. The information processing apparatus according to claim 9, wherein the at least one microprocessor is programmed to:
select a number of print copies of the image based at least in part on the number of people detected from the image and the determined relationship between the multiple people.

11. The information processing apparatus of claim 1, wherein the at least one microprocessor is programmed to determine the relationship between the multiple people based at least in part on a motion of the multiple people during a physical interaction between the multiple people.

12. The information processing apparatus of claim 7, wherein the at least one microprocessor is programmed to:
analyze the acquired image data to detect person direction information for each of the multiple people during the extracted utterance; and
determine the relationship between the multiple people based at least in part on the detected person direction information.

13. An information processing method comprising the steps of:
causing feature information relating to facial features of each of multiple people and person relationship information representing one or more relationships between the multiple people to be stored in at least one storage medium;
acquiring image data generated by imaging the multiple people as a subject;
detecting each person from among the multiple people in an image based on the acquired image data;
determining that a first person from among the multiple people cannot be identified by comparing feature information for the first person in the acquired image data to feature information for the first person stored in the at least one storage medium;
in response to determining that the first person cannot be identified by comparing feature information, determining the relationship between the multiple people detected from the image based at least in part on a motion of the multiple people during a verbal and/or physical interaction between the multiple people, represented in the acquired image data; and
identifying the first person based at least in part on the determined relationship between the multiple people and the person relationship information stored in the at least one storage medium.

14. At least one non-transitory computer-readable medium having instructions encoded thereon which, when executed, cause a computer to perform a method comprising acts of:
causing feature information relating to facial features of each of multiple people and person relationship information representing one or more relationships between the multiple people to be stored;
acquiring image data generated by imaging the multiple people as a subject;
detecting each person from among the multiple people in an image based on the acquired image data;
determining that a first person from among the multiple people cannot be identified by comparing feature information for the first person in the acquired image data to stored feature information for the first person;
in response to determining that the first person cannot be identified by comparing feature information, determining the relationship between the multiple people detected from the image based at least in part on a motion of the multiple people during a verbal and/or physical interaction between the multiple people, represented in the acquired image data; and
identifying, if at least one person from among the multiple people detected from the image is specified and at least one other person is unable to be specified, the at least one other person based at least in part on the determined relationship between the multiple people and the stored person relationship information.

15. An information processing apparatus comprising:
at least one microprocessor programmed to:
acquire image data generated by imaging multiple people as a subject;
detect each person from among the multiple people in an image based at least in part on the acquired image data;
determine that a first person from among the multiple people cannot be identified by comparing feature information for the first person in the acquired image data to previously stored feature information for the first person;
in response to determining that the first person cannot be identified by comparing feature information, determine the relationship between the multiple people detected from the image based at least in part on a motion of the multiple people during a verbal and/or physical interaction between the multiple people, represented in the acquired image data; and
select a number of print copies of the image based at least in part on a number of people detected from the image and the determined relationship between the multiple people.

16. The information processing apparatus according to claim 15, wherein the at least one microprocessor is programmed to:
cause person relationship information representing the relationship between multiple people as a subject to be stored;
determine the relationship between the multiple people based at least in part on stored person relationship information.

17. The information processing apparatus according to claim 16, wherein the at least one microprocessor is programmed to:
analyze the image data to estimate the motion of each of the multiple people; and
determine the relationship between the multiple people based at least in part on the estimated motion of each of the multiple people.

18. The information processing apparatus according to claim 17, wherein the at least one microprocessor is programmed to:
acquire sound data generated along with the image data by imaging the multiple people, and
determine the relationship between the multiple people based at least in part on the estimated motion of each person from among the multiple people and the acquired sound data.

19. An information processing method comprising the steps of:

acquiring image data generated by imaging multiple people as a subject;

detecting each person from among the multiple people in an image based on the acquired image data;

determining that a first person from among the multiple people cannot be identified by comparing feature information for the first person in the acquired image data to previously stored feature information for the first person;

in response to determining that the first person cannot be identified by comparing feature information, determining the relationship between the multiple people detected from the image based at least in part on a motion of the multiple people during a verbal and/or physical interaction between the multiple people, represented in the acquired image data; and selecting the number of print copies of the image based at least in part on the number of people detected from the image and the determined relationship between the multiple people.

20. At least one non-transitory computer-readable medium having instructions encoded thereon which, when executed, cause a computer to perform a method comprising acts of:

acquiring image data generated by imaging multiple people as a subject;

detecting each person in an image based on the acquired image data;

determining that a first person from among the multiple people cannot be identified by comparing feature information for the first person in the acquired image data to previously stored feature information for the first person;

in response to determining that the first person cannot be identified by comparing feature information, determining the relationship between the multiple people detected from the image based at least in part on a motion of the multiple people during a verbal and/or physical interaction between the multiple people, represented in the acquired image data; and selecting the number of print copies of the image based at least in part on a number of people detected from the image and the determined relationship between the multiple people.

* * * * *